US010803780B2

(12) United States Patent
Joo

(10) Patent No.: US 10,803,780 B2
(45) Date of Patent: Oct. 13, 2020

(54) DISPLAY DEVICE, DISPLAY METHOD AND MACHINE READABLE STORAGE MEDIUM

(71) Applicant: NANOBRICK CO., LTD., Suwon-si (KR)

(72) Inventor: Jae Hyun Joo, Hwaseong-si (KR)

(73) Assignee: NANOBRICK CO., LTD., Suwon-si (KR)

(*) Notice: Subject to any disclaimer, the term of this patent is extended or adjusted under 35 U.S.C. 154(b) by 0 days.

(21) Appl. No.: 15/942,325

(22) Filed: Mar. 30, 2018

(65) Prior Publication Data

US 2018/0226010 A1 Aug. 9, 2018

Related U.S. Application Data

(60) Continuation of application No. 15/131,974, filed on Apr. 18, 2016, now abandoned, which is a division of
(Continued)

(30) Foreign Application Priority Data

Jul. 19, 2010 (KR) .................. 10-2010-0069530
Jul. 19, 2010 (KR) .................. 10-2010-0069531
(Continued)

(51) Int. Cl.
  *G02F 1/17* (2019.01)
  *G09G 3/20* (2006.01)
  (Continued)

(52) U.S. Cl.
  CPC ........... *G09G 3/2003* (2013.01); *G02F 1/167* (2013.01); *G02F 1/17* (2013.01); *G02F 1/25* (2013.01);
  (Continued)

(58) Field of Classification Search
  CPC ......... G09G 2320/0666; G09G 3/2003; G09G 3/3446; G09G 3/344; G09G 2300/08;
  (Continued)

(56) References Cited

U.S. PATENT DOCUMENTS 7,046,228 B2    5/2006  Liang
7,397,597 B2 *  7/2008  Verschueren ........... G02F 1/167
                                                    204/549
(Continued)

FOREIGN PATENT DOCUMENTS

JP    S55-126277 A    9/1980
JP    2005-266008 A   9/2005
(Continued)

OTHER PUBLICATIONS

International Search Report dated Feb. 6, 2012 for PCT/KR2011/005136. (2 pages).
(Continued)

*Primary Examiner* — Jeff Piziali
(74) *Attorney, Agent, or Firm* — Fitch, Even, Tabin & Flannery LLP

(57) ABSTRACT

In a display method or device according to one embodiment of the present invention, at least two of a photonic crystal reflection mode, a unique color reflection mode and a transmittance tuning mode may be implemented to be switched to each other within the same unit pixel. In addition, a machine readable storage medium recording a computer program performing the display method is provided.

5 Claims, 51 Drawing Sheets

Related U.S. Application Data application No. 13/388,300, filed as application No. PCT/KR2011/005136 on Jul. 13, 2011, now abandoned.

(30) Foreign Application Priority Data

| | | | |
|---|---|---|---|
| Jul. 26, 2010 | (KR) | ....................... | 10-2010-0072061 |
| Aug. 16, 2010 | (KR) | ....................... | 10-2010-0078968 |
| Aug. 27, 2010 | (KR) | ....................... | 10-2010-0083545 |
| Aug. 31, 2010 | (KR) | ....................... | 10-2010-0084951 |
| Apr. 8, 2011 | (KR) | ....................... | 10-2011-0032798 |
| Jun. 27, 2011 | (KR) | ....................... | 10-2011-0062195 |
| Jun. 27, 2011 | (KR) | ....................... | 10-2011-0062211 |
| Jun. 27, 2011 | (KR) | ....................... | 10-2011-0062289 |
| Jun. 27, 2011 | (KR) | ....................... | 10-2011-0062308 |
| Jul. 12, 2011 | (KR) | ....................... | 10-2011-0068768 |
| Jul. 12, 2011 | (KR) | ....................... | 10-2011-0068781 |
| Jul. 12, 2011 | (KR) | ....................... | 10-2011-0068798 |
| Jul. 12, 2011 | (KR) | ....................... | 10-2011-0068933 |

(51) Int. Cl.

| | |
|---|---|
| *G02F 1/167* | (2019.01) |
| *G09G 3/34* | (2006.01) |
| *G02F 1/25* | (2006.01) |
| *G02F 1/23* | (2006.01) |
| *G02F 1/21* | (2006.01) |
| *B82Y 20/00* | (2011.01) |
| *G02B 5/24* | (2006.01) |
| *G02F 1/1676* | (2019.01) |

(52) U.S. Cl.

CPC ............ *G09G 3/344* (2013.01); *G09G 3/3446* (2013.01); *B82Y 20/00* (2013.01); *G02B 5/24* (2013.01); *G02F 1/1676* (2019.01); *G02F 1/21* (2013.01); *G02F 1/23* (2013.01); *G02F 2001/1676* (2013.01); *G02F 2201/44* (2013.01); *G02F 2202/32* (2013.01); *G02F 2203/055* (2013.01); *G02F 2203/34* (2013.01); *G09G 2300/08* (2013.01); *G09G 2310/061* (2013.01); *G09G 2320/0252* (2013.01); *G09G 2320/0257* (2013.01); *G09G 2320/0646* (2013.01); *G09G 2320/0666* (2013.01)

(58) Field of Classification Search

CPC ... G09G 2320/0252; G09G 2320/0257; G09G 2310/061; G09G 2320/0646; G02F 1/17; G02F 1/25; G02F 1/167; G02F 2203/34; G02F 1/23; G02F 1/21; G02F 2203/055; G02F 2201/44; G02F 2202/32; G02F 1/1676; G02F 2001/1676; B82Y 20/00; G02B 5/24

See application file for complete search history.

(56) References Cited

U.S. PATENT DOCUMENTS

| | | | | |
|---|---|---|---|---|
| 7,933,061 | B2* | 4/2011 | Kim | .................... G02F 1/13454 359/290 |
| 8,238,022 | B2* | 8/2012 | Joo | .......................... G02F 1/23 359/296 |
| 2001/0030639 | A1 | 10/2001 | Goden | |
| 2003/0034950 | A1 | 2/2003 | Liang | |
| 2003/0137521 | A1* | 7/2003 | Zehner | .................... G02F 1/167 345/589 |
| 2005/0052402 | A1* | 3/2005 | Kitano | .................... G02F 1/167 345/102 |
| 2005/0231460 | A1* | 10/2005 | Zhou | ....................... G02F 1/167 345/107 |
| 2005/0270261 | A1* | 12/2005 | Danner | .................... G02F 1/167 345/84 |
| 2006/0285194 | A1* | 12/2006 | Moriyama | ............. B82Y 20/00 359/296 |
| 2007/0121193 | A1* | 5/2007 | Akashi | ..................... G02F 1/167 359/296 |
| 2007/0206271 | A1* | 9/2007 | Verschueren | ........... G02F 1/167 359/296 |
| 2007/0285347 | A1 | 12/2007 | Karaki | |
| 2007/0296909 | A1 | 12/2007 | Nagato | |
| 2008/0024482 | A1* | 1/2008 | Gates | ........................ H04N 1/46 345/214 |
| 2008/0062159 | A1 | 3/2008 | Roh | |
| 2008/0238828 | A1* | 10/2008 | Nakayama | ................. G09F 9/35 345/76 |
| 2008/0316580 | A1 | 12/2008 | Gillies | |
| 2009/0128889 | A1 | 5/2009 | Kawase | |
| 2010/0002287 | A1 | 1/2010 | Naijo | |
| 2010/0060628 | A1* | 3/2010 | Lenssen | .................. G02F 1/167 345/214 |
| 2010/0079424 | A1* | 4/2010 | Fan | ......................... G02F 1/167 345/206 |
| 2010/0103501 | A1 | 4/2010 | Wang | |
| 2011/0180745 | A1* | 7/2011 | Margutti | .................. C09D 7/70 252/62.51 R |
| 2012/0044128 | A1 | 2/2012 | Joo et al. | |

FOREIGN PATENT DOCUMENTS

| | | | |
|---|---|---|---|
| JP | 2005-352316 A | 12/2005 | |
| JP | 2007-086729 A | 4/2007 | |
| JP | 2007-147827 A | 6/2007 | |
| JP | 2007-156256 A | 6/2007 | |
| JP | 2007-322617 A | 12/2007 | |
| JP | 2008-33319 A | 2/2008 | |
| JP | 2008-102188 A | 5/2008 | |
| JP | 2010-049272 A | 3/2010 | |
| KR | 10-2005-0013610 A | 2/2005 | |
| KR | 10-2007-0003961 A | 1/2007 | |
| KR | 10-2009-0086192 A | 8/2009 | |
| KR | 10-2009-0087011 A | 8/2009 | |
| KR | 20090086192 A * | 8/2009 | ............ G02F 1/167 |
| KR | 10-2010-0058882 A | 6/2010 | |
| KR | 10-2009-0086192 A | 8/2011 | |
| WO | 99/53373 A1 | 10/1999 | |
| WO | WO-2009153709 A1 * | 12/2009 | ............ G02F 1/167 |
| WO | WO-2010003654 A1 * | 1/2010 | ............ G02F 1/167 |
| WO | 2011/010852 A2 | 1/2011 | |

OTHER PUBLICATIONS

European Search Report and European Search Opinion dated Oct. 19, 2014 for PCT/KR2011/005136.

* cited by examiner (a)

(b)

(a)

(b)

(a)

(b)

(a)

(b)

(a)

(b)

DISPLAY DEVICE, DISPLAY METHOD AND MACHINE READABLE STORAGE MEDIUM

CROSS-REFERENCE TO RELATED APPLICATIONS

This application is a continuation of U.S. application Ser. No. 15/131,974, filed Apr. 18, 2016, which is a divisional of U.S. application Ser. No. 13/388,300, filed Jan. 31, 2012, which claims priority under 35 U.S.C. § 371 to PCT Application PCT/KR2011/005136, filed on Jul. 13, 2011, which claims priority to Korean Patent Application No. 10-2011-0068933, filed on Jul. 12, 2011, to Korean Patent Application No. 10-2011-0068798, filed on Jul. 12, 2011, to Korean Patent Application No. 10-2011-0068781, filed on Jul. 12, 2011, to Korean Patent Application No. 10-2011-0068768, filed on Jul. 12, 2011, to Korean Patent Application No. 10-2011-0062308, filed on Jun. 27, 2011, to Korean Patent Application No. 10-2011-0062289, filed on Jun. 27, 2011, to Korean Patent Application No. 10-2011-0062211, filed on Jun. 27, 2011, to Korean Patent Application No. 10-2011-0062195, filed on Jun. 27, 2011, to Korean Patent Application No. 10-2011-0032798, filed on Apr. 8, 2011, to Korean Patent Application No. 10-2010-0084951, filed on Aug. 31, 2010, to Korean Patent Application No. 10-2010-0083545, filed on Aug. 27, 2010, to Korean Patent Application No. 10-2010-0078968, filed on Aug. 16, 2010, to Korean Patent Application No. 10-2010-0072061, filed on Jul. 26, 2010, to Korean Patent Application No. 10-2010-0069531, filed on Jul. 19, 2010, and to Korean Patent Application No. 10-2010-0069530, filed on Jul. 19, 2010, the disclosures of which are hereby incorporated by reference in their entireties.

BACKGROUND OF THE INVENTION

1. Technical Field

The present invention relates to a display method and device. More particularly, the present invention relates to a display method and device implemented so as to switch at least two of a photonic crystal reflection mode, a unique color reflection mode and a transmittance tuning mode to each other within the same pixel.

2. Description of the Related Art

Recently, as the research and development of next-generation displays is actively being pursued, a variety of displays is being introduced. A typical example of the next-generation displays may include an electronic ink. The electronic ink is a display in which an electric field is applied to particles of specific colors (e.g., black and white) respectively having negative charges and positive charges to display the specific colors. Electronic ink has the advantages of low power consumption and flexible display. However, the electronic ink is limited because it is difficult to represent various colors since the color of the particles is set to specific colors. Meanwhile, it has been introduced a light transmittance tuning device that is used together with a display so as to serve to transmit or block light reflected from the display or incident on the display. The light transmittance tuning device according to the related art includes a mechanical shutter performing a function of tuning light transmission, etc and as a result, has a complicated structure and too much manufacturing time and manufacturing costs are required.

Therefore, a need exists to tune various hues and/or transmittance in a display region by a simple method while simplifying the structure.

SUMMARY OF THE INVENTION

An object of the present invention is to provide a display method and device capable of implementing various hues and/or transmittance within the same pixel by a simple method and structure.

Another object of the present invention is to provide a display method and device capable of tuning various hues, transmittance, brightness and/or chroma by a simple method and structure.

Still another object of the present invention is to provide a display method and device capable of improving intensity of a light wavelength reflected from particles by more regularly arranging inter-particle distances.

Still yet another object of the present invention is to provide a machine readable storage medium on which a program code executing processes of the display method is recorded.

According to an embodiment of the present invention, there is provided a display method applying an electric field through an electrode to a display unit including a solution, in which particles are dispersed in the solvent, and controlling at least one of the intensity, direction, application frequency, application time and application location of the electric field to control at least one of the interval, location and arrangement of the particles, wherein the display method is implemented to selectively switch, within a same pixel of the display unit, between a first mode for controlling a wavelength of light reflected from the particles whose distances are controlled by controlling inter-particle distances; and a second mode for displaying at least one color of the particles, the solvent, the solution and the electrode by controlling the location of the particles.

According to another embodiment of the present invention, there is provided a display method applying an electric field through an electrode to a display unit including a solution, in which particles are dispersed in the solvent, and controlling at least one of the intensity, direction, application frequency, application time and application location of the electric field to control at least one of the interval, location and arrangement of the particles, wherein the display method is implemented to selectively switch, within a same pixel of the display unit, between a first mode for controlling a wavelength of light reflected from the particles whose distances are controlled by controlling inter-particle distances; and a second mode for tuning transmittance of light transmitting the solution by controlling the distance, location or arrangement of the particles.

According to another embodiment of the present invention, there is provided a display method applying an electric field through an electrode to a display unit including a solution, in which particles are dispersed in the solvent, and controlling at least one of the intensity, direction, application frequency, application time and application location of the electric field to control at least one of the interval, location and arrangement of the particles, wherein the display method is implemented to selectively switch, within a same pixel of the display unit, between a first mode for displaying at least one color of the particles, the solvent, the solution and the electrode by controlling the location of the particles; and a second mode for tuning transmittance of light transmitting the solution by controlling the distance, location or arrangement of the particles.

According to another embodiment of the present invention, there is provided a display method applying an electric field through an electrode to a display unit including a solution, in which particles are dispersed in the solvent, and controlling at least one of the intensity, direction, application frequency, application time and application location of the electric field to control at least one of the interval, location and arrangement of the particles, wherein the display method is implemented to selectively switch, within a same pixel of the display unit, between a first mode for controlling a wavelength of light reflected from the particles whose distances are controlled by controlling the location of the particles; a second mode for displaying at least one color of the particles, the solvent, the solution and the electrode by controlling the location of the particles; and a third mode for tuning transmittance of light transmitting the solution by controlling the distance, location or arrangement of the particles.

According to another embodiment of the present invention, there is provided a display device, including: a display unit including a solution in which particles between two electrodes opposite to each other are dispersed in the solvent, at least one of the two electrodes being transparent; and a control unit for controlling at least one of the intensity, direction, application frequency, application time and application location of an electric field applied to the electrodes to control at least one of the interval, location and arrangement of the particles, wherein the control unit is implemented to selectively switch, within a same pixel of the display, between a first mode for controlling a wavelength of light reflected from the particles whose distances are controlled by controlling inter-particle distances; and a second mode for displaying at least one color of the particles, the solvent, the solution and the electrode by controlling the location of the particles.

According to another embodiment of the present invention, there is provided a display device including: a display unit including a solution in which particles between two electrodes opposite to each other are dispersed in the solvent, at least one of the two electrodes being transparent; and a control unit for controlling at least one of the intensity, direction, application frequency, application time and application location of an electric field applied to the electrode to control at least one of the interval, location and arrangement of the particles, wherein the control unit is implemented to selectively switch, within a same unit pixel of a display unit, between a first mode for controlling a wavelength of light reflected from the particles whose distances are controlled by controlling inter-particle distances; and a second mode for tuning transmittance of light transmitting the solution by controlling the distance, location or arrangement of the particles.

According to another embodiment of the present invention, there is provided a display device including: a display unit including a solution in which particles between two electrodes opposite to each other are dispersed in the solvent, at least one of the two electrodes being transparent; and a control unit for controlling at least one of the intensity, direction, application frequency, application time and application location of the electric field to control at least one of the interval, location and arrangement of the particles, the control unit is implemented to selectively switch, within a same pixel of a display unit, between a first mode for displaying at least one color of the particles, the solvent, the solution and the electrode by controlling the location of the particles; and a second mode for tuning transmittance of light transmitting the solution by controlling the distance, location or arrangement of the particles.

According to another embodiment of the present invention, there is provided a display device, including: a display unit including a solution in which particles between two electrodes opposite to each other are dispersed in the solvent, at least one of the two electrodes being transparent; and a control unit for controlling at least one of the intensity, direction, application frequency, application time and application location of an electric field applied to the electrode to control at least one of the interval, location and arrangement of the particles, wherein the control unit is implemented to selectively switch, within a same unit pixel of a display unit, between a first mode for controlling a wavelength of light reflected from the particles whose distances are controlled by controlling inter-particle distances; a second mode for displaying at least one color of the particles, the solvent, the solution and the electrode by controlling the location of the particles; and a third mode for tuning the transmittance of light transmitting the solution by controlling the distance, location or arrangement of the particles.

According to another embodiment of the present invention, there is provided a machine readable storage medium stored with a program code read by a machine and applying an electric field through an electrode to a display unit including a solution in which particles are dispersed in the solvent and controlling at least one of the intensity, direction, application frequency, application time and application location of the electric field to control at least one of the interval, location and arrangement of the particles, wherein the program code is implemented to selectively switch, within a same unit pixel of a display unit, between a first mode for controlling a wavelength of light reflected from the particles whose distances are controlled by controlling inter-particle distances; and a second mode for displaying at least one color of the particles, the solvent, the solution and the electrode by controlling the location of the particles.

According to another embodiment of the present invention, there is provided a machine readable storage medium stored with a program code read by a machine and applying an electric field through an electrode to a display unit including a solution in which particles are dispersed in the solvent and controlling at least one of the intensity, direction, application frequency, application time and application location of the electric field to control at least one of the interval, location and arrangement of the particles, wherein the program code is implemented to selectively switch, within a same unit pixel of a display unit, between a first mode for controlling a wavelength of light reflected from the particles whose distances are controlled by controlling inter-particle distances; and a second mode for tuning transmittance of light transmitting the solution by controlling the distance, location or arrangement of the particles.

According to another embodiment of the present invention, there is provided a machine readable storage medium stored with a program code read by a machine and applying an electric field through an electrode to a display unit including a solution in which particles are dispersed in the solvent and controlling at least one of the intensity, direction, application frequency, application time and application location of the electric field to control at least one of the interval, location and arrangement of the particles, wherein the program code is implemented to selectively switch, within a same unit pixel of a display unit, between a first mode for displaying at least one color of the particles, the solvent, the solution and the electrode by controlling the location of the particles; and a second mode for tuning transmittance of light transmitting the solution by controlling the distance, location or arrangement of the particles.

According to another embodiment of the present invention, there is provided a machine readable storage medium stored with a program code mad by a machine and applying an electric field through an electrode to a display unit including a solution in which particles are dispersed in the solvent and controlling at least one of the intensity, direction, application frequency, application time and application location of the electric field to control at least one of the interval, location and arrangement of the particles, wherein the program code is implemented to selectively switch, within a same unit pixel of a display unit, between a first mode for controlling a wavelength of light reflected from the particles whose distances are controlled by controlling inter-particle distances; a second mode for displaying at least one color of the particles, the solvent, the solution and the electrode by controlling the location of the particles; and a third mode for tuning transmittance of light transmitting the solution by controlling the distance, location or arrangement of the particles.

Each of the following embodiments may be applied to all of the display method, the display device and the storage medium.

In one embodiment, the switching between the modes may be performed by changing at least one of the intensity, direction, application frequency and application location of the electric field.

In one embodiment, DC electric field and AC electric field may be mixed sequentially or simultaneously and applied.

In one embodiment, the electrode may be divided into a large electrode and a local electrode so as to be electrically isolated from each other.

In one embodiment, in order to control the location of the particles, the particles charged with electric charges of a same sign may be used.

In one embodiment, in order to control the location of the particles, the particles having different dielectric constant from the solvent is used and a non-uniform electric field may be applied to the display unit.

In one embodiment, in order to tune the transmittance of light, a wavelength of light reflected from the particles may be controlled beyond a visible spectrum.

In one embodiment, in order to tune the transmittance of light, the particles charged with electric charges of a same sign is used and the electric field is locally applied to the display unit, and thus, the particles are locally moved by electrophoresis.

In one embodiment, in order to tune the transmittance of light, the particles having different dielectric constant from the solvent is used and a non-uniform electric field is applied to the display unit.

In one embodiment, the particles may be arranged in a direction parallel to the direction of the electric field by electrorheology to tune the transmittance.

In one embodiment, at least one of the particles, solvent and solution has a variable electrical polarization characteristic, which is a characteristic that an amount of electrical polarization induced according to the change of the applied electric field is changed.

In one embodiment, at least one of the particles, the solvent and the solution may be electrically polarized by at least one of electronic polarization, ionic polarization, interfacial polarization and rotational polarization.

In one embodiment, the solvent may be a material including a polarization index of 1 or more.

In one embodiment, the solvent may include propylene carbonate.

In one embodiment, the particles may include a ferroelectric or superparaelectric material.

In one embodiment, the particles may include inorganic compounds including at least one of Ti, Zr, Ba, Si, Au, Ag, Fe, Ni and Co or organic compounds including carbon.

In one embodiment, the particles may have the electric charges of a same sign, and as the electric field is applied, the inter-particle distances may be reached within the specific range by mutually applying electrophoresis force acting to the particles proportional to the intensity of electric field, electrostatic attraction acting between the particles by the variable electrical polarization characteristic and electrostatic repulsion acting between the particles having the electric charges of the same sign act mutually so that the inter-particle distances are reached within a specific range, and thus, light having a specific wavelength is reflected from the particles.

In one embodiment, the particles may show a mutual steric effect, and as the electric field is applied, the electrostatic attraction acting between the particles by the variable electrical polarization characteristic and steric hindrance repulsion acting between the particles may acts on each other so that the inter-particle distances are reached within a specific range, and thus, light having a specific wavelength is reflected from particles.

In one embodiment, when the electric field is applied, the particles may be arranged within the solvent with having a three-dimensional short range ordering.

In one embodiment, the wavelength of light reflected from the particles may become short as the intensity of the electric field is increased.

In one embodiment, a possible wavelength range of light reflected from the particles may be at least one of infrared, visible and ultraviolet spectrums.

In one embodiment, at least one of the particles, the solvent and the electrode may have at least one component of materials having pigments, dyes and structural colors.

In one embodiment, each of a plurality of pixels may be independently driven by independently applying the electric field to each of the plurality of pixels.

In one embodiment, the particles and solvent may be encapsulated by a light transmissive material or may be partitioned by an insulating material.

In one embodiment, the particles and solvent may be dispersed in a medium made of a light transmissive material.

In one embodiment, the solution may be a gel type.

In one embodiment, although the electric field is removed after a specific color or transmittance is displayed by applying the electric field to the solution, the specific color or transmittance is maintained for a predetermined time.

In one embodiment, a unit pixel, in which the switching between the modes is performed, is vertically stacked in a plural number and the modes may be independently implemented within each stacked unit pixel.

In one embodiment, a unit pixel, in which the switching between the modes is performed, may be horizontally arranged in a plural number and the modes may be independently implemented within each arranged unit pixel.

In one embodiment, the electric field is applied to the particles or the solvent, and then, the interval, location or arrangement may be reset by applying the electric field in an opposite direction to the electric field.

In one embodiment, the display method may further include prior to applying the electric field, applying standby electric field so as to maintain the distance, location or arrangement of the particles to be previously set interval, location or arrangement.

In one embodiment, a capacitor is connected to the display unit, so that electric charges may be charged in the capacitor when the voltage is applied, when the voltage applied to the display unit is blocked, voltage may be applied to the display unit using the electric charges charged in the capacitor.

In one embodiment, it may control brightness or chroma of a color displayed by controlling at least one of a display area, display time and transmittance of light.

In one embodiment, the electric field is applied to first and second particles having electric charges of different signs so that the distance, location or arrangement of first particles and the distance, location or arrangement of second particles may be independently controlled.

In one embodiment, energy may be generated using light incident to the particles and the solvent, and the electric field may be applied by using the generated energy.

In one embodiment, an emissive display means is used to implement the mode or the emissive display means is used by being combined with the mode.

In one embodiment, the light reflected from the particles, the solvent, or the electrode or the light transmitting the particles, the solvent, or the electrode may be displayed through a color filter connected to the electrode.

In one embodiment, the particles and the electrode may each be white and black or may each be black and white.

In one embodiment, the mode for controlling the wavelength of light reflected by controlling the inter-particle distances may have a magnitude in the applied voltage smaller than that of the mode for tuning the transmittance of light by controlling the arrangement of the particles.

In one embodiment, as the applied voltage becomes larger, inter-particle attraction by a variable electrical polarization characteristic may become large so that inter-particle repulsion may be disregarded.

In one embodiment, the arrangement of the particles is controlled so that inter-particle attraction by the variable electrical polarization characteristic may become larger than the inter-particle repulsion in the mode for tuning the transmittance of light.

In one embodiment, the transmittance may be varied continuously or in an analog method.

As set forth above, the embodiments of the present invention can implement various hues or continuous hues and/or transmittance within the same unit pixel by the simple structure.

In addition, the embodiments of the present invention can control various hues, transmittance, chroma and/or brightness by the simple structure.

Further, the embodiments of the present invention can implement the hues of the continuous wavelength by reflecting the light of the continuous wavelength rather than implementing the hues by the mixing of R, G and B.

Also, the display method in accordance with one embodiment of the present invention can simultaneously satisfy the large area display, the simple display method, the continuous hue implementation, the use in the flexible display region and the display of the low power consumption.

Moreover, the embodiments of the present invention can provide the display method and device having the excellent viewing angle characteristic and response time.

BRIEF DESCRIPTION OF THE DRAWINGS

The above and other objects and features of the present invention will become apparent from the following description of the preferred embodiments, given in conjunction with the accompanying drawings, in which.

DESCRIPTION OF THE PREFERRED EMBODIMENTS

Figure 1:
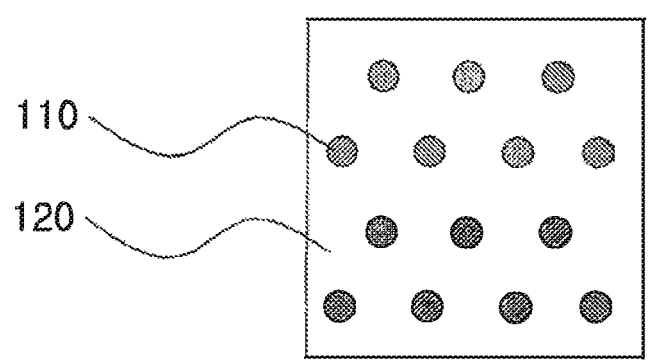
FIGS. 1 and 2 are views illustrating the configuration of particles contained in a display device in accordance with one embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different from one another, are not necessarily mutually exclusive. For example, a particular feature, structure and characteristic described herein in connection with one embodiment may be implemented within other embodiments without departing from the spirit and scope of the present invention. Also, it is to be understood that the locations or arrangements of individual elements in one embodiment may be changed without separating the spirit and scope of the present invention. When "in accordance with one embodiment" or "one embodiment" generally used in the specification appears, this is not to be construed that a shape, a structure, a characteristic, a method, a configuration, etc., described in the specific one embodiment are not necessarily applied to all the embodiments. In addition, it is not to be construed that the shape, structure, method, configuration, etc., described in the specific embodiment are applied only to the specific embodiment. In addition, the shape, structure, feature parts, characteristics, configuration, etc., used in the specific embodiments may be combined with other embodiments.

In addition, a singular form of a noun used in the specification does not exclude a presence of a plural form. Also, used herein, the word "comprising", "having" and "including" and inflected words thereof will be understood to imply the inclusion of stated constituents, steps, operations and/or elements but not the exclusion of any other constituents, steps, operations and/or elements. Further, a sequence of steps of a process used in the specification is not limited to one described in the specification but another sequence may also be present. Ordinal numerals used in the specification, "first", "second", "third", etc., is to differentiate components, modes or steps from one another and does not have the meaning of any sequence. In addition, the specific mode may be referred to as a first mode, a second mode or a third mode. For example, in the specification, the first mode indicates a photonic crystal reflection mode, but in claims, the first mode may be other modes other than the photonic crystal reflection mode. In addition, in the specification, the second mode may indicate the unique color reflection mode, but in claims, may be other mode other than the unique color reflection mode. This is also applied to the third mode. That is, in order to systemically describe the present invention, although the specification describes each mode using the first mode as the photonic crystal reflection mode, the second mode as the unique color reflection mode and the third mode as the transmittance tuning mode, the present invention is not limited to the description manner.

The following detailed description is, therefore, not to be taken in a limiting sense, and the scope of the invention is defined only by the appended claims that should be appropriately interpreted along with the full range of equivalents to which the claims are entitled. In the drawings, like reference numerals identify identical or like elements or functions through the several views.

Hereinafter, the configuration of the present invention will be described in detail with reference to the accompanying drawings so that those skilled in the art can easily carry out the present invention.

Configuration of Display Device

A display device according to an embodiment of the present invention can be selectively implemented so as to switch at least two of a first mode (photonic crystal reflection mode) for displaying a color of light reflected from photonic crystals composed of particles, a second mode (unique color reflection mode) for displaying a unique color such as particles, solvents, electrodes, etc., or a color of a solution due to a scattering of particles and a third mode (transmittance tuning mode) for displaying (that is, tuning the transmittance of light) the color of light with the tuned transmittance to each other within a display region of the display device or the same unit pixel of a display unit by applying an electric field through an electrode when particles are dispersed in a solvent and controlling at least one of the intensity, direction, application time, application frequency and application region of an electric field to control at least one of an interval, a location and an arrangement of particles. As can be appreciated from the following description, the unit pixel means a minimum display unit that can be independently controlled. That is, in the existing display method, a red cell, a green and a blue cell may form the single unit pixel. For example, three cells form the single unit pixel in the method implementing colors by a mixing of R, G and B colors. The present technology can implement continuous colors by independently controlling the single unit cell or the unit pixel, and therefore, unlike the existing method, it should be noted that the unit pixel in the specification means a minimum display unit, a display region or a display unit, which can be independently controlled.

Composition of Particles and Solvents

Figure 2:
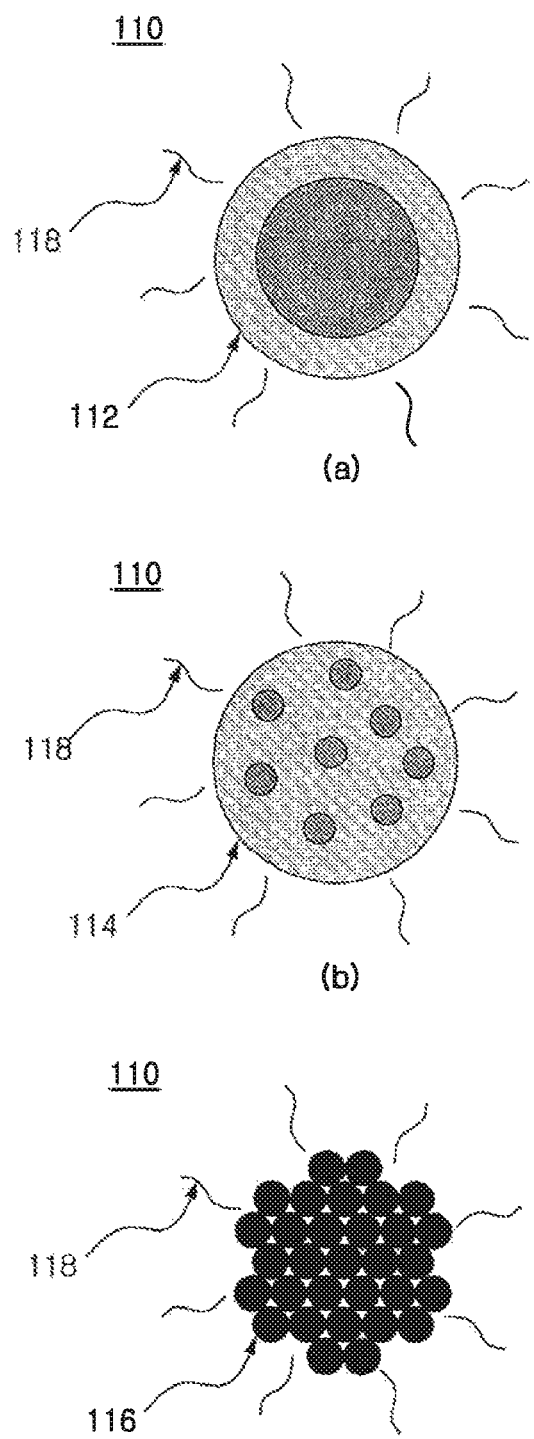

FIGS. 1 and 2 are views illustrating the configuration of particles contained in a display device in accordance with one embodiment of the present invention.

First, referring to FIG. 1, particles 110 in accordance with one embodiment of the present invention may be present in a solution state by being dispersed in a solvent 120. In accordance with one embodiment of the present invention, the particles 110 may have positive charges or negative charges. Therefore, when electric field is applied to the particles 110, the particles 110 may be moved (that is, electrophoresis) due to electrical attraction generated by electric charges and electric field of the particles 110. In addition, when particles 110 has electric charges of the same sign, particles 110 may be arranged with a predetermined interval without contacting each other due to electrical repulsion (coulomb repulsion) therebetween by the electric charges of the same sign. In addition, in accordance with one embodiment of the present invention, the particles 110 are coated in a polymer chain form, etc., which may be resulted in a steric effect due to a chaotic motion, etc., of an inter-particle polymer chain. Therefore, particles 110 may be arranged with a predetermined interval without contacting each other due to the inter-particle steric effect.

Referring to FIG. 2, the particles 110 in accordance with one embodiment of the present invention may have a core-shell 112 configuration made from different types of materials as shown in FIG. 2(a), a multi-core 114 configuration made from different kinds of materials as shown in FIG. 2(b), or a cluster structure 116 made from a plurality of nano-particles as shown in FIG. 2(c), wherein a charge layer 118 having electric charges or a layer 118 indicating the steric effect described above may be configured to have a structure enclosing the particles. The particles in accordance with one embodiment of the present invention is not limited to the structure and therefore, one embodiment of the present invention may use various particles and forms such as a structure in which a heterogeneous material is permeated or immersed into core particles, a raspberry structure, etc., and may also use a cavity structure such as a reverse photonic crystal structure.

More specifically, the particles 110 in accordance with one embodiment of the present invention may be made of elements, such as silicon (Si), titanium (Ti), barium (Ba), strontium (Sr), iron (Fe), nickel (Ni), cobalt (Co), lead (Pb), aluminum (Al), copper (Cu), silver (Ag), gold (Au), tungsten (W), molybdenum (Mo), zinc (Zn), zirconium (Zr) or a compound such as oxide, nitride, etc., including the same. Also, the particles 110 in accordance with one embodiment of the present invention may be made of organic polymers including at least one monomer of styrene, pyridine, pyrrole, aniline, pyrrolidone, acrylate, urethane, thiophene, carbazole, fluorene, vinylalcohol, ethylene glycol and ethoxy acrylate or polymer materials such as PS (polystyrene), PE (polyethylene), PP (polypropylene), PVC (polyvinyl chloride) and PET (polyethylene terephthalate).

In addition, the particles 110 in accordance with one embodiment of the present invention may be made by coating particles or a cluster having no electric charge with a material having electric charges. Examples of these particles may include particles whose surfaces are processed (or coated) with an organic compound having a hydrocarbon group; particles whose surfaces are processed (or coated) with an organic compound having a carboxylic acid group, an ester group and an acyl group; particles whose surfaces are processed (or coated) with a complex compound containing halogen (F, Cl, Br, I, etc.) elements; particles whose surfaces are processed (coated) with a coordination compound containing amine, thiol and phosphine; and particles having electric charges generated by forming radicals on the surfaces. As described above, the surface of the particles 110 is coated with materials such as silica, polymer, monomer, etc., such that the particles 110 may have high dispersibility and stability within the solvent 120.

Meanwhile, a diameter of the particles 110 may range from several nm to several hundred μm, but the diameter of the particles is not necessarily limited thereto. When the particles are arranged at a predetermined distance by the external electric field, the size of the particles is set to be able to include the photonic crystal wavelength band of the visible spectrum by the Bragg's law in connection with the refractive index of the particles and the refractive index of the solvent.

Meanwhile, in accordance with one embodiment of the present invention, the particles 110 may be configured to have a unique color, thereby reflecting light having a specific wavelength. More specifically, the particles 110 in accordance with one embodiment of the present invention may have a specific color through an oxidation state control or a coating such an inorganic pigment, pigment, etc. For example, as the inorganic pigments coated on the particles 110 in accordance with one embodiment of the present invention, Zn, Pb, Ti, Cd, Fe, As, Co, Mg, Al, etc., including chromophore may be used as a form of oxide, emulsion and lactate and as the dyes coated on the particles 110 in accordance with one embodiment of the present invention, a fluorescent dye, an acid dye, a basic dye, a mordant dye, a sulfur dye, a vat dye, a disperse dye, a reactive dye, etc., may be used. In addition, in accordance with one embodiment of the present invention, the particles 110 may be made of a material having a specific structural color so as to display the specific colors. For example, the particles such as oxide silicon ($SiO_x$), oxide titanium ($TiO_x$), etc., are configured to be uniformly arranged in media having different refractive indices at a predetermined distance so as to reflect light having a specific wavelength.

Further, in accordance with one embodiment of the present invention, the solvent 120 may also be configured to reflect light having a specific wavelength, that is, a unique color. More specifically, the solvent 120 in accordance with one embodiment of the present invention may include materials having inorganic pigments, dyes or materials having a structural color by the photonic crystal.

In addition, in accordance with one embodiment of the present invention, the particles or the solvent include at least one of fluorescent materials, phosphor materials, luminous materials, etc., thereby maximizing the effects of one embodiment of the present invention.

In accordance with one embodiment of the present invention, in order to secure colloidal stability of the particles 110 by uniformly dispersing the particles 110 in the solvent 120, surfactants such as dispersants, etc., may be added to the solvent 120 so that the particles 110 are stably dispersed within the solvent 120 or a difference in a specific gravity between the particles 110 and the solvent 120 may be a predetermined value or less. Further, the viscosity of the solvent 120 may be a predetermined value or more, or a value of electrokinetic potential (that is, zeta potential) of a collide solution composed of the particles 110 and the solvent 120 may be a predetermined value or more.

In addition, in accordance with one embodiment of the present invention, in order to increase the intensity of reflected light in a visible light region generated through a predetermined arrangement of the particles 110 within the solvent 120 when an electric field is applied, a difference in refractive indices between the solvent 120 and the particles 110 may be a predetermined value or more and the size of the particles 110 may be set to be the size of the particles of the photonic crystal wavelength band of the visible light region in connection with the refractive index of the particles and the refractive index of the solvent by the Bragg's Law.

For example, an absolute value of the electrokinetic potential of the collide solution may be 10 mV or more, the difference in specific gravity between the particles 110 and the solvent 120 may be 5 or less, and the difference in the refractive index between the particles 110 and the solvent 120 may be 0.3 or more, and the size of the particles may be a range from 100 nm to 500 nm, but are not limited thereto.

Inter-Particle Attraction: Electrical Polarization Characteristic

In addition, in accordance with one embodiment of the present invention, the solution including the solvent, in which the particles included in the display device are dispersed, may have variable electrical polarization characteristic, which is a characteristic that an amount of electrical polarization varies when the electric field is applied. In the electrical polarization characteristic of the solution, at least one of the particles or the solvent configuring the solution may indicate the electrical polarization characteristic or the electrical polarization characteristic may occur due to the interaction between the particles and the solvent within the solution. Further, the solution (composed of the particles and solvent) indicating the electrical polarization characteristic may include a material which is electrically polarized with any one of electronic polarization, ionic polarization, interfacial polarization or rotational polarization due to asymmetrical charge distribution of atoms or molecules as an external electric field is applied.

Therefore, at least one of the particles or the solvent or the solution composed thereof in accordance with one embodiment of the present invention may cause the electrical polarization when the electric field is applied and the induced electrical polarization may be changed as the intensity or direction of applied electric field is changed. The characteristics of changing the electrical polarization according to the change in the electric field may be the variable electrical polarization characteristic. In one embodiment of the present invention, it is more preferable to increase the electrical polarization induced when the electric field is applied. The reason is that the inter-particle distances may be more uniformly arranged by more greatly applying the inter-particle interaction force by the electrical polarization of at least one of the particles, the solvent and the solution.

Figure 3:
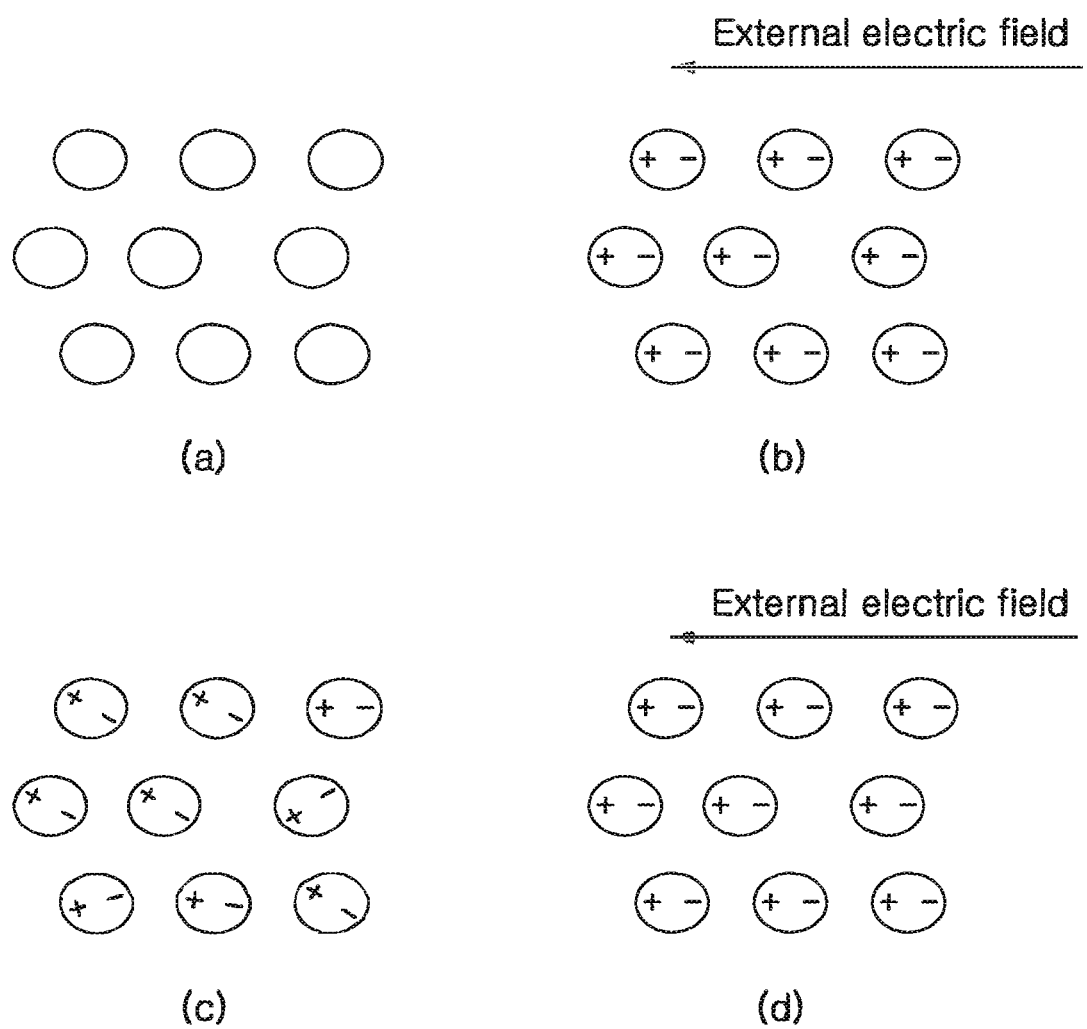
FIG. 3 is a view illustrating the configuration of polarization of particles or solvent upon application of an electric field in accordance with one embodiment of the present invention.

FIG. 3 is a view illustrating the configuration of polarization of particles or solvent upon application of an electric field in accordance with one embodiment of the present invention.

Referring to FIGS. 3(a) and 3(b), when the external electric field is not applied, the particles or the solvent maintains an electrical equilibrium state, such that the electrical polarization characteristic is not shown, but when the external electric field is applied, the polarization is induced as the electric charges within the particles or the solvent moves in a predetermined direction, such that the particles or the solvent may be polarized. FIGS. 3(c) and 3(d) show the case in which unit polarization is generated by electrically asymmetric components composing the particles or the solvent. If no external electric field is applied, the unit polarization is arranged chaotically, such that the whole electrical polarization is not shown or shows a small value. Whereas, if the external electric field is applied, the particles or the solvent having the unit is polarization may be re-arranged in a predetermined direction along the direction of the external electric field and, thus, may show a relatively large polarization value as compared with the case of FIG. 3(b) where the electric field is applied when the unit polarization is not generally present. In accordance with one embodiment of the present invention, the unit polarization shown in FIGS. 3(c) and 3(d) may occur in the asymmetrical arrangement of electrons or ions or the asymmetrical structure of molecules. When no external electric field is applied, a very small remnant polarization value may be shown as well due to this unit polarization.

Figure 4:
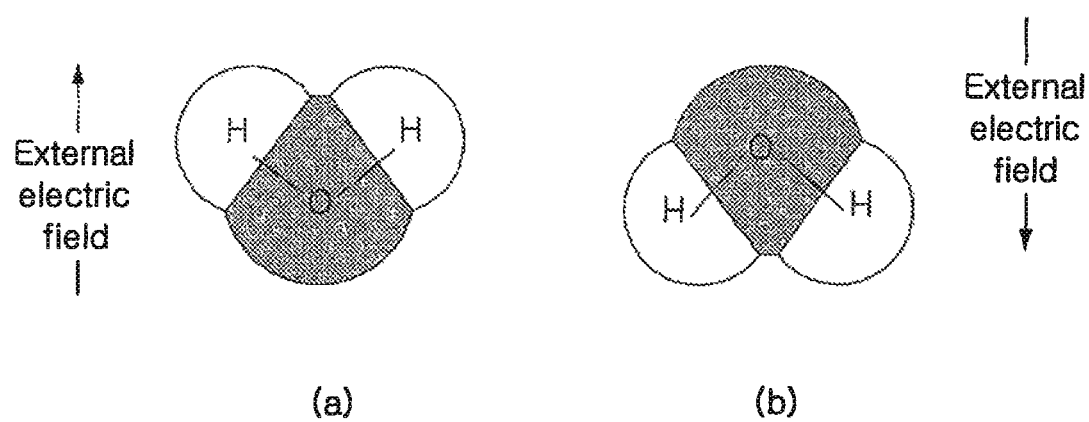
FIG. 4 is a view illustrating unit polarization characteristic exhibited by the asymmetrical arrangement of molecule in accordance with one embodiment of the present invention.

FIG. 4 is a view illustrating unit polarization characteristic exhibited by the asymmetrical arrangement of molecule in accordance with one embodiment of the present invention. More specifically, FIG. 4 illustrates the case of water molecules (H2O). In addition to the water molecules, trichloroethylene, carbon tetrachloride, di-iso-propyl ether, toluene, methyl-t-bytyl ether, xylene, benzene, diethyl ether, dichloromethane, 1,2-dichloroethane, butyl acetate, iso-propanol, n-butanol, tetrahydrofuran, n-propanol, chloroform, ethyl acetate, 2-butanone, dioxane, acetone, methanol, ethanol, acetonitrile, acetic acid, dimethylformamide, dimethyl sulfoxide, propylene carbonate, N,N-Dimethylformamide, Dimethyl Acetamide, N-Methylpyrrolodone, etc., may be employed as the material constituting the particles or solvent because they represent the unit polarization characteristic due to the asymmetry of a molecular structure. For reference, the polarity index used to compare the polarization characteristics of materials is an index that shows the relative degree of polarization of a given material with respect to the polarization characteristic of water ($H_2O$). In accordance with one embodiment of the present invention, the solvent may include materials whose polarity index is 1 or more.

Figure 5:
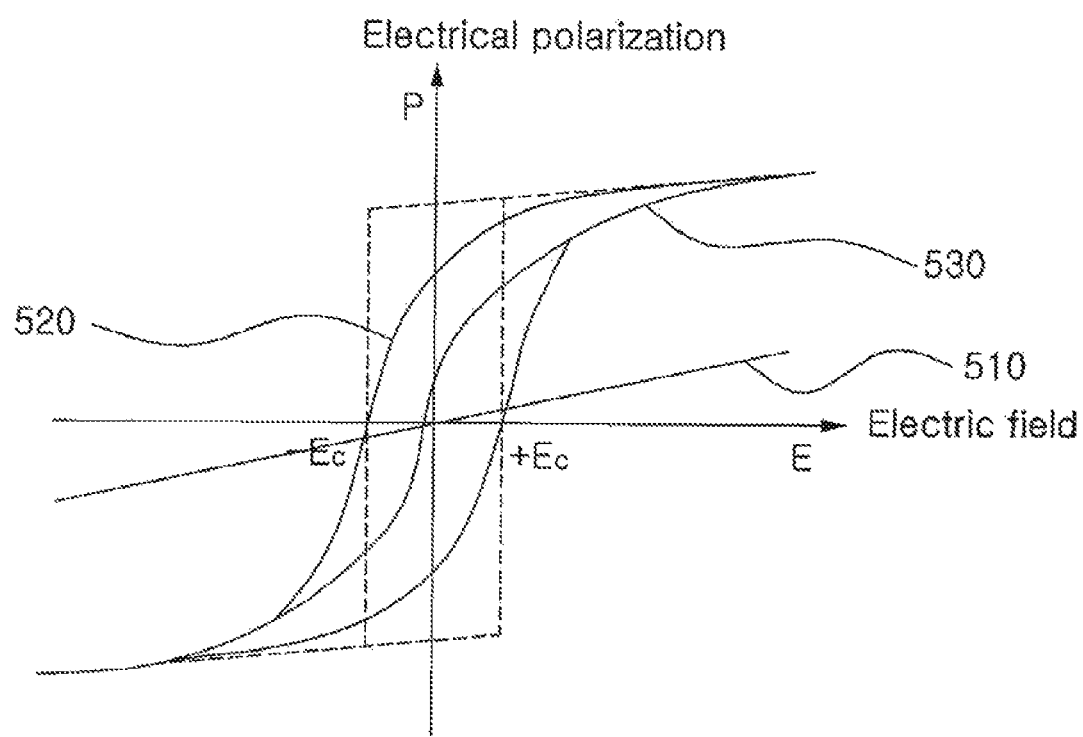
FIG. 5 is a view illustrating hysteresis curves of a paraelectric material, a ferroelectric material and a superparaelectric material.

Moreover, the particles or solvent in accordance with one embodiment of the present invention may include a ferroelectric material, which shows a large increase in polarization by further causing the electrical polarization of ions or atoms upon application of an external electric field, a remnant polarization even without the application of an external electric field, and remnant hysteresis along the application direction of the electric field. The particles or solvent may include a superparaelectric material, which shows a large increase of polarization by further causing the polarization of ions or atoms upon application of an external electric field but shows no remnant polarization and no remnant hysteresis when no external electric field is applied. Referring to FIG. 5, it can be seen that there are hysteresis curves which are obtained according to the external electric fields of a paraelectric material 510, the ferroelectric material 520 and the superparaelectric material 530.

Further, the particles or solvent in accordance with one embodiment of the present invention may include a material having a perovskite structure. Examples of materials having a perovskite structure, such as $ABO_3$, may include materials such as $PbZrO_3$, $PbTiO_3$, $Pb(Zr,Ti)O_3$, $SrTiO_3$, $BaTiO_3$, $(Ba,Sr)TiO_3$, $CaTiO_3$, $LiNbO_3$, etc.

Figure 6:
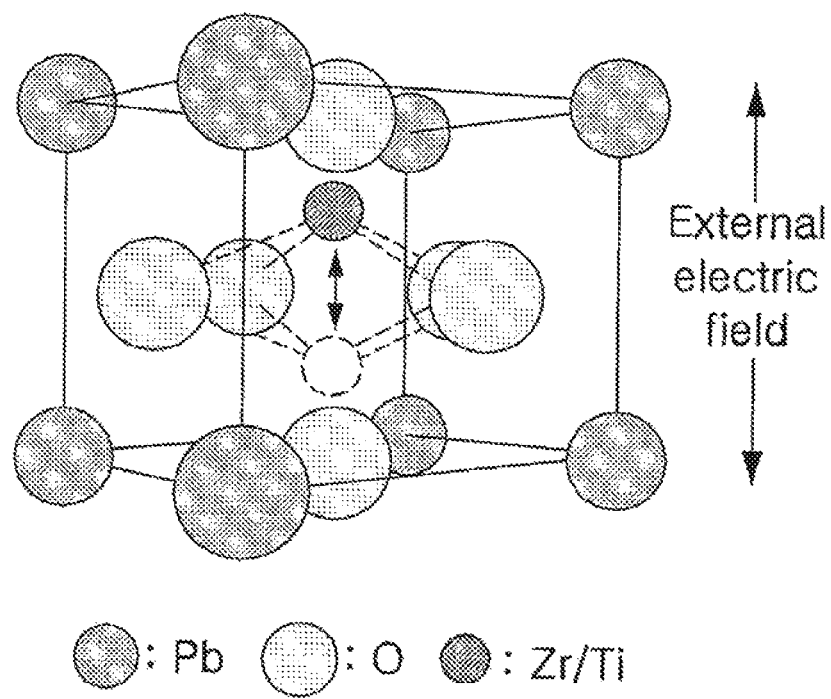
FIG. 6 is a view illustrating a material having a perovskite structure that may be included in the particles or the solvent in accordance with one embodiment of the present invention.

FIG. 6 is a view illustrating a material having a perovskite structure that may be included in the particles or solvent in accordance with one embodiment of the present invention. Referring to FIG. 6, the location of Zr (or Ti) in PbZrO3 (or $PbTiO_3$)(i.e., B in an $ABO_3$ structure) may vary with the direction of the external electric field applied to $PbZrO_3$ (or $PbTiO_3$), and thus, the overall polarity of $PbZrO_3$ (or $PbTiO_3$) may be changed. Therefore, the asymmetrical electron distribution is formed by a movement of atoms or ions so that unit polarization may be formed. When the unit polarization is present, a larger variable electrical polarization value may be induced when the external electric field is applied, as compared with the case in which only the electron polarization is present.

In addition, in accordance with one embodiment of the present invention, the reflected light tuning and transmittance tuning effect of one embodiment of the present invention may be maximized as the inter-particle arrangement is better. Therefore, the effect of one embodiment of the present invention may be maximized by using a fluid showing an electro-rheology (ER) characteristic by dispersing the fine particles in an insulator fluid or a fluid showing a giant electro-rheology (GER) such as ferroelectric particles coated with an insulator.

In addition, in describing an aspect of the electrical polarization, as a first example, at least one of each molecule and each particle of the solvent does not any electrical polarization when the electric field is not applied, but at least one of each molecule and each particle of the solvent is electrically polarized when the electric field is applied. Thereby, at least one of a total of electric polarization of particles and a total electric polarization of the solvent may be increased. In a second example, when the electric field is not applied, at least one of each molecule and each particle of the solvent is electrically polarized, but at least one of the total of electrical polarization of the solvent and the total electrical polarization of particles becomes zero and when the electric field is applied, at least one of the total of electric polarization of particles and the total of electric polarization of the solvent may be increased. In a third example, when the electric field is not applied, at least one of each molecule and each particle of the solvent is electrically polarized and at least one of the total of electrical polarization of the solvent and the total electrical polarization of particles has a first value, which is not zero, and when the electric field is applied, at least one of the total of electric polarization of particles and the total of electric polarization of the solvent may have a second value larger than the first value.

Inter-Particle Repulsion: Coulomb Effect or Steric Effect in accordance with one embodiment of the present invention, the surfaces of the particles included in the display device are charged with electric charges of the same sign such that coulomb repulsion is formed on the particles or the surfaces of the particles are provided with a steric structure, etc., such as a polymer chain structure, a functional group, a surfactant, etc., thereby forming the steric hindrance repulsion.

In addition, in accordance with one embodiment of the present invention, in order to maximize the inter-particle repulsion, the coulomb repulsion and the steric hindrance repulsion may also be simultaneously induced by charging the particles with electric charges of the same sign and coating the particles in the steric structure form.

Further, in accordance with one embodiment of the present invention, the particles include electrically polarized materials. As a result, an electrophorectic effect may be minimized due to the weakly charged charges although the inter-particle steric hindrance repulsion is present through the particle surface treatment, such that the particles or the solution has the electrical polarization changed according to the external electric field, thereby effectively generating the inter-particle short range attraction and the inter-particle short range steric hindrance repulsion is effectively generated by the steric structure formed through the particle surface treatment. Further, it becomes possible to minimize a phenomenon that the particles charged by the long range electrophorectic force due to the external electric field are collected to the electrode. That is, the electric charges on the surface of the particles are not treated, such that the electrophorectic phenomenon of collecting the particles to any one electrode by the external electric field may be minimized. In order to give the steric hindrance repulsion, an organic ligand may be treated on the surface of the particles. Further, in accordance with one embodiment of the present invention, in order to prevent the phenomenon that the particles charged by the electrophoresis are collected to the electrode when the charged particles are used, a combination of AC voltage rather than DC voltage may also be used.

However, a composition of the particles and solvent in accordance with one embodiment of the present invention is not limited to the above list and therefore, but may be appropriately changed within the range capable of achieving the objects of the present invention, that is, the range in which the inter-particle distances may be controlled by the electric field.

For example, in order to maximize the effects of the present invention, opaque is increased by increasing the difference in the refractive indices between the particles and the solution in which the particles are dispersed to maximize the scattered reflection (scattering) when voltage is not applied and the reflectance of the structural color may be increased when the structural color is exhibited by applying voltage. Generally, since the refractive index of the fluid has no large difference according to a type, a method for maximizing the refractive index of the particles is effective and the particles may be manufactured by a raspberry structure or a core/shell structure, etc. in which at least two of different materials are combined, thereby maximizing both of the above-mentioned refractive index effect and the repulsion effect.

Operating Principle and Configuration of First Mode (Photonic Crystal Reflection Mode)

The display device in accordance with one embodiment of the present invention applies the electric field through the electrode when particles are dispersed in the solvent and controls the inter-particle distances by controlling at least one of the intensity, direction, application frequency and application time of the electric field, thereby performing the first mode which variably displays the color of light reflected from the particle structure (that is, the photonic crystals formed by maintaining particles at the predetermined distance). Hereinafter, the operating principle and configuration of the first mode of the display device in accordance with one embodiment of the present invention will be described in detail. In the specification and claims, the first mode may often be referred to as a photonic crystal reflection mode. Meanwhile, in the specification, the transmitted light may also be present in the reflection mode (the photonic crystal reflection mode and the unique color reflection mode (corresponding to a second mode to be described later)). However, in one embodiment of the present invention, since the reflected light predominantly generated in the reflection mode is used, the use of the transmitted light may be disregarded. In addition, since one primarily predominantly generated in the transmittance tuning mode that is the third mode to be described below is the transmitted light, the use of the primarily reflected light is also disregarded. That is, in the specification, it is apparent that the light predominantly generated in the corresponding mode is used. Further, as described above, in the claims, the first mode may be a mode different from the photonic crystal reflection mode. Thus, such a mode is for only the systematic description and therefore, the present invention is not limited thereto.

First, in accordance with a first embodiment of the first mode of the display device of the present invention, when particles having electric charges of the same sign or polarity are dispersed in a solvent having electrical polarization characteristic, if an electric field is applied to the dispersion including the particles and solvent containing the dispersed particles, electrical force proportional to the intensity of the electric field and the charge amount of the particles acts on the particles due to the electric charges of the particles. Therefore, particles move in a predetermined direction by electrophoresis, thus narrowing the inter-particle distances. Meanwhile, in contrast, electrical repulsion generated between the particles having the electric charges of the same sign or polarity increases as the inter-particle distances become smaller resulting in a predetermined equilibrium state while preventing the inter-particle distances from continuing to decrease. Therefore, particles may be regularly arranged at a predetermined distance. In addition, the solvent around the particles charged with electric charges is electrically polarized due to the electrical polarization characteristic and are affected to each other and the electric polarization of the solvent are arranged in the external electric field direction. Therefore, the particles charged with the electric charges locally interacted with the electrical polarization of the solvent may also be arranged in the direction of the external electric field. That is, the unit polarized solvent is arranged in a predetermined direction by the externally applied electric field and the charges of the peripheral particles. Therefore, the locally formed polarization region is formed based on the particles, such that the particles may be more regularly and stably arranged while maintaining the predetermined distance. In accordance with the first embodiment of the present invention, particles can be regularly arranged at distances where electrical attraction (electrophorectic force) induced by an external electric field, electrical force (coulomb repulsion) between the particles having electric charges of the same polarity, electrical attraction (coulomb attraction) induced by polarization, etc., are in equilibrium. According to the above principle, the inter-particle distances can be controlled at predetermined distance, and the particles arranged at predetermined distances can function as photonic crystals. Since the wavelength of light reflected from the regularly spaced particles is determined by the inter-particle distances, the wavelength of the light reflected from the particles can be arbitrarily controlled by controlling the inter-particle distances through the control of the external electric field. Here, a pattern of the wavelength of reflected light may be diversely represented by the factors, such as the intensity and direction of the applied electric field, the size and mass of the particles, the refractive indices of the particles and solvent, the charge amount of the particles, the electrical polarization characteristic of the solvent or the particles, the concentration of the particles dispersed in the solvent, etc.

Figure 7:
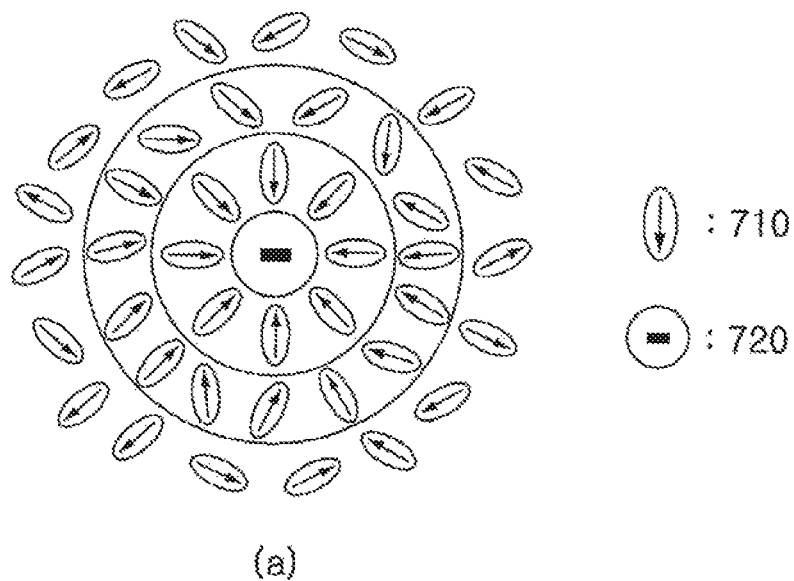
FIG. 7 is a view conceptually illustrating a configuration of controlling inter-particle distances in accordance with a first embodiment of a first mode of a display device of the present invention.
Figure 7:
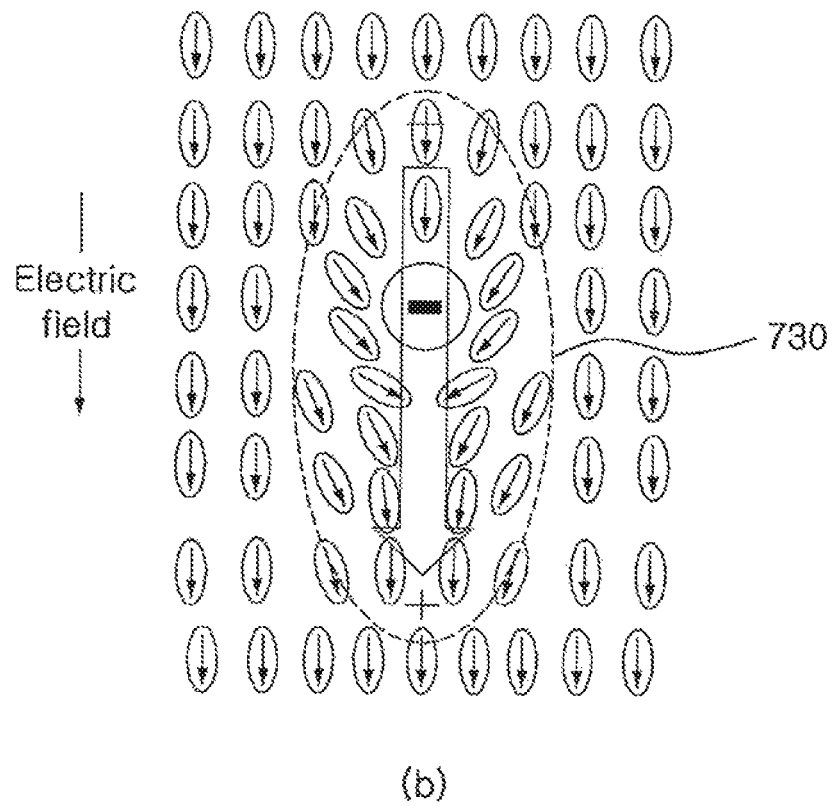

FIG. 7 is a view conceptually illustrating a configuration of controlling inter-particle distances in accordance with a first embodiment of a first mode of a display device of the present invention. Referring to FIG. 7, if no external electric field is applied, unit polarized solvent 710 near particles 720 having electric charges can be intensively arranged in the direction of the particles by interaction with the electric charges of the particles, and the unit polarized solvent 710 can be arranged more chaotically or randomly as its distance from the charged particles increases (See FIG. 7(*a*)). In addition, referring to FIG. 7, if an external electric field is applied, the unit polarized solvent 710 located in a region not affected by the electric charges of the particles 720 (i.e., a region far away from the particles 720) is re-arranged in the direction of the electric field and the charged particles 720 may be re-arranged by the affect of the rearranged solvent. That is, the unit polarized solvent 710 located in a region strongly affected by electrical attraction induced by the particles charged with the electric charges (i.e., a region closed to the particles 720) can be arranged in a direction in which an anode or a cathode of the unit polarization is toward the particles 720 by interaction the electrical attraction induced by the electric charges of the particles 720. As such, the region where the unit polarization solvent 710 in the surrounding region of the particles 720 is arranged toward the particles 720, i.e., a polarization region 730, acts like one large, electrically polarized particles, and thus, can interact with other large polarization regions, thereby enabling the particles 720 having electric charges to be regularly arranged while maintaining a predetermined interval or space therebetween (See FIG. 7(*b*)). Although FIG. 7 shows a solvent having a remnant polarization, a solvent having the electrical polarization characteristic induced by the application of the electric field even when no remnant electrode is may be also applied.

Next, in accordance with a first embodiment of the first mode of the display device of the present invention, when particles having electric charges of the same sign or polarity are dispersed in a solvent having electrical polarization characteristic, if an electric field is applied to the dispersion including the particles and solvent containing the dispersed particles, electrical force proportional to the intensity of the electric field and the charge amount of the particles acts on the particles due to the electric charges of the particles. Therefore, particles move in a predetermined direction by electrophoresis, thus narrowing the inter-particle distances. Meanwhile, in contrast, electrical repulsion generated between the particles having the electric charges of the same sign or polarity increases as the inter-particle distances become smaller, resulting in a predetermined equilibrium state while preventing the inter-particle distances from continuing to decrease. Therefore, particles may be regularly arranged at a predetermined distance. In addition, the particles showing the electrical polarization characteristic are polarized by the electric field and are thus polarized in the direction of the electrical field, and thus, the electrical attraction is locally generated among the plurality of polarized particles, such that the particles may be more regularly and stably arranged while maintaining the predetermined distance. That is, in accordance with the aforementioned embodiments of the display device of the present invention, particles can be regularly arranged at distances where the electrical attraction (electrophorectic force) induced by an external electric field, electrical repulsion (coulomb repulsion) between the particles having electric charges of the same sign, the electrical attraction (coulomb attraction) induced by polarization are in equilibrium. According to the above principle, the inter-particle distances can be controlled at a predetermined distance, and the particles arranged at predetermined distances can function as photonic crystals. Since the wavelength of light reflected from the regularly spaced particles is determined by the inter-particle distances, the wavelength of the light reflected from the particles can be arbitrarily controlled by controlling the wavelength of light reflected from particles according to control of the inter-particle distances. Here, a pattern of the wavelength of reflected light may be diversely represented by the factors, such as the intensity and direction of the applied electric field, the size and mass of the particles, the refractive indices of the particles and solvent, the charge amount of the particles, the electrical polarization characteristic of the particles and solvent, the concentration of the particles dispersed in the solvent, etc.

Figure 8:
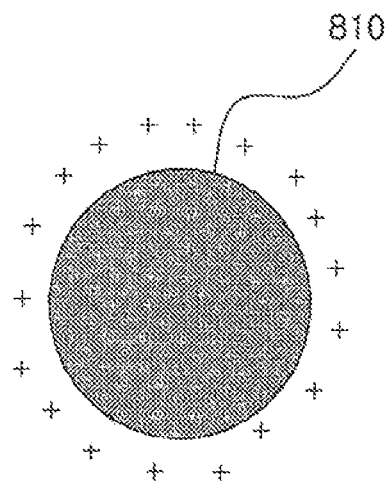
FIG. 8 is a view conceptually illustrating a configuration of controlling inter-particle distances in accordance with a second embodiment of the first mode of the display device of the present invention.
Figure 8:
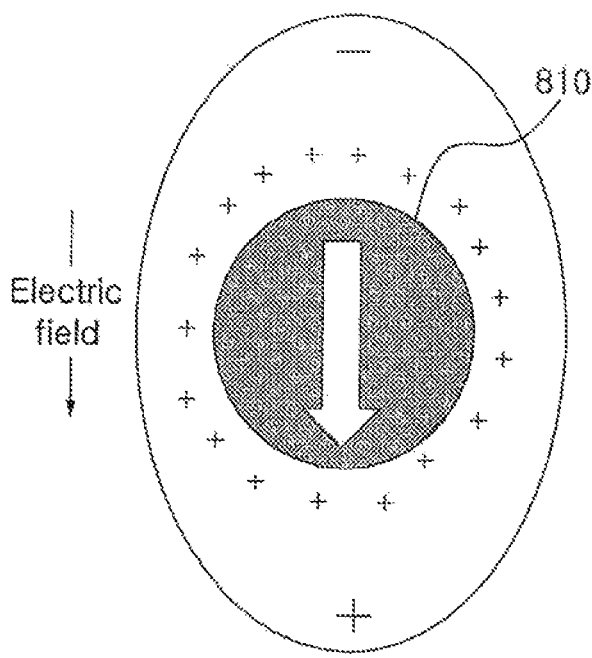

FIG. 8 is a view conceptually illustrating a configuration of controlling inter-particle distances in accordance with a second embodiment of the first mode of the display device of the present invention. Referring to FIG. 8, if no external electric field is applied, particles 810 are not polarized (see FIG. 8(*a*)). If an external electric field is applied, the particles 810 can be electrically polarized due to the electrical polarization characteristic of the material in the particles 810. Accordingly, the particles 810 can be regularly arranged while maintaining a predetermined interval or space therebetween (see FIG. 8(*b*)).

In the first and second embodiments of the present invention, the greater the electrical polarization value of the solvent or particles, the higher the degree of interaction between the polarization regions 730 or between the polarized particles 810, thereby enabling the particles to be more regularly arranged. FIG. 8 shows the particles having no remnant polarization. However, it may be also applied to the particles having the electrical polarization characteristic changed by the application of the electric field even when the remnant polarization is present.

Figure 9:
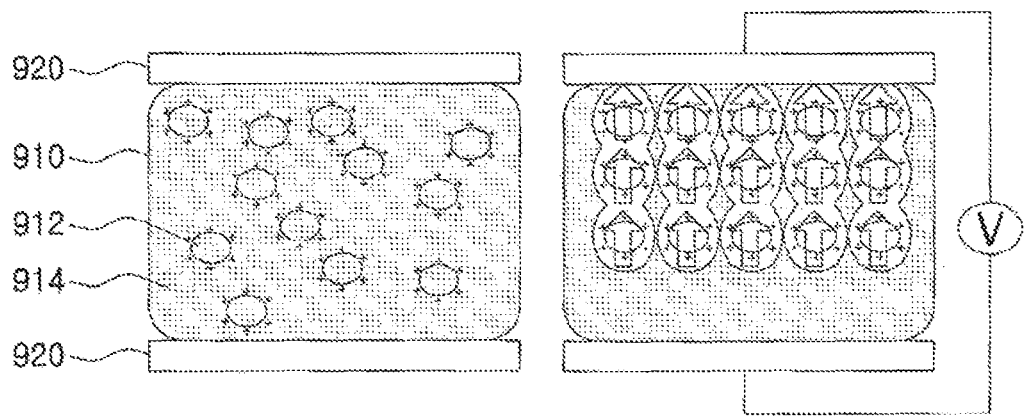
FIGS. 9 and 10 each are views conceptually illustrating the configuration of the display device accordance with the first and second embodiments of the first mode of the display device of the present invention.
Figure 10:
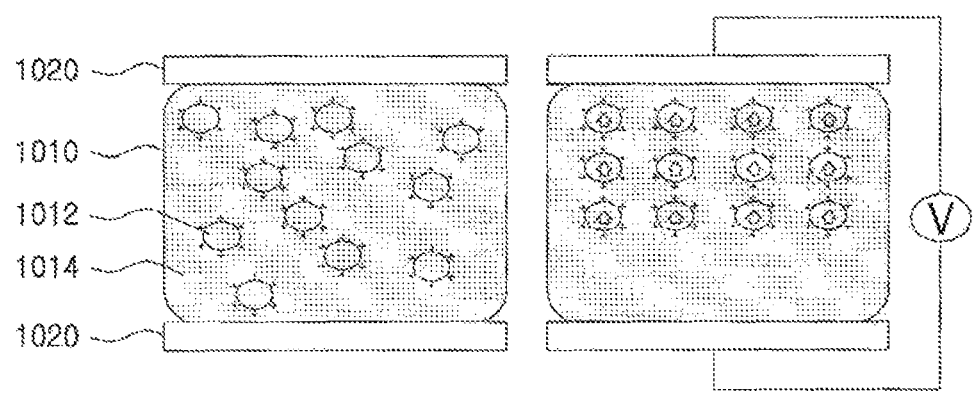

Meanwhile, FIGS. 9 and 10 conceptually illustrate the configuration of the display device in accordance with one embodiments of the first mode of the display device in accordance with one embodiment of the present invention. The embodiments of the first mode of the display device of the present invention were described in detail with reference to FIGS. 7 and 8 and therefore, the additional description of FIGS. 9 and 10 will be described.

Although the embodiment of the first mode as described above describes the case in which the particles or the solvent has the electrical polarization characteristic, it is to be noted that the particles or the solvent in accordance with one embodiment of the present invention does not necessarily have the electrical polarization characteristic. That is, if the particles have electric charges even when the particles or the solvent does not have the electrical polarization characteristic, particles can be regularly arranged at distances where the electrical attraction due to the external electric field and the electrical repulsion between particles having electric charges of the same sign are in an equilibrium state. As such, the plurality of regularly arranged particles may form the photonic crystals that reflect light having any wavelength.

In the first mode of the present invention, although the inter-particle distances may be constantly maintained by the equilibrium of attraction and repulsion acting on the particles according to the external electric field as described above, the arrangement of the particles in accordance with the present invention may be three-dimensionally shown in short range ordering rather than long range ordering since the attraction and the repulsion may effectively act between particles in the short range but the interaction force cannot effectively act between the particles above the predetermined distance. In addition, the reflected light that is reflected due to the set of the short range ordering having finely different orientation may show the reflected light characteristics with greatly improved viewing angle dependency as compared with the photonic crystal light reflected by the existing typical photonic crystal arrangement. In addition, although the embodiment of the first mode as described above describes the case in which the particles have electric charges, it is to be noted that the particles in accordance with the present invention does not necessarily have electric charges. That is, if the particles have the electric polarization characteristic and have the steric structure that generates the steric hindrance repulsion even when the particles do not have the electric charges, particles may be regularly arranged at distances where the electrical attraction between the adjacent particles due to the electrical polarization induced by an external electric field and the repulsion due to the steric effect are in an equilibrium state. As such, the plurality of regularly arranged particles may form the photonic crystals that reflect light having any wavelength. In other words, if particles exhibit the mutual steric effect, the electrostatic attraction acting between the particles by the variable electrical polarization characteristic and the steric hindrance repulsion acting between the particles acts on each other according to the application of the electric field, such that the inter-particle distances reach a specific range. Further, the light having the specific wavelength is reflected from particles as the inter-particle distances reach the specific range, thereby implementing the specific hue.

Figure 11:
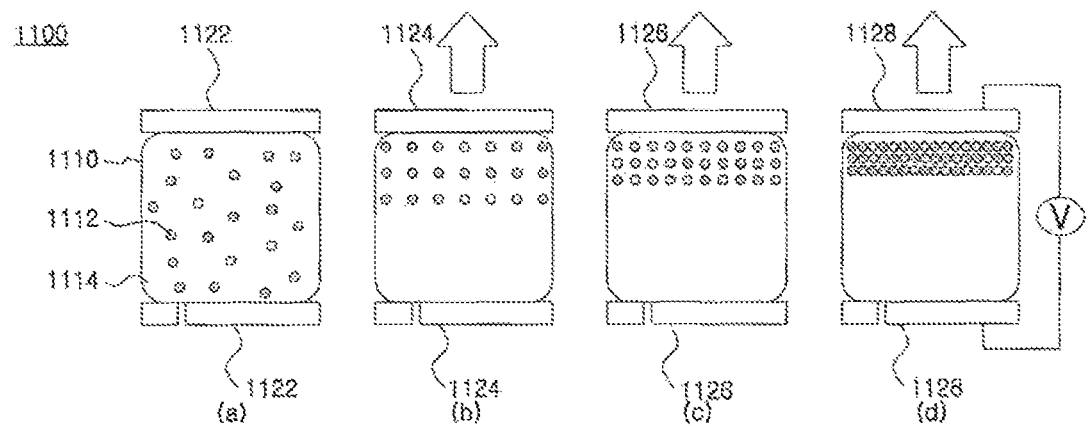
FIG. 11 is a view exemplarily illustrating the configuration of the first mode in accordance with one embodiment of the present invention.

FIG. 11 is a view exemplarily illustrating the configuration of the first mode in accordance with one embodiment of the present invention. Referring to FIG. 11, as the intensity of applied electric field is increased, the inter-particle distances of the particles 1112 becomes narrow, and thus, the wavelength of light reflected from the photonic crystals composed of the particles 1112 may become short. Therefore, the wavelength range of light reflected from the particles 1112 may be continuously controlled by controlling the intensity and direction of the electric field. Meanwhile, FIG. 11 shows a case in which a lower electrode is divided into a large electrode and a small electrode, but the present invention is not limited thereto and therefore, the lower electrode may be integrally formed. That is, the electrode may be divided or integrated according to each embodiment. It can be understood based on the following description that the electrode may need to be integrated and the electrode may need to be divided in some mode switching embodiments. For reference, in case of one specific mode switching, since the embodiment of the present invention switches modes in the same unit pixel, it is apparent that the structure of the corresponding electrode is not changed.

Further, the voltage applied to implement the first mode may be DC voltage or AC voltage or AC voltage including DC components. Both of the electrical polarization characteristic or the variable electrical polarization characteristic as described above may be generated when the AC voltage or DC voltage is applied. In particular, when the DC voltage is applied to the charged particles, the particles charged by the electrophoresis moves to the electrode applied with opposite electric charges, and thus, the electric charges are concentrated to the electrode. As a result, the particles are subjected to the gradually changing electrophorectic force since the screen phenomenon induced by the concentrated electric charges affects other particles. Consequently, the particles may be maintained at a gradually changing distance in the direction of the electric field and have short range regularity rather than long range regularity, thereby configuring the display unit having the excellent viewing angle. The viewing angle characteristics will be described below.

In addition, the drawings of the present invention show that the particles are chaotically dispersed to show the solution color when voltage is not applied. However, if the concentration of the particles is higher than the predetermined value and the inter-particle interaction force is sufficient even when the voltage is not applied, then the specific distance may be maintained by the inter-particle interaction without applying the voltage.

Operating Principle and Configuration of Second Mode (Unique Color Reflection Mode)

In accordance with a display device of a second mode of the present invention, a location of particles can be controlled by applying an electric field through an electrode when the particles are dispersed in a solvent and controlling at least one of the intensity, direction, application time, application frequency and application region of the electric field, such that a color of a solution or a color of an electrode is variably displayed due to a unique color or a holding color of the particles or the solvent or the light scattering of the particles. However, in the specification and claims, when the electrode is a transparent electrode, the electrode color indicates a color that is shown by a material under the transparent electrode and second mode may be referred to as a unique color reflection mode or a holding color reflective mode. In this case, the unique color may mean a color reflected when a material of the particles, the solvent or the electrode irradiates white light.

The second mode of the display device in accordance with one embodiment of the present invention may be implemented by moving the particles having electric charges by using electrophoresis (EP) or moving the particles having predetermined dielectric constant different from the solvent by using dielectrophoresis (DEP). The electrophoresis and dielectrophoresis phenomenon may be more efficiently generated when DC voltage is applied to the dispersed solvent.

First, the embodiment implementing the second mode of the display device in accordance with the present invention using the electrophoresis will be described below.

First, in accordance with the second mode of the display device in accordance with the present invention, when particles having electric charges of the same sign or polarity are dispersed in a solvent, if an electric field is applied to the dispersion including the particles and solvent containing the dispersed particles, electrical attraction proportional to the intensity of the electric field and the charge amount of the particles acts on the particles due to the electric charges of the particles. Therefore, particles move in a predetermined direction by electrophoresis. In this case, when voltage is locally applied only to a portion of the electrode or voltage of a predetermined voltage or more is applied thereto, particles do not form the photonic crystals as in the first mode and moves toward the local area of the electrode applying the electric field.

Figure 12:
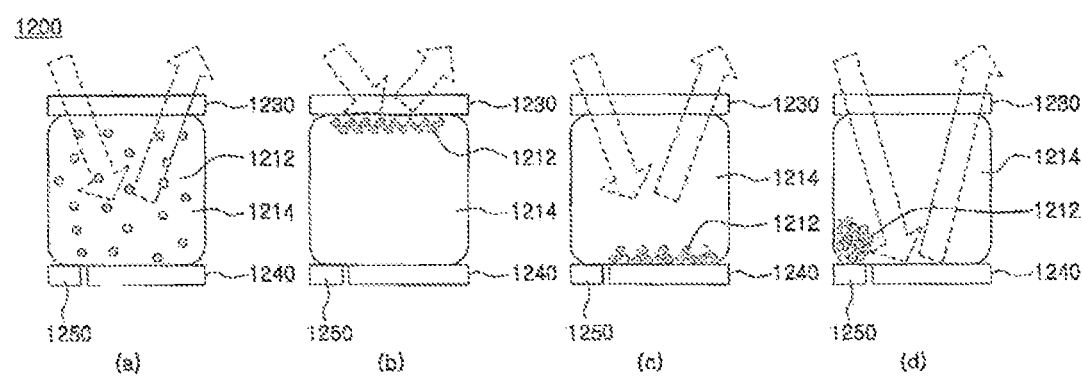
FIG. 12 is a view exemplarily illustrating a configuration of a second mode of the display device in accordance with one embodiment of the present invention.

FIG. 12 is a view exemplarily illustrating a configuration of a second mode of the display device in accordance with one embodiment of the present invention.

Referring to FIG. 12, when the electric field is not applied, the particles are irregularly dispersed in the solvent, and thus, the color of the solution in which the unique colors of the particles and solvent are mixed may be displayed (see FIG. 12($a$)) (that is, referred to as the solution color reflection mode in which the color of the color is indicated by the light scattering by the particles); the particles 1212 move toward an observer, that is, an upper electrode 1230, and thus, the unique color of the particles 1212 may be displayed (see FIG. 12(*b*)) (referred to as the particle color reflection mode); the particles 1212 may move toward a first lower electrode 1240 (referred to as a large electrode) that is opposite to the observer and has a wide area, and thus, the unique color of the solvent 1220 may be displayed (see FIG. 12(*c*)) (referred to as the solvent color reflection mode) instead of displaying the unique color of the particles 1212; and the particles 1212 moves toward a second lower electrode 1250 (referred to as local electrode or small electrode) that is opposite to the observer and has a narrow area, and thus, the unique color of the first lower electrode 1240 may be displayed when the first lower electrode 1240 having a wide area is exposed (see FIG. 12(*d*)) (referred to as the electrode color reflection mode). When the first lower electrode 1240 is transparent, the color of the material under the lower electrode displayed through the transparent lower electrode is referred to as the electrode color. Meanwhile, FIG. 12 shows that the lower electrode is divided into the large electrode 1240 and the small electrode or a local electrode 1250, but in the solution color reflection mode, the particle color reflection mode and the solvent color reflection mode corresponding to FIGS. 12(*a*), 12(*b*) and 12(*c*), the lower electrode may be formed in the integrated structure. In addition, in the drawing, the small electrode or the local electrode 1250 are exaggeratedly shown for the convenience of explanation but is very small compared with the large electrode 1240 next thereto. Therefore, when being viewed from the top, it looks like that the large electrode covers all of the lower electrode. In addition, although the specification shows the configuration in which the lower electrode is divided into the large electrode and the small electrode, the configuration in which the upper electrode is divided into the large electrode and the small electrode may also be considered. For example, when the upper electrode is divided into the large electrode and the small electrode, the particle color reflection mode may be implemented by applying voltage to only the large electrode, or the electrode color reflection mode may be implemented only by applying voltage to only the small electrode. In other words, the embodiment implementing the unique color reflection mode of the present invention is not limited to FIG. 12 and therefore, may be diversely changed.

Next, the embodiment implementing the second mode of the display device in accordance with the present invention using the dielectrophoresis will be described below.

The dielectrophoresis phenomenon is a phenomenon that the non-charged dielectric particles disposed in the dielectric medium applied with the non-uniform electric field has an induced dipole moment and moves to the region in which a gradient of the electric field is large or small by the force applied to the dielectric particles by the difference between the dielectric constant of the dielectric particles and the dielectric constant of the dielectric medium. Therefore, the dielectric particles having the dielectric constant larger than the dielectric constant of the dielectric medium moves to the region in which the gradient of the electric field is large and the dielectric particles having the dielectric constant smaller than the dielectric constant of the dielectric medium moves to the region in which the gradient of the electric field is small.

Figure 13:
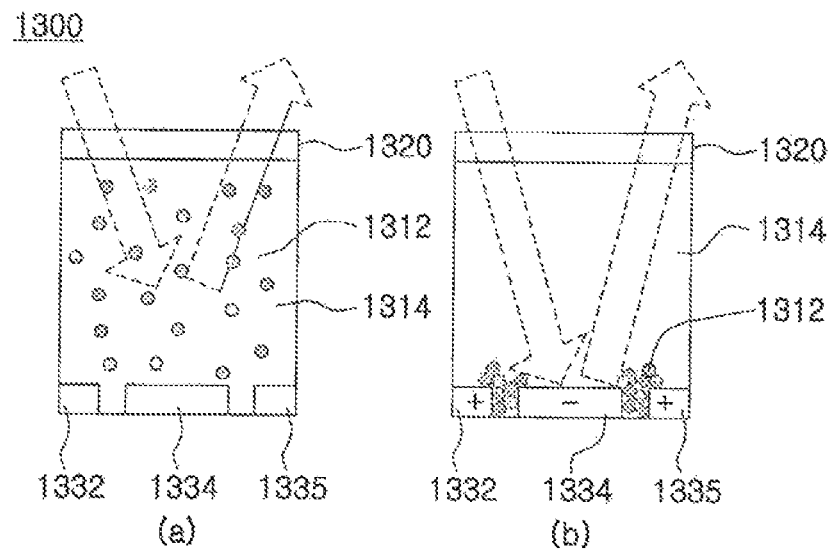
FIG. 13 is a view exemplarily illustrating the configuration of the second mode of the display device in accordance with one embodiment of the present invention.

FIG. 13 is a view exemplarily illustrating the configuration of the second mode of the display device in accordance with one embodiment of the present invention.

Referring to FIG. 13, it may be assumed that the dielectric constant of particles 1312 is larger than that of a solvent 1314 and the lower electrode is configured by being divided into first lower electrodes 1332 and 1335 and a second lower electrode 1334. Referring to FIG. 13(*a*), when voltage is not applied to the electrode, and thus, an electric field is not applied to the particles 1312 and the solvent 1314, since the particles 1312 is irregularly dispersed within the solvent 1314, the unique color of the solution may be displayed. Meanwhile, referring to FIG. 13(*b*), when voltage is applied to first lower electrodes 1332 and 1335 and a second lower electrode 1334, and thus, the first lower electrodes 1332 and 1335 are an electrode of a positive (+) sign and the second lower electrode 1334 is an electrode of a negative (−) electrode, the gradient of the electric field generated in the space between the first lower electrodes 1332 and 1335 and the second lower electrode 1334 is remarkably higher than the gradient of the electric filed generated in another region within the display unit, the particles 1312 moves by the dielectrophoresis so as to be concentrated in the space between the first lower electrodes 1332 and 1335 and the second lower electrode 1334, such that the unique color of the first lower electrodes 1332 and 1335 or the second lower electrode 1334 may be displayed.

Meanwhile, the first mode described above is operated by the principle of the photonic crystals that selectively reflect the light having the specific wavelength in light incident on the display device, such that it is not easy to implement complete white or black. Therefore, when using the combination of white or black particles, solvent or electrode in the second mode, white or black that is the unique color of the particles, solvent or electrode may be completely implemented, and thus, the disadvantage of the first mode as described above may be supplemented. More specifically, when using the white particles and the black electrode (in case the electrode material is black or the black material is located on the lower portion of the transparent lower electrode), white that is the particle color or black that is the electrode color may be selectively implemented within the same display region or the same unit pixel or the pixel according to the aforementioned mode switching.

Operating Principle and Configuration of Third Mode (Transmittance Tuning Mode)

In accordance with the third mode of the display device of the present invention, the transmittance of light transmitting at least one of the particles or the solvent may be tuned by applying an electric field through an electrode when particles are dispersed in a solvent and controlling at least one of the intensity, direction, application time, application frequency and application region of an electric field to control at least one of an interval, a location and an arrangement of particles. The third mode of the display device in accordance with the present invention may be implemented by controlling the wavelength of the reflected light by the photonic crystals (photonic crystal transmittance tuning mode), moving the particles using the electrophoresis or the dielectrophoresis (particlephoresis transmittance tuning mode), or controlling the arrangement state of particles (particle alignment transmittance tuning mode). Hereinafter, the embodiment of tuning the transmittance of light using three driving principles as described above will each be described. In the embodiment, the third mode may be referred to as the transmittance tuning mode. Further, in the transmittance tuning mode, although the reflected light is present but the transmitted light is dominantly generated, such that it is to be noted that the light capable of being sensed by the observer is the transmitted light.

Figure 14:
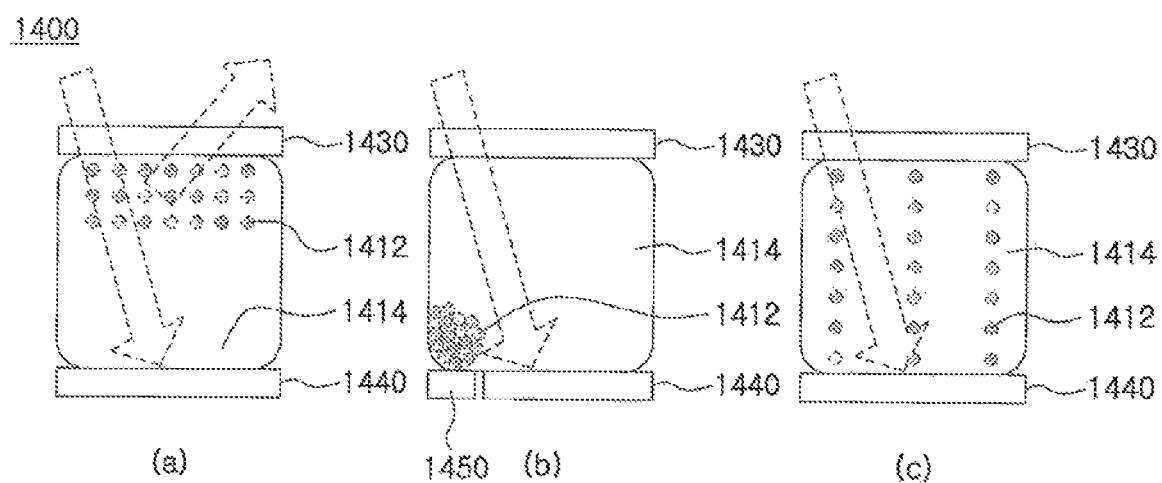
FIG. 14 is a view exemplarily illustrating a configuration of a third mode of the display device in accordance with one embodiment of the present invention.

FIG. 14 is a view exemplarily illustrating a configuration of a third mode of the display device in accordance with one embodiment of the present invention.

First, referring to FIG. 14(a), in controlling the wavelength of light reflected from the particle structure (that is, the photonic crystals formed by maintaining particles at the predetermined distance) by applying the electric field through the electrode when particles are dispersed in the solvent and controlling at least one of the intensity and direction of the electric field to control the inter-particle distances, the color of the display device may become transparent in the visible region by controlling the electric field so as to be maintained the wavelength range of light reflected from the particles in an ultraviolet or infrared spectrum rather than in the visible spectrum by controlling the intensity of the electric field applied to the particles to make the inter-particle distances narrower or wider than a threshold value. That is, the transmittance of light may be tuned by making the light, which is reflected from the photonic crystals composed of particles, transparent. For reference, in the present invention, the transmittance of light mainly means the transmittance of light in the visible light region. In the specification, such a method may be referred to as the photonic crystal transmittance tuning mode. The photonic crystal transmittance tuning mode may be generated in both of the DC voltage and the AC voltage and may be more efficiently shown when the solution in which the particles are dispersed has the aforementioned variable electrical polarization characteristic. In one embodiment, when the ferroelectric or superparaelectric particles having the excellent electrical polarization characteristic are used, the arrangement of the particles is more efficiently shown due to the interaction between the electrically polarized particles, thereby obtaining stronger transmittance.

Next, referring to FIG. 14(b), the corresponding particles are concentrated on the electrode having a relatively narrow area by applying the electric field to the particles that move by the electrophoresis or the dielectrophoresis, such that the light incident on the display device is not reflected or scattered by the particles, thereby tuning the transmittance of light. Meanwhile, although not shown in the drawing, the transmittance may also be tuned by controlling the density in which the particles are concentrated on the lower local electrode. For example, it may also be considered the configuration of tuning the transmittance of light transmitting the particles and/or the solvent by disposing the local electrode at the central portion of the lower electrode, and then, controlling the density in which the particles are concentrated on the local electrode. Such a mode may be referred to as the particlephoresis transmittance tuning mode in the specification. This mode may be more efficiently made when the DC voltage is applied and the transmittance may also be tuned according to the application time or frequency of the DC voltage.

Next, referring to FIG. 14(c), when the electric field is applied to the particles and solvent when particles having the electrical polarization characteristic are dispersed in the solvent, particles are polarized by the electric field, and thus, may be polarized in the same direction along the direction of the electric field. Since the electrical attraction is generated between particles polarized in the same direction, particles dispersed in the solvent are attracted to each other, and thus, may be regularly arranged in a direction parallel to the direction of the electric field. Therefore, the transmittance of light incident on the solvent and the particles can be tuned by controlling the arrangement state of particles regularly arranged in a direction parallel to the direction of the electric field by controlling the intensity or direction of the electric field. Although the drawing shows the case in which the alignment of the particles is relatively straight, and thus, has the excellent transmittance, it may also be considered the case that the alignment degree of the particles has the weaker linear shape, and thus, the transmittance becomes low. Therefore, the present mode may be referred to as the particle arrangement or the alignment transmittance tuning mode. This mode may also be implemented by the DC voltage, but it is preferred to be implemented by applying AC voltage so as to prevent the phenomenon biased to the electrode by the electrophoresis when the DC voltage is applied. More specifically, in the case of FIG. 14(c) controlling the arrangement of the particles having the electric charges and using the DC electric field, when the intensity of electric field applied to the particles and solvent is excessively large or the electric field is locally applied, the light having the unique color of the particles may be reflected or concentrated on one side of the electrode by moving the particles toward the electrode due to the electric attraction by the electrophoresis as in the second mode, and thus, it may be preferred to uniformly apply the AC electric field to the solution rather than DC.

Inter-Mode Switching within Same Unit Pixel or Cell

Hereinafter, the mode switching configuration, which is selectively implemented so that at least two of the first, second and third modes of the present invention may be switched to each other within the same unit pixel or cell, will be described with reference to specific drawings.

(1) Switching Between First Mode and Second Mode within Same Unit Pixel or Cell

Figure 15:
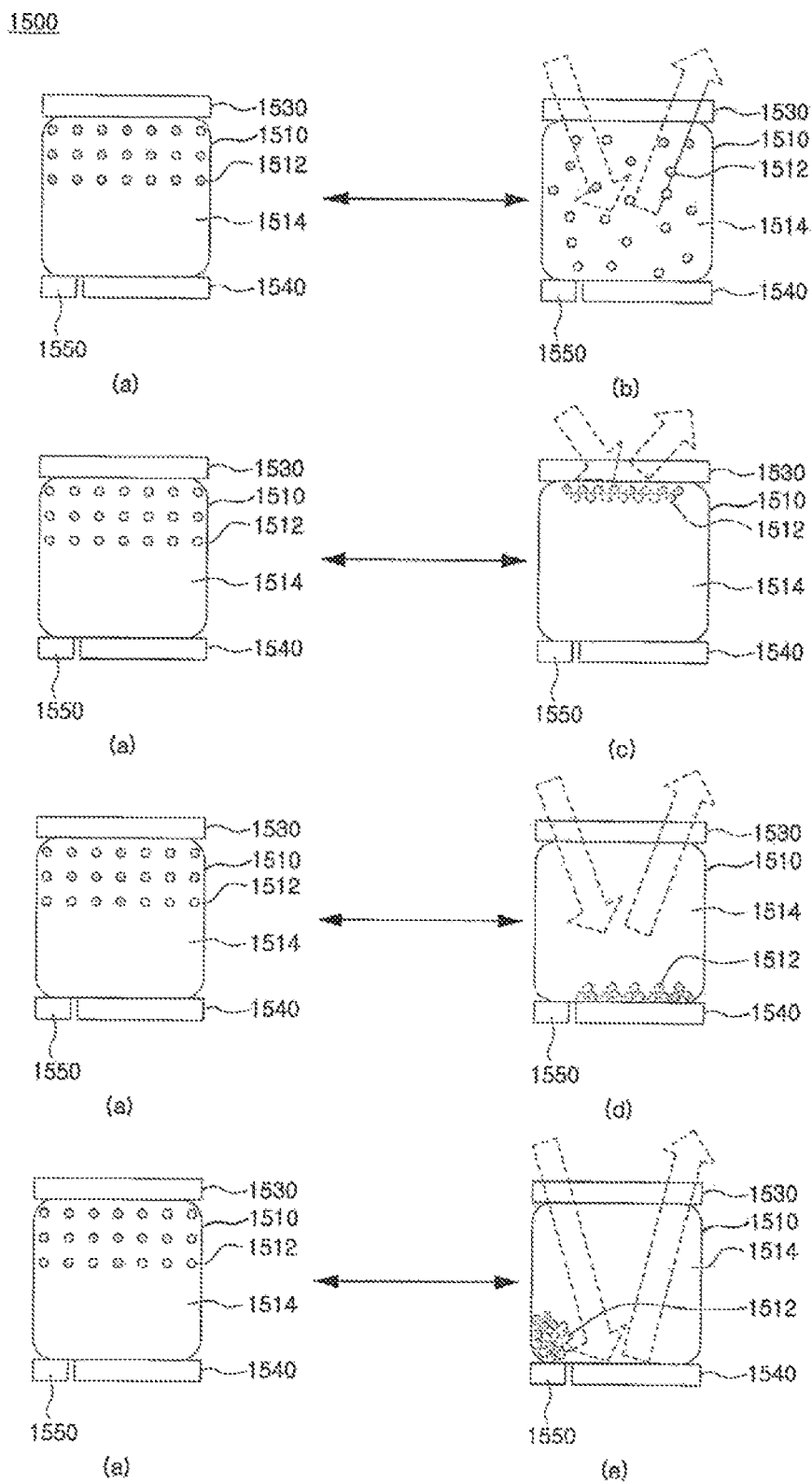
FIG. 15 is a view exemplarily illustrating the configuration of the display device capable of selectively performing the first and second modes in accordance with one embodiment of the present invention.

FIG. 15 is a view exemplarily illustrating a configuration of a display device capable of being selectively performed so as to switch the first and second modes to each other within the same unit pixel or cell in accordance with one embodiment of the present invention.

Referring to FIG. 15, a display device 1500 in accordance with one embodiment of the present invention may include a display unit 1510 and an electrode. More specifically, the display unit 1510 may include particles 1512 that are dispersed in a solvent 1514 and the electrode may include an upper electrode 1530, a lower electrode 1540 and a local electrode 1550. In addition, the particles 1512 and the solvent 1514 included in the display unit 1510 and the lower electrode 1540 covering the bottom of the display unit 1510 may each have a unique color. Although the display unit and the electrode are separately described in the specification for description, it is apparent that the electrode may be included in the display unit. That is, a person having ordinary skill in the art to which the present invention pertains can understand that there is no problem in carrying out the present invention even when the display unit has a configuration including both of the display unit and the electrode in the representation linguistic aspect. In addition, although a detailed configuration of applying the electric field to the display unit or the electrode is not shown, this is a component well known to a person having ordinary skill in the art to which the present invention pertains. Therefore, the components are omitted herein so as not to obscure the principle and purpose of the present invention. Importantly, a control unit for switching the modes to each other within the unit pixel or a machine readable storage medium including instructions corresponding to the function of the control unit will be described in detail. In addition, a person having ordinary skill in the art to which the present invention pertains may understand that the unit pixel is a minimum display unit that can be independently controlled. In addition, in FIG. 15, the upper electrode is a transparent electrode.

In accordance with one embodiment of the present invention, the display device may selectively perform any one of the first mode and the second mode within the same unit pixel so as to be switched to each other. More specifically, the display device in accordance with one embodiment of the present invention can apply the electric field through the electrode when particles are dispersed in the solvent and control at least one of the intensity and direction of the electric field, and thus, may control the inter-particle distances to control the wavelength of light reflected from the photonic crystals composed of particles (first mode) or control the location of particles to perform a function of displaying the hues (that is, a hue of a solution due to light scattering of particles), particles and solvent of the solution or the unique color of the electrode (second mode). Hereinafter, the color of the solution may be considered as including the color of the solution due to the light scattering of the particles.

First, referring to FIG. 15(a), the display device 1500 in accordance with one embodiment of the present invention controls the inter-particle distances of the particles 1512 by controlling the intensity or direction of the DC electric field applied to the solution indicating the variable polarization characteristic through electrodes 1530 and 1540, thereby controlling the wavelength of light (that is, color) reflected from the particles 1512 (first mode). As described in detail with reference to the first mode, when the particles 1512 have the same electric charges, the particles 1512 may be regularly arranged at distances where the electrical attraction due to the external electric field, the electrical repulsion between the particles 1512 having electric charges of the same sign, and the polarization due to the external electric field are in an equilibrium state and the particles 1512 arranged at the predetermined distance may act as the photonic crystal. Meanwhile, when the particles 1512 have the steric hindrance capable of causing the steric hindrance effect, the particles 1512 may be regularly arranged at distances where the repulsion between the particles due to the steric effect and the electrical attraction due to the polarization by the external electric field, etc., are in an equilibrium state and the particles 1512 arranged at a predetermined distance may act as the photonic crystal. The repulsion due to the electric charges and the repulsion effect due to the steric hindrance may be simultaneously exhibited.

In addition, the display device 1500 in accordance with one embodiment of the present invention controls the inter-particle distances of the particles 1512 by controlling the intensity, direction or AC frequency of the AC electric field applied through the electrodes 1530 and 1540, thereby controlling the wavelength of light (that is, color) reflected from the particles 1512 (first mode). When the AC voltage is applied, the inter-particle mutual attraction is generated according to the electrical polarization generated in accordance with the applied AC voltage and the mutual repulsion is generated by electric charges equally charged on the surface of the particles or a layer generating the inter-particle steric effect, thereby enabling the particles so as to be maintained at a constant distance by the equilibrium of the attraction and the repulsion. Therefore, when the AC voltage is applied, the generated electrical polarization should be applied within the frequency range that can be sufficiently changed according to the frequency of the AC voltage.

As described above, since the wavelength of light reflected from the particles 1512 arranged at a predetermined distance is determined by the distance of the particles 1512, the distance of the particles 1512 is controlled by the intensity and direction of the electric filed applied through the electrode, thereby arbitrarily controlling the wavelength of light reflected from the particles 1512.

Next, the display device 1500 in accordance with one embodiment of the present invention controls the intensity or direction of the DC electric field applied through the electrodes 1530, 1540 and 1550, such that the intensity of the electric field is a specific threshold value or more, thereby moving the particles 1512 according to the principle of the electrophoresis or the dielectrophoresis, such that the unique color of any one of the solutions 1512 and 1514, the particles 1512, the solvent 1514 and the lower electrode 1540 may be displayed (second mode).

Referring to FIG. 15(b), as described in detail with reference to the above second mode, when the electric field is not applied or when voltage lower than the threshold value is applied, the particles 1512 are irregularly dispersed in the solvent 1514, and thus, the color of the solution, in which the unique color of the particles 1512, the unique color of the solvent 1514 and the color of light reflected or scattered from the particles 1512 or the solvent 1514 are mixed, may be displayed.

The mutual switching between the photonic crystal reflection mode of FIG. 15(a) and the solution color reflection mode of FIG. 15(b) may be implemented by the intensity of applied voltage. That is, the applied voltage used in the photonic crystal reflection mode may be larger than the applied voltage used in the particle color reflection mode.

Various hues may be represented by the simple method and structure by selectively implementing the photonic crystal reflection mode and the solution color reflection mode within the same unit pixel. In the embodiment of the switching between the photonic crystal reflection mode and the solution color reflection mode, as shown in FIG. 15, the lower electrode may be integrated without being divided.

Referring to FIG. 15(c), as described in detail with reference to the second mode, when the particles 1512 have electric charges and the electric field is applied at the intensity of a threshold value or more so that the upper electrode 1530 becomes the electrode of a sign opposite to the electric charges of the particles 1512, the particles 1512 moves toward the upper electrode 1530 by the electrophoresis, and thus, the unique color of the particles 1512 may be displayed on the display unit 1510.

The mutual switching between the photonic crystal reflection mode of FIG. 15(a) and the particle color reflection mode of FIG. 15(c) may be implemented by the intensity of applied voltage. That is, the applied voltage used in the photonic crystal reflection mode may be smaller than the applied voltage used in the particle color reflection mode. Alternatively, the photonic crystal mode of FIG. 15(a) may be implemented using the AC voltage and FIG. 15(c) may be implemented by applying the DC voltage. That is, the mode can be switched by changing the type of voltage (DC or AC).

Various colors may be represented by the simple method and structure by selectively implementing the photonic crystal reflection mode and the solution color reflection mode within the same unit pixel. In the embodiment of the switching between the photonic crystal reflection mode and the solution color reflection mode, as shown in FIG. 15, the lower electrode may be integrated without being divided.

Referring to FIG. 15(d), as described in detail with reference to the second mode, when the particles 1512 have electric charges and the electric field is applied at the intensity of a threshold value or more so that the lower electrode 1540 becomes the electrode of a sign opposite to the electric charges of the particles 1512, the particles 1512 moves toward the lower electrode 1540 by the electrophoresis, and thus, the unique color of the solvent 1512 may be displayed on the display unit 1510.

The mutual switching between the photonic crystal reflection mode of FIG. 15(*a*) and the solvent color reflection mode of FIG. 15(*d*) may be implemented by the intensity of applied voltage. That is, when the charged particles are applied with an electric field so as to move to the upper electrode, the photonic crystal reflection mode may be implemented according to the intensity of the electric filed and when the charged particles are applied with an electric field so as to move to the lower electrode, the solvent color reflection mode may be implemented.

Various hues may be represented by the simple method and structure by selectively implementing the photonic crystal reflection mode and the solution color reflection mode within the same unit pixel. In the embodiment of the switching between the photonic crystal reflection mode and the solvent color reflection mode, as shown in FIG. 15, the lower electrode may be integrated without being divided.

Referring to FIG. 15(*e*), as already described in detail with reference to the second mode, when the particles 1512 have electric charges and the electric field is applied so that the local electrode 1550 becomes the electrode of a sign opposite to the electric charges of the particles 1512, the particles 1512 moves toward the local electrode 1550 by the electrophoresis so as to be concentrated around the local electrode 1550, such that the unique color of the lower electrode 1540 (when the lower electrode is transparent, the color of the material under the lower electrode) may be displayed on the display unit 1510.

The mutual switching between the photonic crystal reflection mode of FIG. 15(*a*) and the electrode color reflection mode of FIG. 15(*e*) may be implemented by the region to which the applied voltage is applied. That is, although the electric field is uniformly applied in the photonic crystal reflection mode, the mutual switching may be implemented by applying the electric field only to the local region of the display electrode in the electrode color reflection mode. The intensity of the applied electric field of the photonic crystal reflection mode may be weaker than that of the electrode color reflection mode.

Various hues may be represented by the simple method and structure by selectively implementing the photonic crystal reflection mode and the electrode color reflection mode within the same unit pixel. In the embodiment of the switching between the photonic crystal reflection mode and the electrode color reflection mode, as illustrated in FIG. 15, the switching may be implemented by dividing the upper electrode without dividing the lower electrode as illustrated in FIG. 15 and the form of the division electrode is not limited to FIG. 15 and therefore, may be diversely implemented and may be applied only to the plurality of local regions.

In particular, as described above, it is difficult to implement white and black colors in the first mode. Therefore, the color of the continuous hues and white and black may be rendered in the same unit pixel or the same display region by using a combination of the white and black with the colors of solvent, particle and electrode (in the case of the transparent electrode, the color of the material under the lower electrode) in the second mode.

Meanwhile, the embodiment of the case in which the first mode and the second mode are performed and the embodiment of the case in which any one of the first mode and the second mode is switched to the other mode within the same unit pixel will be described below in more detail.

First, the case in which the particles have the electric charges of the same signal can be assumed. In this case, when the electric field is not applied or is the threshold voltage or less, the particles are irregularly dispersed in the solvent, and thus, the second mode, in which the color of the solvent is displayed, may be performed. In addition, when the electric field is the DC electric field and the intensity of the DC electric field is controlled within the range that can regularly control the inter-particle distances, the first mode, in which the wavelength of light reflected from the particles according to the intensity of the DC electric field is controlled within the visible spectrum, may be performed. In addition, when the electric field is the DC electric field and the intensity of the electric field is the threshold value or more that can concentrate the particles toward the electrode by the electrophoresis, the second mode, in which the particles are concentrated on the upper electrode to display the color of the particles, or concentrated on the lower electrode to display the color of the solvent, or concentrated on the local electrode to display the colors of the upper electrode or the lower electrode, may be performed.

In addition, when the electric field is the AC electric field and the intensity and frequency of the AC electric field are controlled within the range that can regularly control the inter-particle distances, the first mode, in which the wavelength of light reflected from the particles according to the intensity or frequency of the AC electric field is controlled within the visible spectrum, may be performed. When the AC voltage is applied, not only the intensity of the AC voltage but also its frequency can be variables to control the inter-particle distances of the photonic crystal mode. In addition, the photonic crystal reflection mode may be implemented by applying the AC voltage in the first mode and may be implemented by applying the DC voltage in the solvent color reflection mode, the particle color reflection mode and the electrode color reflection mode among the second mode. In this case, when the solution (particle or solvent or a combination thereof) indicates the electrical polarization characteristic, the photonic crystal mode implementation can be more facilitated.

Next, the case in which the particles have the electrical polarization characteristic (when the electric field is applied, the electrical polarization is induced and the electrical polarization is changed according to the change in the applied electric field) and includes the structure generating the steric effect may be assumed. In this case, when the electric field is not applied or is the threshold voltage or less, the particles are irregularly dispersed in the solvent, and thus, the second mode, in which the color of the solvent is displayed, may be performed. In addition, when the electric field is the DC electric field and the intensity of the DC electric field is controlled within the range that can regularly control the inter-particle distances, the first mode, in which the wavelength of light reflected from the particles according to the intensity of the DC electric field is controlled within the visible spectrum, may be performed. In addition, when the distribution of the electric field is non-uniform and the dielectric constants of the particles and solvent are different from each other, if the DC electric field is applied at the threshold value or more that can concentrate the particles toward the electrode by the electrophoresis, the particles may be concentrated on the upper electrode to display the color of the particles, or concentrated on the lower electrode to display the color of the solvent, or concentrated on the local electrode, and thus, the second mode, in which the colors of the upper electrode or the lower electrode are displayed, may be performed. In addition, when the electric field is the AC electric field and the intensity and frequency of the AC electric field are controlled within the range that can regularly control the inter-particle distances, the first mode, in which the wavelength of light reflected from the particles according to the intensity or frequency of the AC electric field is controlled within the visible spectrum, may be performed.

Although not specifically shown in the drawing, the solution color reflection mode, the particle color reflection mode, the electrode color reflection mode or the solvent color reflection mode may be switched from the photonic crystal reflection mode, and further, the solution color reflection mode, the particle color reflection mode, the electrode color reflection mode and the solvent color reflection mode may be switched to one another. The configuration of switching in the second mode will be described below.

(2) Switching Between First Mode and Third Mode within Same Unit Pixel or Cell

Figure 16:
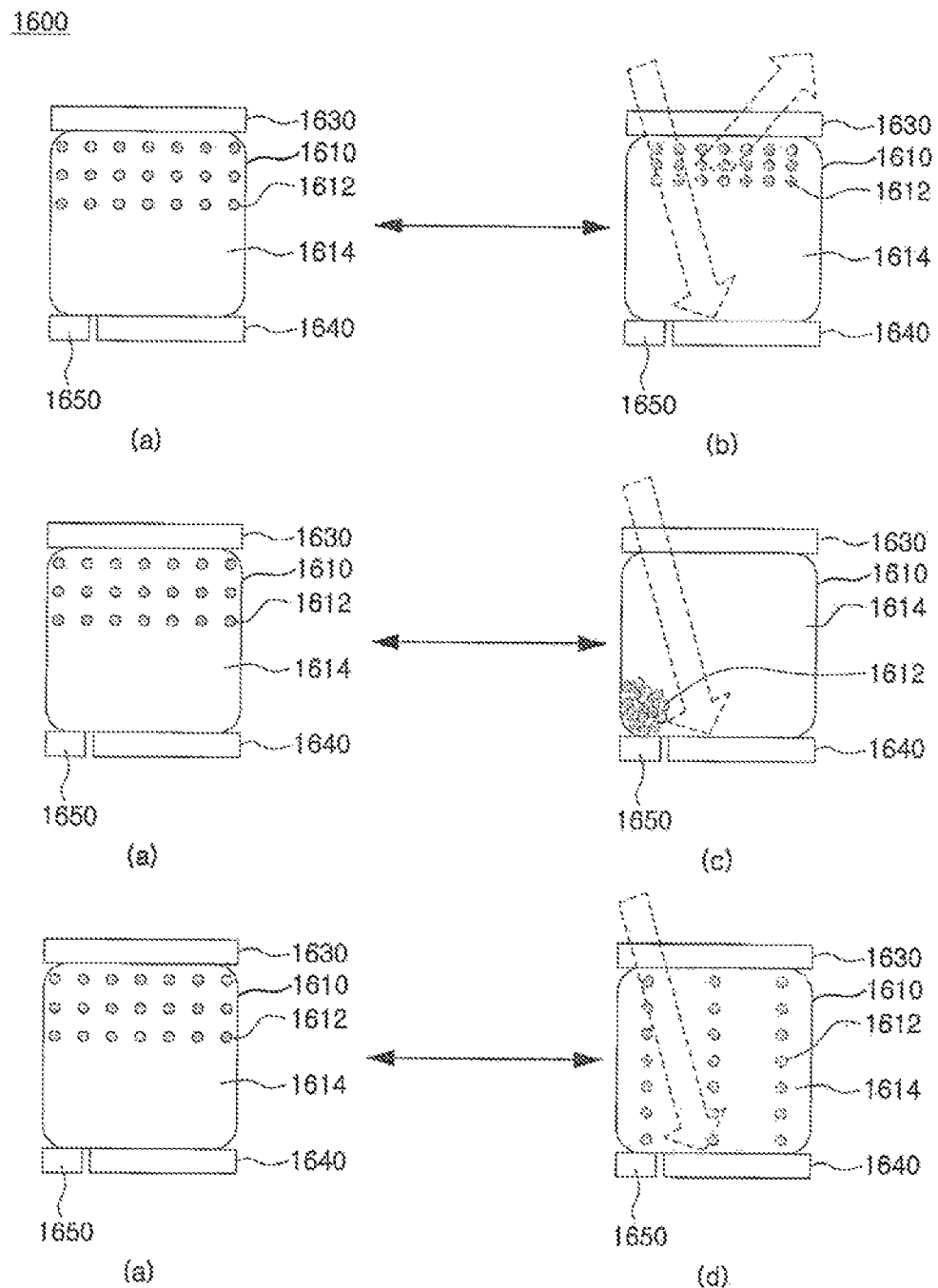
FIG. 16 is a view exemplarily illustrating the configuration of the display device capable of selectively performing the first mode and a third mode in accordance with one embodiment of the present invention.

FIG. 16 is a view exemplarily illustrating the configuration of the display device capable of selectively performing the first mode and a third mode in accordance with one embodiment of the present invention.

Referring to FIG. 16, a display device 1600 in accordance with one embodiment of the present invention may include a display unit 1610 and an electrode. More specifically, the display unit 1610 may include particles 1612 that are dispersed in a solvent 1614 and the electrode may include an upper electrode 1630, a lower electrode 1640 and a local electrode 1650. In addition, the upper electrode 1630, the lower electrode 1640 and the local electrode 1650 may be made of the light transmissive material and may transmit light incident on the display device 1600.

In accordance with one embodiment of the present invention, the display device may selectively perform any one of the first mode and the third mode so as to be switched to each other. More specifically, another display device in accordance with one embodiment of the present invention may apply the electric field through the electrode when particles are dispersed in the solvent and control at least one of the intensity and direction of the electric field, and thus, may control the inter-particle distances to control the wavelength of light reflected from the photonic crystals composed of particles (first mode) or control the distance, location or arrangement of particles to tune the transmittance of light incident on the display device (third mode).

First, referring to FIG. 16(a), the display device 1600 in accordance with one embodiment of the present invention controls the inter-particle distances of the particles 1612 by controlling the intensity or direction of the DC electric field applied through electrodes 1630 and 1640, thereby controlling the wavelength of light (that is, color) reflected from the particles 1612 (first mode).

As already described in detail with reference to the first mode, when the particles 1612 have the same electric charges, the particles 1612 may be regularly arranged at distances where the electrical attraction due to the external electric field, the electrical repulsion between the particles 1612 having electric charges of the same sign, and the electrical attraction due to the polarization by the external electric field are in an equilibrium state and the particles 1612 arranged at the predetermined distance may act as the photonic crystal. Meanwhile, when the particles 1612 have the steric hindrance capable of causing the steric hindrance effect, the particles 1612 may be regularly arranged at distances where the repulsion between the particles 1612 due to the steric effect and the electrical attraction due to the polarization by the external electric field, etc., are in an equilibrium state and the particles 1612 arranged at a predetermined distance may act as the photonic crystal.

In addition, the display device 1600 in accordance with one embodiment of the present invention controls the inter-particle distances of the particles 1612 by controlling the intensity, direction or AC frequency of the AC electric field applied through the electrodes 1630 and 1640, thereby controlling the wavelength of light (that is, color) reflected from the particles 1612 (first mode).

As described above, since the wavelength of light reflected from the particles 1612 arranged at a predetermined distance is determined by the distance of the particles 1612, the distance of the particles 1612 is controlled by the intensity and direction of the electric filed applied through the electrode, thereby arbitrarily controlling the wavelength of light reflected from the particles 1612.

Next, the display device 1600 in accordance with one embodiment of the present invention control the intensity, direction, application location of the electric field applied through the electrodes 1630, 1640 and 1650 to control the distance, location or arrangement of the particles, thereby tuning the transmittance of light incident on the display device (third mode or transmittance tuning mode).

Referring to FIG. 16(b), as already described in detail with reference to the third mode, the light in the ultraviolet or infrared spectrum is reflected from the photonic crystals composed of the particles 1612 by applying the electric field having the intensity of the specific threshold or more or the specific threshold or less to the photonic crystals composed of the particles 1612 disposed at a predetermined distance but the light in the visible spectrum is not reflected, such that the light in the visible spectrum incident on the display device 1600 may go through the display device 1600 at the high transmittance of light. This mode may be referred to as the photonic crystal transmittance tuning mode as described above.

The mutual switching between the photonic crystal reflection mode of FIG. 16(a) and the photonic crystal transmittance tuning mode of FIG. 16(b) may be implemented by the intensity of applied voltage. That is, the applied voltage used in the photonic crystal reflection mode may be larger or smaller than the applied voltage used in the photonic crystal transmittance tuning mode. The photonic crystal transmittance tuning mode of ultraviolet rays may have the application voltage larger than that of the photonic crystal reflection mode and the photonic crystal transmittance tuning mode of infrared rays is reverse thereto.

Various hues and transmittance may be represented by the simple method and structure by selectively implementing the photonic crystal reflection mode and the photonic crystal transmittance tuning mode within the same unit pixel. In the embodiment of the switching between the photonic crystal reflection mode and the photonic crystal transmittance tuning mode, as shown in FIG. 16, the lower electrode may be integrated without being divided.

Referring to FIG. 16(c), as already described in detail with reference to the third mode, when the particles 1612 have electric charges and the electric field is applied so that the local electrode 1650 becomes the electrode of a sign opposite to the electric charges of the particles 1612, the particles 1612 moves toward the local electrode 1650 by the electrophoresis so as to be concentrated around the local electrode 1650, such that the light incident on the display device 1600 may go through the display device 1600 at high transmittance of light without being reflected or scattered by the particles. Meanwhile, although not shown in the drawing, the transmittance may also be tuned by controlling the density in which the particles are concentrated on the lower local electrode. For example, it may also be considered the configuration of tuning the transmittance of light transmitting the particles and/or the solvent by disposing the local electrode at the central portion of the lower electrode, and then, controlling the density in which the particles are concentrated on the local electrode. This mode may be referred to as the particlephoresis transmittance tuning mode in the specification and may also be implemented by applying the AC voltage and the DC voltage.

The mutual switching between the photonic crystal reflection mode of FIG. 16(a) and the particlephoresis transmittance tuning mode of FIG. 16(c) may be implemented by the intensity of applied voltage. That is, the applied voltage used in the photonic crystal reflection mode may be smaller than the applied voltage used in the particlephoresis transmittance tuning mode.

As such, various hues may be represented by the simple method and structure by selectively implementing the photonic crystal reflection mode and the particlephoresis transmittance tuning mode within the same unit pixel. In the embodiment of the switching between the photonic crystal reflection mode and the particlephoresis transmittance tuning mode, as shown in FIG. 16, the lower electrode is not divided but the upper electrode may be divided.

Meanwhile, referring to FIG. 16(d), as already described in detail with reference to the third mode, when the electric field is applied to the particles 1612 and the solvent 1614 when the particles 1612 having the electrical polarization characteristic are dispersed in the solvent 1614, the particles 1612 are polarized by the electric field to be polarized in the same direction along the direction of the electric field. In this case, since the electrical attraction is generated between the particles 1612 polarized in the same direction, the particles 1612 dispersed in the solvent 1614 are attracted to each other, such that the particles 1612 may be regularly arranged in a direction parallel to the direction of the electric field. Therefore, the transmittance of light incident on the display device 1600 can be tuned by controlling the arrangement state of the particles 1612 regularly arranged in a direction parallel to the direction of the electric field by controlling the intensity or direction of the electric field. This mode may be referred to as the particle alignment or the arrangement transmittance tuning mode.

The mutual switching between the photonic crystal reflection mode of FIG. 16(a) and the particle alignment transmittance tuning mode of FIG. 16(d) may be implemented by the intensity of applied voltage. That is, in accordance with one embodiment of the present invention, the voltage applied in the particle alignment transmittance tuning mode may be larger than the voltage applied in the photonic crystal reflection mode.

As such, various hues may be represented by the simple method and structure by selectively implementing the photonic crystal reflection mode and the particle alignment transmittance tuning mode within the same unit pixel. In the embodiment of the switching between the photonic crystal reflection mode and the particle alignment transmittance tuning mode, as shown in FIG. 16, the lower electrode may be integrated without being divided.

Meanwhile, the embodiment of the case in which the first mode and the third mode are performed and the embodiment of the case in which any one of the first mode and the third mode is switched to the other mode will be described below in more detail.

First, the case in which the particles have the electric charges of the same sign and the electrode includes the light transmissive material may be assumed. In this case, when the electric field is the DC electric field and the intensity of the DC electric field is controlled within the range capable of regularly controlling the inter-particle distances, the first mode, in which the wavelength of light reflected from the particles according to the intensity of the DC electric field is controlled within the visible spectrum, may be performed or the third mode, in which the wavelength of light reflected from the particles is controlled out of the visible spectrum to tune the transmittance of the incident light, may be performed. In addition, when the electric field is the DC electric field and the intensity of the DC electric field is the threshold value or more capable of concentrating the particles toward the electrode by the electrophoresis, the third mode, in which the particles are concentrated on the local electrode to tune the transmittance of the incident light, may be performed. In addition, when the electric field is the DC electric field and the intensity of the DC electric field may be controlled within the range capable of arranging the particles in a direction parallel to the direction of the DC electric field, the third mode, in which the particles are arranged in the state of forming a predetermined angle to the progressing direction of the incident light to tune the transmittance of the incident light, may be performed. In this case, when the electric field is the AC electric field and the intensity and frequency of the AC electric field is controlled within the range capable of regularly controlling the inter-particle distances, the first mode, in which the wavelength of light reflected from the particles according to the intensity or frequency of the AC electric field is controlled within the visible spectrum, may be performed or the third mode, in which the wavelength of light reflected from the particles is controlled out of the visible spectrum to tune the transmittance of the incident light, may be performed. In addition, when the electric field is the AC electric field and the intensity and frequency of the AC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed.

In one embodiment, when voltage is applied, arranging the magnitude in voltage in a large order is as follows; the particlephoresis transmittance tuning mode>the particle alignment transmittance tuning mode>the photonic crystal transmittance tuning mode of ultraviolet reflection>the visible photonic crystal reflection mode>the photonic crystal transmittance tuning mode of infrared reflection. These modes may be indicated while being mixed with each other. This may mean that their exerted effects are changed.

In addition, the AC voltage may be used in the photonic crystal reflection mode, the photonic crystal transmittance tuning mode and the particle alignment transmittance tuning mode and the DC voltage may be used in the particlephoresis transmittance tuning mode.

Next, another case may be assumed, in which the particles have the electrical polarization characteristic (when the electric field is applied, the electrical polarization is induced and the electrical polarization is changed according to the change in the applied electric field) and includes the structure generating the steric effect and the electrode includes the light transmissive material. In this case, when the electric field is the DC electric field and the intensity of the DC electric field is controlled within the range capable of regularly controlling the inter-particle distances, the first mode, in which the wavelength of light reflected from the particles according to the intensity of the DC electric field is controlled within the visible spectrum, may be performed or the third mode, in which the wavelength of light reflected from the particles is controlled out of the visible spectrum to tune the transmittance of the incident light, may be performed. In addition, when the electric field is the DC electric field and the intensity of the DC electric field is the threshold value or more capable of concentrating the particles toward the electrode by the dielectrophoresis, the third mode, in which the transmittance of the incident light by concentrating the particles on the local electrode is tuned, may be performed. In addition, when the electric field is the DC electric field and the intensity of the DC electric field may be controlled within the range capable of arranging the particles in a direction parallel to the direction of the DC electric field, the third mode, in which the particles are arranged in the state of forming a predetermined angle to the progressing direction of the incident light to tune the transmittance of the incident light, may be performed. In this case, when the electric field is the AC electric field and the intensity and frequency of the AC electric field is controlled within the range capable of regularly controlling the inter-particle distances, the first mode, in which the wavelength of light reflected from the particles according to the intensity of the AC electric field is controlled within the visible spectrum, may be performed or the third mode, in which the wavelength of light reflected from the particles is controlled out of the visible spectrum to tune the transmittance of the incident light, may be performed. In addition, when the electric field is the AC electric field and the intensity and frequency of the AC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed.

Although not specifically illustrated in the drawing, the particle alignment transmittance tuning mode, the particlephoresis transmittance tuning mode and the photonic crystal transmittance tuning mode may be switched to one another. The configuration of switching in the third mode will be described below.

(3) Switching Between Second Mode and Third Mode within Same Unit Pixel or Cell

Figure 17:
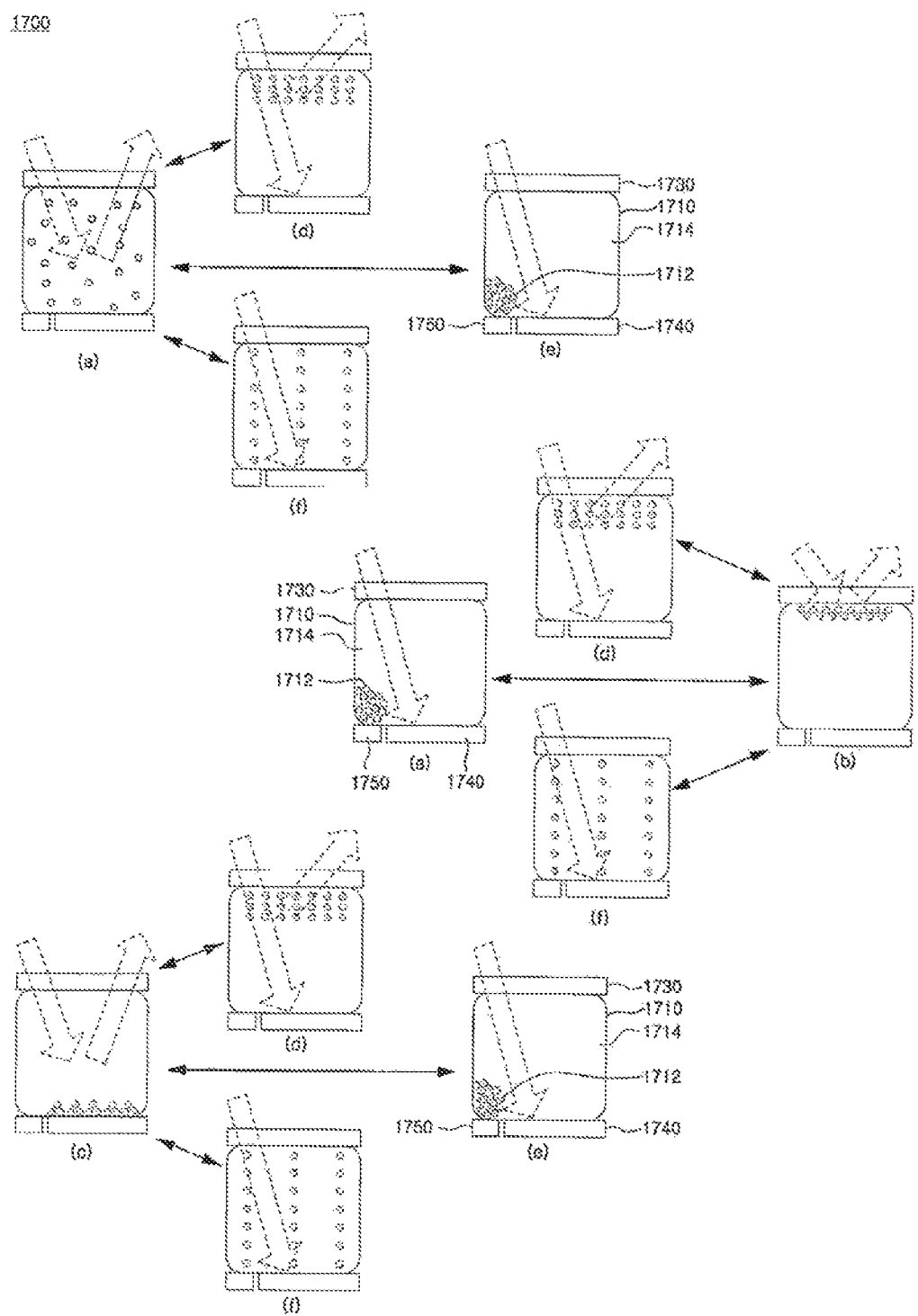
FIG. 17 is a view exemplarily illustrating the configuration of the display device capable of selectively performing the second and third modes in accordance with one embodiment of the present invention.

FIG. 17 is a view exemplarily illustrating the configuration of the display device capable of selectively performing the second and third modes in accordance with one embodiment of the present invention.

Referring to FIG. 17, a display device 1700 in accordance with one embodiment of the present invention may include a display unit 1710 and an electrode. More specifically, the display unit 1710 may include particles 1712 that are dispersed in a solvent 1714 and the electrode may include an upper electrode 1730, a lower electrode 1740 and a local electrode 1750. In addition, the particles 1712 and the solvent 1714 included in the display unit 1710 may each have the unique color and all of the upper electrode 1730, the lower electrode 1740 and the local electrode 1750 may be made of the light transmissive material and may transmit light incident on the display device 1700.

In accordance with one embodiment of the present invention, the display device may selectively perform any one of the second mode and the third mode within the same unit pixel so as to be switched to each other. More specifically, another display device in accordance with one embodiment of the present invention may apply the electric field through the electrode when particles are dispersed in the solvent and control at least one of the intensity and direction of the electric field, and thus, may control the location of the particles to display the unique color of the solution, particle or solvent (second mode) or control the distance, location or arrangement of particles to tune the transmittance of light incident to the display device (third mode).

First, the display device 1700 in accordance with one embodiment of the present invention controls the intensity or direction of the DC electric field applied through the electrodes 1730, 1740 and 1750, such that the intensity of the electric field is a specific threshold value or more, thereby moving the particles 1712 according to the principle of the electrophoresis or the dielectrophoresis, such that the unique color of any one of the solutions 1712 and 1714, the particles 1712 and the solvent 1714 may be displayed (second mode).

Referring to FIG. 17(a), as described in detail with reference to the above second mode, when the electric field is not applied, the particles 1712 is irregularly dispersed in the solvent 1714, and thus, the color of the solution, in which the unique color of the particles 1712, the unique color of the solvent 1714, and the color of light reflected or scattered from the unique color of the particles 1712 or the solvent 1714 are mixed, may be displayed. This mode is the solution color reflection mode.

Referring to FIG. 17(b), as already described in detail with reference to the second mode, when the particles 1712 have electric charges and the electric field is applied so that the upper electrode 1730 becomes the electrode of a sign opposite to the electric charges of the particles 1712, the particles 1712 moves toward the upper electrode 1730 by the electrophoresis, and thus, the unique color of the particles 1712 may be displayed on the display unit 1710. This mode is the particle color reflection mode.

Referring to FIG. 17(c), as described in detail with reference to the second mode, when the particles 1712 have electric charges and the electric field is applied so that the lower electrode 1740 becomes the electrode of a sign opposite to the electric charges of the particles 1712, the particles 1712 move toward the lower electrode 1740 by the electrophoresis, and thus, the unique color of the solvent 1712 may be displayed on the display unit 1710. This mode is the solvent color reflection mode.

Next, the display device 1700 in accordance with one embodiment of the present invention control the intensity or direction of the electric field applied through the electrodes 1730, 1740 and 1750 to control the distance, location or arrangement of the particles, thereby tuning the transmittance of light incident to the display device (third mode).

Referring to FIG. 17(d), as already described in detail with reference to the third mode, the light in the ultraviolet or infrared spectrum is reflected from the photonic crystals composed of the particles 1712 by applying the electric field having the intensity of the specific threshold or more or the specific threshold or less to the photonic crystals composed of the particles 1712 disposed at a predetermined distance but the light in the visible spectrum is not reflected, such that the light in the visible spectrum incident to the display device 1700 may go through the display device 1700 at the high transmittance of light. This mode is the photonic crystal transmittance tuning mode.

Referring to FIG. 17(e), as already described in detail with reference to the third mode, when the particles 1712 have electric charges and the electric field is applied so that the local electrode 1750 becomes the electrode of a sign opposite to the electric charges of the particles 1712, the particles 1712 moves toward the local electrode 1750 by the electrophoresis so as to be concentrated around the local electrode 1750, such that the light incident to the display device 1700 may go through the display device 1700 at high transmittance of light without being reflected or scattered by the particles. This mode is the particlephoresis transmittance tuning mode.

Meanwhile, referring to FIG. 17(*f*), as already described in detail with reference to the third mode, when the electric field is applied to the particles 1712 and the solvent 1714 when the particles 1712 having the electrical polarization characteristic are dispersed in the solvent 1714, the particles 1712 are polarized by the electric field to be polarized in the same direction along the direction of the electric field. In this case, since the electrical attraction is generated between the particles 1712 polarized in the same direction, the particles 1712 dispersed in the solvent 1714 are attracted to each other, such that the particles 1712 may be regularly arranged in a direction parallel to the direction of the electric field. Therefore, the transmittance of light incident on the display device 1700 can be tuned by controlling the arrangement state of the particles 1712 regularly arranged in a direction parallel to the direction of the electric field by controlling the intensity or direction of the electric field. This mode is the particle alignment transmittance tuning mode.

First, referring to the switching between the solution color reflection mode and the photonic crystal transmittance tuning mode, the magnitude in the applied voltage is large in the photonic crystal transmittance tuning mode and the voltage cannot be applied in the solution color reflection mode. Both of the hues and the transmittance can be controlled by using the unit pixel due to the switching between the solution color reflection mode and the photonic crystal transmittance tuning mode within the same unit pixel.

Next, referring to the switching between the solution color reflection mode and the particlephoresis transmittance tuning mode, the magnitude in the applied voltage is large in the particlephoresis transmittance tuning mode and the voltage cannot be applied in the solution color reflection mode. Both of the hues and the transmittance can be tuned by using the unit pixel due to the switching between the solution color reflection mode and the particlephoresis transmittance tuning mode within the same unit pixel.

Next, referring to the switching between the solution color reflection mode and the particle alignment transmittance tuning mode, the magnitude in the applied voltage is large in the particle alignment transmittance tuning mode and the voltage cannot be applied in the solution color reflection mode. Both of the hues and the transmittance can be tuned by using the unit pixel due to the switching between the solution color reflection mode and the particle alignment transmittance tuning mode within the same unit pixel.

Next, referring to the switching between the particle color reflection mode and the photonic crystal transmittance tuning mode, the magnitude in the applied voltage is larger in the particle color reflection mode than in the photonic crystal transmittance tuning mode. Both of the hues and the transmittance can be tuned by using the unit pixel due to the switching between the particle color reflection mode and the photonic crystal transmittance tuning mode within the same unit pixel.

Next, referring to the switching between the particle color reflection mode and the particlephoresis transmittance tuning mode, the magnitude in the applied voltage may be equal to or different from each other, but the direction of the applied voltage is different. Both of the hues and the transmittance can be tuned by using the unit pixel due to the switching between the particle color reflection mode and the particlephoresis transmittance tuning mode within the same unit pixel.

Next, referring to the switching between the particle color reflection mode and the particle alignment transmittance tuning mode, the magnitude in the applied voltage is larger in the particle color reflection mode than in the particle alignment transmittance tuning mode. Both of the hues and the transmittance can be tuned by using the unit pixel due to the switching between the particle color reflection mode and the particle alignment transmittance tuning mode within the same unit pixel.

Next, referring to the switching between the solution color reflection mode and the photonic crystal transmittance tuning mode, the magnitude in the applied voltage is larger in the solvent color reflection mode than in the photonic crystal transmittance tuning mode. Both of the hues and the transmittance can be tuned by using the unit pixel due to the switching between the solvent color reflection mode and the photonic crystal transmittance tuning mode within the same unit pixel.

Next, referring to the switching between the solvent color reflection mode and the particlephoresis transmittance tuning mode, the magnitude and direction in the applied voltage may be the same, but the electrode applied with the voltage is different. That is, the voltage is applied to the large electrode in the solvent color reflection mode, but the voltage is applied to the small electrode or the local electrode in the particlephoresis transmittance tuning mode. Meanwhile, when the transmittance is very small in the particlephoresis transmittance tuning mode, the magnitude in the voltage may be smaller in case of the solvent color reflection mode. Both of the hues and the transmittance can be tuned by using the unit pixel due to the switching between the solvent color reflection mode and the particlephoresis transmittance tuning mode within the same unit pixel.

Finally, referring to the switching between the solvent color reflection mode and the particle alignment transmittance tuning mode, the magnitude in the applied voltage is larger in the solvent color reflection mode than in the particle alignment transmittance tuning mode. Both of the hues and the transmittance can be tuned by using the unit pixel due to the switching between the solvent color reflection mode and the particle alignment transmittance tuning mode within the same unit pixel.

Meanwhile, the embodiment of the case, in which the second mode and the third mode are performed and the embodiment of the case in which any one of the second mode and the third mode is switched to the other mode, will be described below in more detail.

First, it may be assumed the case in which the particles have the electric charges of the same sign and the electrode includes the light transmissive material. In this case, when the electric field is not applied, the particles are irregularly dispersed in the solvent, and thus, the second mode, in which the color of the solution is displayed, may be performed. In addition, when the electric field is the DC electric field and the intensity of the DC electric field is controlled within the range that can regularly control the inter-particle distances, the third mode, in which the wavelength of light reflected from the particles is controlled within the visible spectrum to tune the transmittance of the incident light, may be performed. In addition, when the electric field is the DC electric field and the intensity of the electric field is the threshold value or more that can concentrate the particles toward the electrode by the electrophoresis, the second mode, in which the particles are concentrated on the upper electrode to display the color of the particles or concentrated on the lower electrode to display the color of the solvent, may be performed or the third mode, in which the particles are concentrated on the local electrode to tune the transmittance of the incident light, may be performed. In addition, when the electric field is the DC electric field and the intensity of the DC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed. In addition, when the electric field is the AC electric field and the intensity and frequency of the AC electric field are controlled within the range that can regularly control the inter-particle distances, the third mode, in which the wavelength of light reflected from the particles is controlled out of the visible spectrum to tune the transmittance of the incident light, may be performed. In addition, when the electric field is the AC electric field and the intensity and frequency of the AC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed.

Referring to the magnitude in the voltage in each mode shown in FIG. 17, in one embodiment, when the DC voltage is applied, there may be an order of the particle color reflection mode=the solvent color reflection mode>the particlephoresis transmittance tuning mode>the particle alignment transmittance tuning mode>the photonic crystal transmittance tuning mode>the solution color reflection mode. In one embodiment, when the AC voltage is applied, there may be an order of the particle alignment transmittance tuning mode>the photonic crystal transmittance tuning mode>the solution color reflection mode.

Next, another case in which the particles have the electrical polarization characteristic (when the electric field is applied, the electrical polarization is induced and the electrical polarization is changed according to the change in the applied electric field) and includes the structure that generates the steric effect and the electrode includes the light transmissive material may be assumed. In this case, when the electric field is not applied, the particles are irregularly dispersed in the solvent, and thus, the second mode, in which the color of the solution is displayed, may be performed. In addition, when the electric field is the DC electric field and the intensity of the DC electric field is controlled within the range that can regularly control the inter-particle distances, the third mode, in which the wavelength of light reflected from the particles is controlled out of the visible spectrum to tune the transmittance of the incident light, may be performed. In addition, when the electric field is the DC electric field and the intensity of the electric field is the threshold value or more that can concentrate the particles toward the electrode by the dielectrophoresis, the second mode, in which the particles are concentrated on the upper electrode to display the color of the particles or concentrated on the lower electrode to display the color of the solvent, may be performed or the third mode, in which the particles are concentrated on the local electrode to tune the transmittance of the incident light, may be performed. In addition, when the electric field is the DC electric field and the intensity of the DC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed. In addition, when the electric field is the AC electric field and the intensity and frequency of the AC electric field are controlled within the range that can regularly control the inter-particle distances, the third mode, in which the wavelength of light reflected from the particles is controlled out of the visible spectrum to tune the transmittance of the incident light, may be performed. In addition, when the electric field is the AC electric field and the intensity and frequency of the AC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed.

Figure 57:
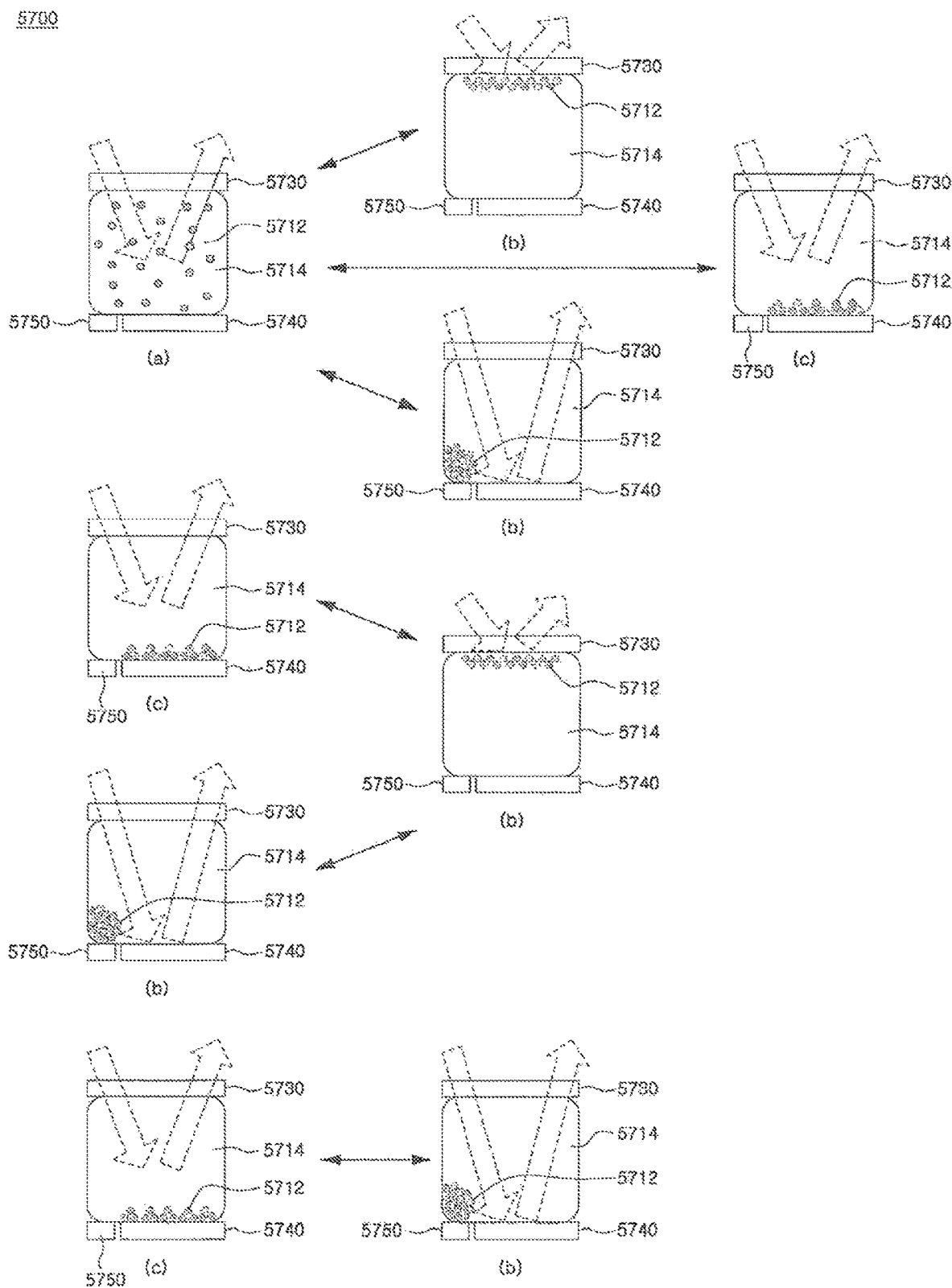
FIG. 57 is a view illustrating one embodiment of the mode switching configuration in the second mode.

(4) Mode Switching in Second Mode (Unique Color Reflection Mode) within Same Unit Pixel or Cell The second mode that is the unique color reflection mode may include four individual modes, that is, (a) the solution color reflection mode, (b) the particle color reflection mode, (c) the solvent color reflection mode and (d) the electrode color reflection mode as shown in FIG. 57. As shown in FIG. 57, the individual sub modes may also be switched to one another within the same unit pixel. For example, the DC voltage or very slight DC voltage may be applied in the solution color reflection mode. Although the same voltage is applied in the particle color reflection mode, the solvent color reflection mode and the electrode color reflection mode, the application direction and the application location may be different from each other, or different voltage, in which the application direction and the application location is changed, may be applied. That is, voltage is applied to both of the upper electrode and the lower electrode so that the particles are toward the upper electrode in the particle color reflection mode, voltage is applied to the upper electrode and the lower electrode so that the particles are toward the lower electrode in the solvent color reflection mode, and voltage is applied only the upper electrode and the local electrode of the lower electrode so that the particles are toward the local electrode of the lower electrode in the electrode color reflection mode. In the embodiment, a total 6 (4*3/2) types of the mode switching can be performed. The description of each sub mode is described above. Thereby, various hues may be implemented within the same unit pixel.

Figure 58:
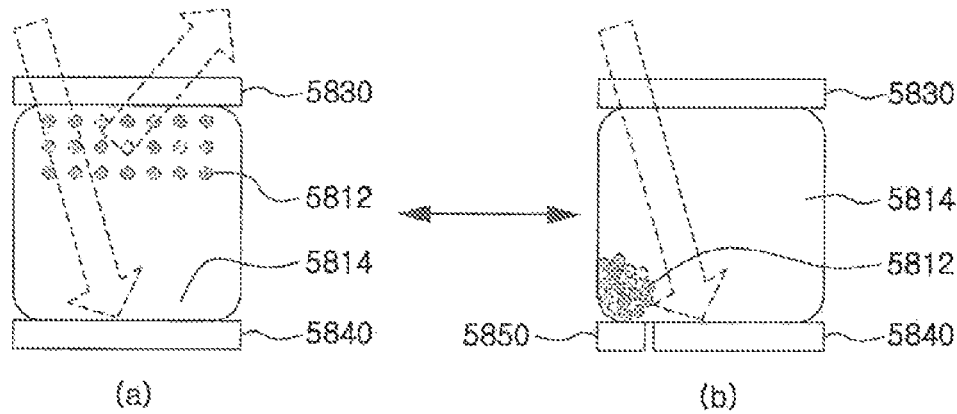
FIG. 58 is a view illustrating one embodiment of the mode switching configuration in the third mode.
Figure 58:
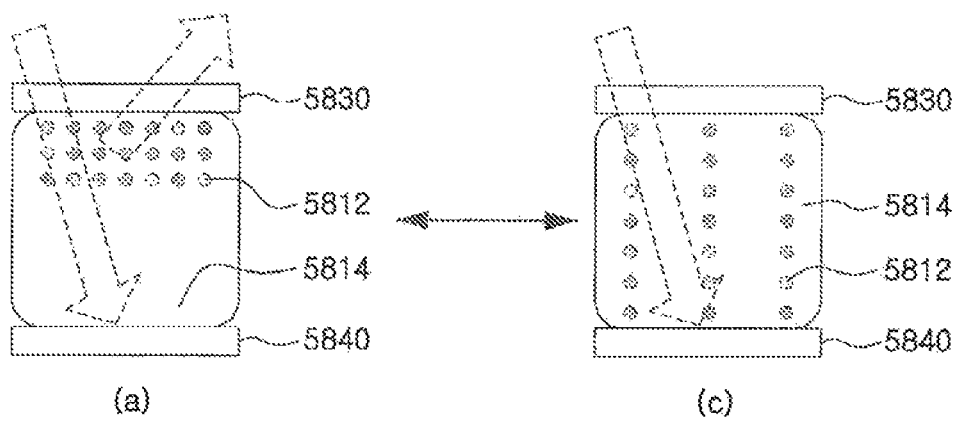
Figure 58:
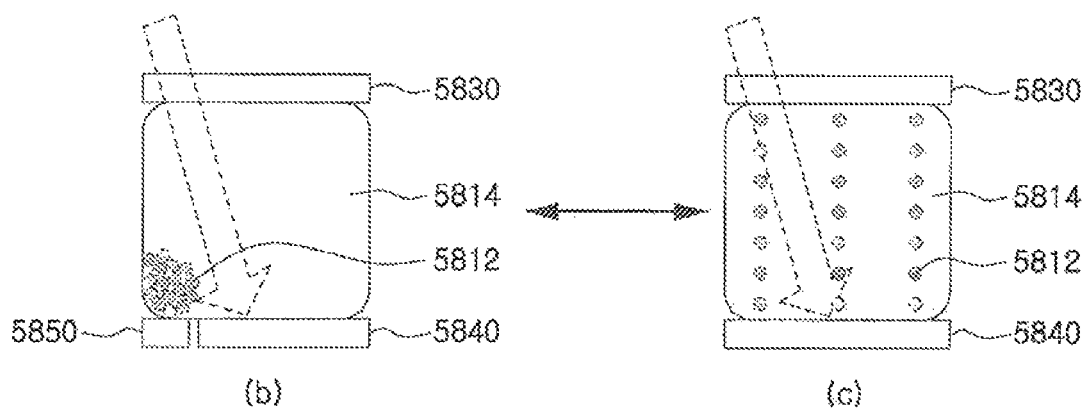

(5) Mode Switching in Third Mode (Transmittance Tuning Mode) within Same Unit Pixel or Cell In the third mode that is the transmittance tuning mode, as shown in FIG. 58, a total 3 of individual sub modes may be performed. That is, there are (a) the photonic crystal transmittance tuning mode, (b) the particlephoresis transmittance tuning mode and (c) the particle alignment transmittance tuning mode. As shown in FIG. 58, the mode switching between these individual sub modes may also be performed. For example, the magnitude in the applied voltage is an order of the particlephoresis transmittance tuning mode>the particle alignment transmittance tuning mode>the photonic crystal transmittance tuning mode. In the embodiment, a total 3 types of mode switching may be performed, thereby enabling various transmittance tuning.

Figure 18:
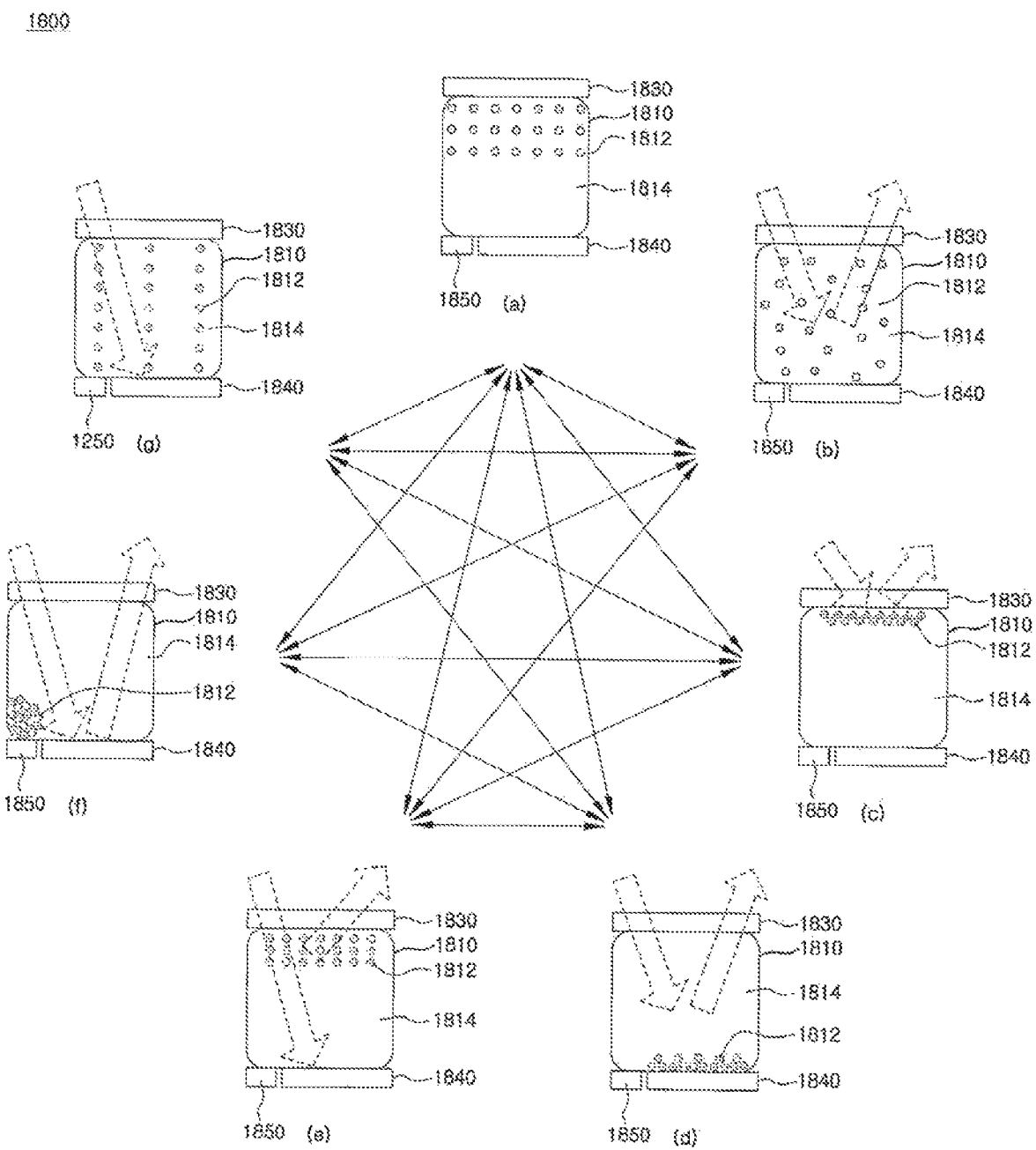
FIG. 18 is a view exemplarily illustrating the configuration of the display device capable of selectively performing the first, second and third modes in accordance with one embodiment of the present invention.

(6) Switching Among First Mode, Second Mode and Third Mode within Same Unit Pixel or Cell FIG. 18 is a view exemplarily illustrating the configuration of the display device capable of selectively performing the first, second and third modes in accordance with one embodiment of the present invention.

Referring to FIG. 18, a display device 1800 in accordance with one embodiment of the present invention may include a display unit 1810 and an electrode. More specifically, the display unit 1810 may include the particles 1812 that are dispersed in a solvent 1814 and the electrode may include an upper electrode 1830, a lower electrode 1840 and a local electrode 1850. In addition, the particles 1812 and the solvent 1814 included in the display unit 1810 may each have the unique color and all of the upper electrode 1830, the lower electrode 1840 and the local electrode 1850 may be made of the light transmissive material and may transmit light incident on the display device 1800.

In accordance with one embodiment of the present invention, the display device may selectively perform any one of the first mode, the second mode and the third mode within the same unit pixel so as to be switched to each other. More specifically, another display device in accordance with one embodiment of the present invention may apply the electric field through the electrode when particles are dispersed in the solvent and control at least one of the intensity and direction of the electric field and thus, and thus, may control the inter-particle distances to control the wavelength of light reflected from the photonic crystals composed of particles (first mode), control the location of the particle to display the unique color of the solution, particle or solvent (second mode), or control the distance, location or arrangement of particles to tune the transmittance of light incident to the display device (third mode).

First, referring to FIG. 18(a), the display device 1800 in accordance with one embodiment of the present invention controls the inter-particle distances of the particles 1812 by controlling the intensity or direction of the DC electric field applied through electrodes 1830 and 1840, thereby controlling the wavelength of light (that is, color) reflected from the particles 1812 (first mode).

As described in detail with reference to the first mode, when the particles 1812 have the same electric charges, the particles 1812 may be regularly arranged at distances where the electrical attraction due to the external electric field, the electrical repulsion between the particles 1812 having electric charges of the same sign, and the polarization due to the external electric field are in an equilibrium state, and the particles 1812 arranged at the predetermined distance may act as the photonic crystal. Meanwhile, when the particles 1812 have the steric hindrance capable of causing the steric hindrance effect, the particles 1812 may be regularly arranged at distances where the repulsion between the particles due to the steric effect and the electrical attraction due to the polarization by the external electric field, etc., are in an equilibrium state, and the particles 1812 arranged at a predetermined distance may act as the photonic crystal.

In addition, the display device 1800 in accordance with one embodiment of the present invention controls the inter-particle distances of the particles 1812 by controlling the intensity, direction or AC frequency of the AC electric field applied through the electrodes 1830 and 1840, thereby controlling the wavelength of light (that is, color) reflected from the particles 1812 (first mode).

As described above, since the wavelength of light reflected from the particles 1812 arranged at a predetermined distance is determined by the distance of the particles 1812, the distance of the particles 1812 is controlled by the intensity and direction of the electric filed applied through the electrode, thereby arbitrarily controlling the wavelength of light reflected from the particles 1812.

First, the display device 1800 in accordance with one embodiment of the present invention controls the intensity or direction of the DC electric field applied through the electrodes 1830, 1840 and 1850, such that the intensity of the electric field is a specific threshold value or more, thereby moving the particles 1812 according to the principle of the electrophoresis or the dielectrophoresis, such that the unique color of any one of the solutions 1812 and 1814, the particles 1812 and the solvent 1814 may be displayed (second mode).

Referring to FIG. 18(b), as described in detail with reference to the above second mode, when the electric field is not applied, the particles 1812 are irregularly dispersed in the solvent 1814, and thus, the color of the solution, in which the unique color of the particles 1812, the unique color of the solvent 1814 and the color of light reflected or scattered from the unique color of the particles 1812 or the solvent 1814 are mixed, may be displayed (solution color reflection mode).

Referring to FIG. 18(c), as described in detail with reference to the second mode, when the particles 1812 have electric charges and the electric field is applied at so that the upper electrode 1830 becomes the electrode of a sign opposite to the electric charges of the particles 1812, the particles 1812 moves toward the upper electrode 1830 by the electrophoresis, and thus, the unique color of the particles 1812 may be displayed on the display unit 1810 (particle color reflection mode).

Referring to FIG. 18(d), as described in detail with reference to the second mode, when the particles 1812 have electric charges and the electric field is applied so that the lower electrode 1840 becomes the electrode of a sign opposite to the electric charges of the particles 1812, the particles 1812 move toward the lower electrode 1840 by the electrophoresis, and thus, the unique color of the solvent 1814 may be displayed on the display unit 1810 (solvent color reflection mode).

Next, the display device 1800 in accordance with one embodiment of the present invention control the intensity or direction of the electric field applied to through the electrodes 1830, 1840 and 1850 to control the distance, location or arrangement of the particles, thereby tuning the transmittance of light incident to the display device (third mode).

Referring to FIG. 18(e), as already described in detail with reference to the third mode, the light in the ultraviolet or infrared spectrum is reflected from the photonic crystals composed of the particles 1812 by applying the electric field having the intensity of the specific threshold or more or the specific threshold or less to the photonic crystals composed of the particles. 1812 disposed at a predetermined distance, but the light in the visible spectrum is not reflected, such that the light in the visible spectrum incident to the display device 1800 may go through the display device 1800 at the high transmittance of light (photonic crystal transmittance tuning mode).

Referring to FIG. 18(f), as already described in detail with reference to the third mode, when the particles 1812 have electric charges and the electric field is applied so that the local electrode 1850 becomes the electrode of a sign opposite to the electric charges of the particles 1812, the particles 1812 moves toward the local electrode 1850 by the electrophoresis so as to be concentrated around the local electrode 1850, such that the light incident to the display device 1800 may go through the display device 1800 at high transmittance of light without being reflected or scattered by the particles (particlephoresis transmittance tuning mode).

Meanwhile, referring to FIG. 18(g), as already described in detail with reference to the third mode, when the electric field is applied to the particles 1812 and the solvent 1814 when the particles 1812 having the electrical polarization characteristic are dispersed in the solvent 1814, the particles 1812 are polarized by the electric field to be polarized in the same direction along the direction of the electric field. In this case, since the electrical attraction is generated between the particles 1812 polarized in the same direction, the particles 1812 dispersed in the solvent 1814 are attracted to each other, such that the particles 1812 may be regularly arranged in a direction parallel to the direction of the electric field. Therefore, the transmittance of light incident on the display device 1800 can be tuned by controlling the arrangement state of the particles 1812 regularly arranged in a direction parallel to the direction of the electric field by tuning the intensity or direction of the electric field (particle alignment transmittance tuning mode).

Referring to FIG. 18, the representative embodiment stepwise performed from the first mode to the third mode using the DC electric field will be described in detail.

In accordance with one embodiment of the present invention, any one of the first mode, the second mode and the third mode may be switched to the other mode by controlling the intensity or direction of the DC electric field applied to the display unit 1810 through the electrode.

First, when the electric field is not applied (V=0), since the particles are irregularly dispersed within the display unit 1810, the light incident on the display unit 1810 may display the color of the solvent, in which the color irregularly scattered or reflected by the particles 1812 and the unique colors of the particles and the solvent are mixed (second mode, see FIG. 18(b)).

Next, when the electric field having the intensity within the predetermined range is applied by increasing the intensity of the electric field applied to the display unit 1810 (V=V1), the particles 1812 within the display unit 1810 are regularly arranged at the predetermined distance, and thus, the photonic crystals that reflect the light having the specific wavelength range may be formed, such that the color of the specific wavelength range reflected to the photonic crystals may be displayed on the display unit 1810 (first mode, see FIG. 18(a)) and the wavelength range of the reflected light reaches the infrared or ultraviolet spectrum beyond the visible spectrum as the intensity of the electric field is further increased, and thus, most of visible rays are transmitted, such that the transmittance of the incident light may be increased (third mode, see FIG. 18(e)).

Next, when the electric having larger intensity is applied (V=V2), since the particles 1812 may be arranged in a direction parallel to the direction of the electric field, the transmittance of the incident light may be tuned so that the transmittance of the incident light is increased or reduced according to the incident angle of light incident on the display unit 1810 (third mode, see FIG. 18(g)).

Next, the intensity of the electric field applied to the display unit 1810 is further increased, and thus, the particles 1812 within the display unit 1810 may move or be concentrated on the predetermined location adhered to the electrode by the electrophoresis force when the electric field having the intensity of the predetermined range or more is applied (V=V3), such that the unique color of the particles 1812 or the solvent 1814 is displayed on the display unit 1810 (second mode, see FIGS. 18(c) and (d)), or the transmittance of the incident light may be increased as the particles 1812 is concentrated on the local electrode 1850 (third mode, see FIG. 18(f)).

Further, the embodiment of the case in which the first mode, the second mode and the third mode are performed and the embodiment of the case in which any one of the first mode, the second mode and the third mode is switched to the other mode will be described below in more detail.

First, it may be assumed the case in which the particles have the electric charges of the same sign and the electrode includes the light transmissive material. In this case, when the electric field is not applied, the particles are irregularly dispersed in the solvent, and thus, the second mode, in which the color of the solution is displayed, may be performed. Further, when the electric field is the DC electric field and the intensity of the DC electric field is controlled within the range capable of regularly controlling the inter-particle distances, the first mode, in which the wavelength of light reflected from the particles according to the intensity of the DC electric field is controlled within the visible spectrum, may be performed or the third mode, in which the wavelength of light reflected from the particles is controlled out of the visible spectrum to tune the transmittance of the incident light, may be performed. In addition, when the electric field is the DC electric field and the intensity of the electric field is the threshold value or more that can concentrate the particles toward the electrode by the electrophoresis, the second mode, in which the particles are concentrated on the upper electrode to display the color of the particles or concentrated on the lower electrode to display the color of the solvent, may be performed or the third mode, in which the particles are concentrated on the local electrode to tune the transmittance of the incident light, may be performed. In addition, when the electric field is the DC electric field and the intensity of the DC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed. In this case, when the electric field is the AC electric field and the intensity and frequency of the AC electric field is controlled within the range capable of regularly controlling the inter-particle distances, the first mode, in which the wavelength of light reflected from the particles according to the intensity of the DC electric field is controlled within the visible spectrum, may be performed or the third mode, in which the wavelength of light reflected from the particles is controlled out of the visible spectrum to tune the transmittance of the incident light, may be performed. In addition, when the electric field is the AC electric field and the intensity and frequency of the AC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed.

Next, it may be assumed another case in which the particles have the electrical polarization characteristic (when the electric field is applied, the electrical polarization is induced and the electrical polarization is changed according to the change in the applied electric field) and includes the structure generating the steric effect and the electrode includes the light transmissive material. In this case, when the electric field is not applied, the particles are irregularly dispersed in the solvent, and thus, the second mode, in which the color of the solution is displayed, may be performed. Further, when the electric field is the DC electric field and the intensity of the DC electric field is controlled within the range capable of regularly controlling the inter-particle distances, the first mode, in which the wavelength of light reflected from the particles according to the intensity of the DC electric field is controlled within the visible spectrum, may be performed or the third mode, in which the wavelength of light reflected from the particles is controlled out of the visible spectrum to tune the transmittance of the incident light, may be performed. In addition, when the electric field is the DC electric field and the intensity of the electric field is the threshold value or more that can concentrate the particles toward the electrode by the dielectrophoresis, the second mode, in which the particles are concentrated on the upper electrode to display the color of the particles or concentrated on the lower electrode to display the color of the solvent, may be performed or the third mode, in which the particles are concentrated on the local electrode to tune the transmittance of the incident light, may be performed. In addition, when the electric field is the DC electric field and the intensity of the DC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed. In this case, when the electric field is the AC electric field and the intensity of the AC electric field is controlled within the range capable of regularly controlling the inter-particle distances, the first mode, in which the wavelength of light reflected from the particles according to the intensity of the DC electric field is controlled within the visible spectrum, may be performed or the third mode, in which the wavelength of light reflected from the particles is controlled out of the visible spectrum to tune the transmittance of the incident light, may be performed. In addition, when the electric field is the AC electric field and the intensity and frequency of the AC electric field may be controlled within the range capable of arranging the particles in a direction parallel to the direction of the AC electric field, the third mode, in which the particles are arranged in the state of forming a predetermined angle to the progressing direction of the incident light to tune the transmittance of the incident light, may be performed.

As shown by multiple arrows in FIG. 18, seven modes a to g, that is, the photonic crystal reflection mode, the solution color reflection mode, the particle color reflection mode, the solvent color reflection mode, the photonic crystal transmittance tuning mode, the particlephoresis transmittance tuning mode and the particle alignment transmittance tuning mode may organically switched to each other if necessary. In the embodiment, a total 7*612=21 types of the mode switching can be performed. Therefore, various hues tuning and various transmittance tuning can be implemented within the same unit pixel of the display region.

Control Unit of Display Device

Meanwhile, the display device according to one embodiment of the present invention may include a control unit (not shown) that performs a function of controlling the intensity, direction, type, application frequency, frequency, application time, application location, etc., of voltage generating the electric field applied to the particles and the solvent. More specifically, the control unit in accordance with the one embodiment of the present invention generates a control signal applying a predetermined voltage to an electrode applying the electric field to the particles and the solvent so as to apply the predetermined electric field to the particles and the solvent and generates a control signal setting the intensity, direction, type, application frequency, frequency, application time, application location, etc., of voltage so as to control the electric field applied to the particles and the solvent to be appropriate for each requirement, thereby enabling to be switched between various modes as described above. According to one embodiment of the present invention, the control unit may be included in the display device in a type of an operating system, application program modules and other program modules and may physically be stored in several known storage devices. In addition, the program module may also be stored in a remote storage device communicable with the display device. Meanwhile, the program module includes a routine, a subroutine, a program, an object, a component, a data structure, etc., that executes specific tasks described below in accordance with one embodiment of the present invention or executes a specific abstraction data type, but is not limited thereto.

Machine Readable Storage Medium

The switching process or configuration between the plurality of modes described up to now is stored on the machine readable storage medium and is read and executed by a machine (for example, computer) and may be executed by programs including instructions or program codes that execute the aforementioned mode switching process. For example, it will be briefly described a case in which a process of implementing various hues by a simple photonic crystal reflection mode and tuning the transmittance by the particle alignment mode so as to be switched to each other within the unit pixel is executed by a machine. The program may include first instruction that regularly arranges the inter-particle distances to apply the AC voltage having a magnitude predominantly reflecting the wavelength of the visible rays and a second instruction that applies the voltage having a smaller magnitude than the voltage of the magnitude to align the particles and control the predominantly transmitted light amount. The machine readable storage medium may include any mechanism storing or transmitting information in a type that can be read by the machine (for example, computer). For example, the machine readable storage medium may include a ROM, a RAM, a magnetic disk storage medium, an optical storage medium, a flash memory device, a signal transferred in an electrical type, a signal transferred in an optical type, a signal transferred in an acoustic type or a signal transferred in other types (for example, a carrier, an infrared signal, a digital signal, an interface transmitting and receiving a signal, etc.), etc.

Various Application Embodiments of Display Device

Figure 19:
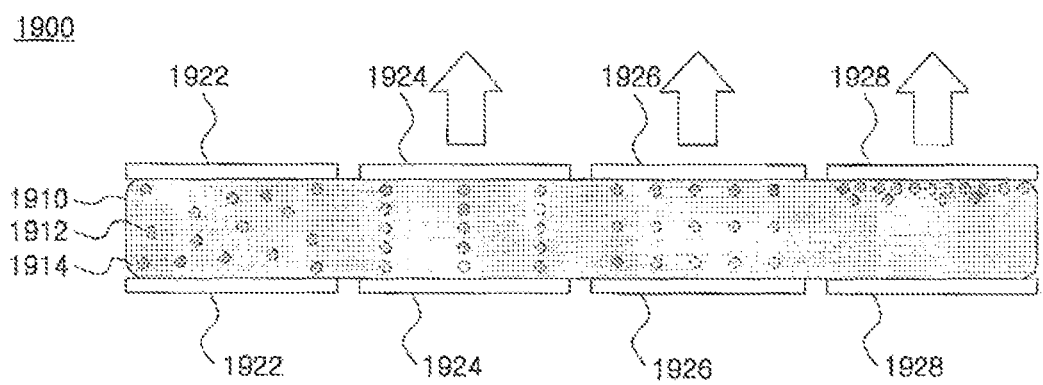
FIG. 19 is a view exemplarily illustrating the configuration of the display device driven by a plurality of electrodes in accordance with one embodiment of the present invention.

FIG. 19 is a view exemplarily illustrating the configuration of the display device driven by a plurality of electrodes in accordance with one embodiment of the present invention.

Referring to FIG. 19, electrodes 1922, 1924, 1926' and 1928 in accordance with one embodiment of the present invention may include a plurality of electrodes 1922, 1924, 1926 and 1928 that are capable of independently applying an electric field only to partial regions of a display unit 1910 in order to control the distance, location and arrangement of the particles 1912 included in the display unit 1910 more precisely and independently. The plurality of electrodes 1922, 1924, 1926 and 1928 can be individually controlled by a fine driving circuit, such as a thin film transistor (TFT). In addition, in accordance with one embodiment of the present invention, the electrodes 1922, 1924, 1926 and 1928 may be made of a light transmissive material so as not to obstruct the progression of the light emitted from the display unit 1910. For instance, the electrodes 1922, 1924, 1926 and 1928 may be made of indium tin oxide (ITO), titanium oxide (TiO$_2$), carbon nano tubes and other electrically conductive polymer films, etc.

Referring to FIG. 19, the electrodes 1922, 1924, 1926 and 1928 may include a first electrode 1922, a second electrode 1924, a third electrode 1926 and a fourth electrode 1928. First, because no electric filed is applied to a space covered by the first electrode 1922 to which no voltage is applied, the particles 1912 located in the space covered by the first electrode 1922 may be irregularly arranged. Therefore, the display unit 1910 controlled by the first electrode 1922 may not represent a color of a solution (second mode). Next, because electric fields corresponding to respective voltages are applied to spaces covered by the second electrode 1924, third electrode 1926 and fourth electrode 1928 to which voltages of different levels are applied, the particles 1912 located in the spaces covered by these electrodes may be controlled in different patterns different from each other while electrical attraction induced by the electric fields (i.e., a force that causes electrophoresis), electrical repulsion between the particles 1912 having electric charges of the same sign and electrical attraction induced by the polarization (or its increase) of the particles 1912 or solvent 1914, etc., are in equilibrium. Accordingly, the display unit 1910 controlled by the second electrode 1924, third electrode 1926 and fourth electrode 1928 implement different modes according to the corresponding region, thereby displaying different colors. For instance, under the assumption that a voltage applied to the fourth electrode 1928 is greater than a voltage applied to the third electrode 1926, the particles 1912 located in the space covered by the fourth electrode 1228 is concentrated at the location closed to the upper electrode. On the other hand, the particles 1912 located in the space covered by the third electrode 1926 may be regularly arranged at the predetermined distances. Accordingly, the display unit 1910 controlled by the fourth electrode 1928 displays the unique color of the particles 1912 and the display unit 1910 controlled by the third electrode 1926 may reflect the light in the specific wavelength range reflected from the photonic crystals composed of the particles 1912.

Figure 20:
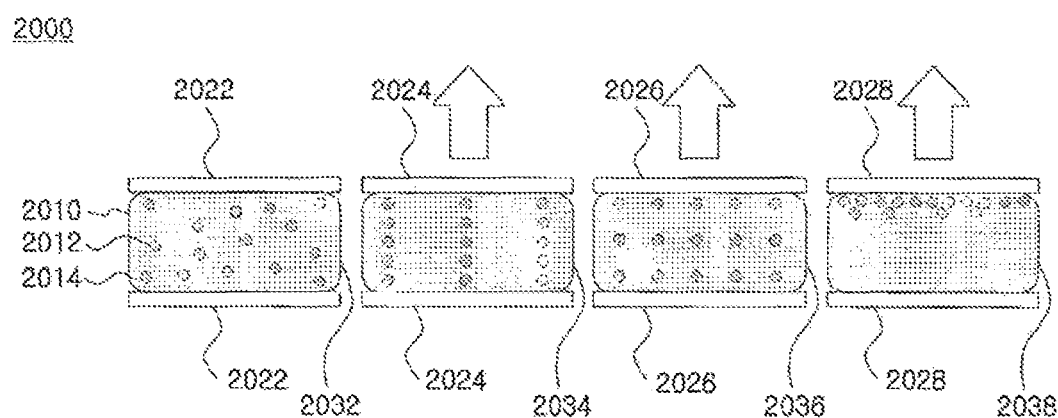
FIG. 20 is a view illustrating a configuration in which the particles and solvent included in the display device are encapsulated in a plurality of capsules in accordance with one embodiment of the present invention.

FIG. 20 is a view illustrating a configuration in which the particles and solvent included in the display device are encapsulated in a plurality of capsules in accordance with one embodiment of the present invention.

Referring to FIG. 20, particles 2012 and solvent 2014 included in a display device 2000 in accordance with one embodiment of the present invention may be encapsulated in capsules 2032, 2034, 2036 and 2038 made of a light transmissive insulating material. By encapsulating the particles 2012 and the solvent 2014 as shown in FIG. 20, direct interference, such as incorporation, between the particles 2012 and solvent 2014 included in different capsules can be prevented; the particles can be prevented from being irregularly arranged due to electrohydrodynamic (EHD) motion of the particles having electric charges; the film processibility of the display device 2000 can be improved by making sealing of the particles and solvent easier; and the distance, position and arrangement contained in the display device 2000 can be independently controlled for each capsule.

Referring to FIG. 20, the display device 2000 in accordance with one embodiment of the present invention may include four capsules 2032, 2034, 2036 and 2038. A first voltage, second voltage, third voltage and fourth voltage can be respectively applied to electrodes 2022, 2024, 2026 and 2028 located in the portions of the first capsule 2032, second capsule 2034, third capsule 2036 and fourth capsule 2038. Accordingly, the respective capsules, to which electric fields of different intensities and different directions are applied, reflect light of different wavelength ranges. As such, with the display device 2000 in accordance with one embodiment of the present invention, an independent display can be implemented for each capsule.

Unlike FIG. 20, if the electrodes and the capsules are not disposed in a corresponding way to each other and instead, a region covered by electrodes is smaller than a capsule or one capsule is covered by two or more electrodes, an independent display can be implemented as desired for a given region of the display unit by using an electrode pattern. That is, in accordance with one embodiment of the present invention, when an electric field is applied to a specific region in a capsule through one of the plurality of electrodes that covers the capsule, only the solvent and/or particles existing in the specific region among the particles existing in the capsule reacts with the electric field, but the particles and/or solvent existing in other regions does not react with the electric field. Thus, a region (i.e., display region) on which light of a specific wavelength is reflected can be determined by an electrode pattern, rather than by the size or pattern of the capsules.

Figure 21:
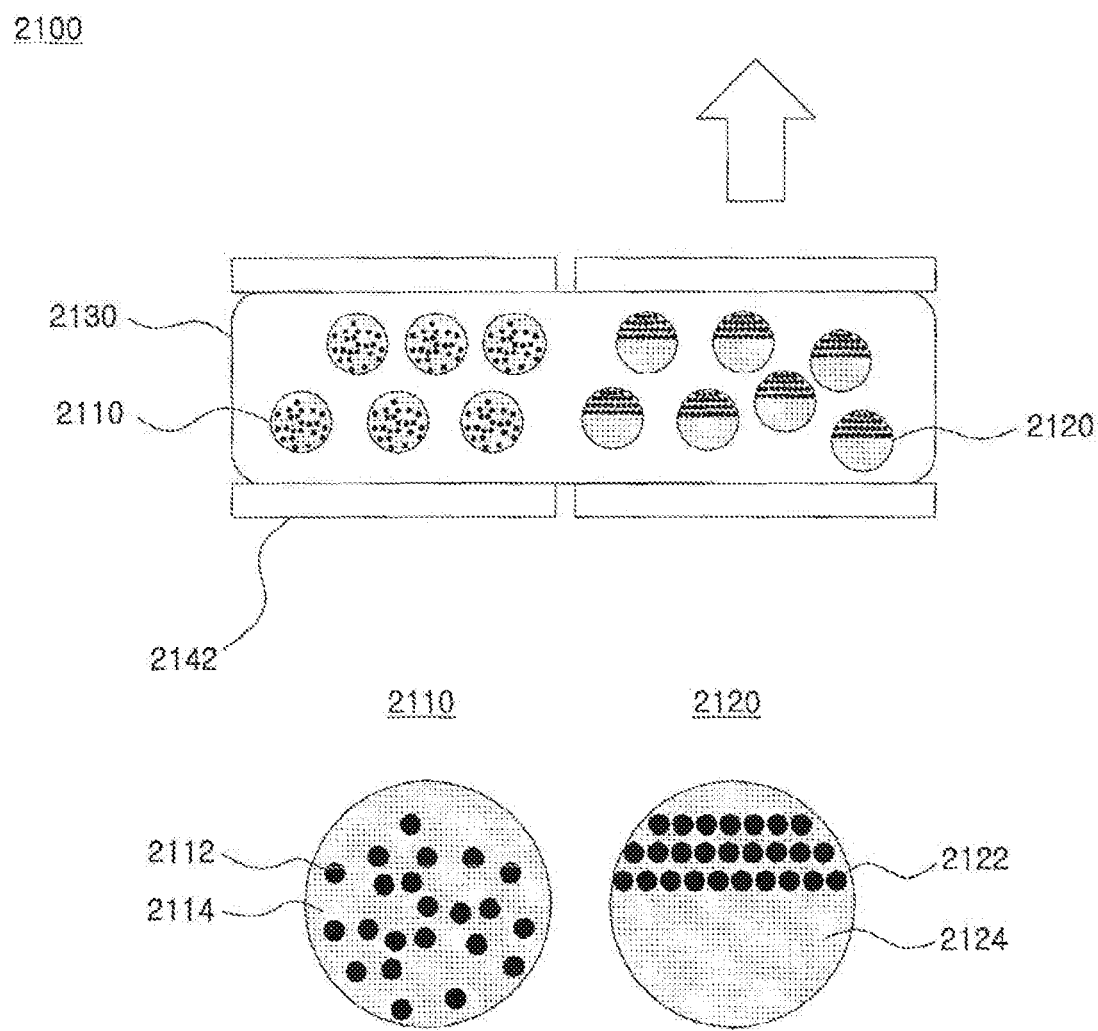
FIG. 21 is a view illustrating a configuration in which particles and solvent included in the display device are dispersed in a medium in accordance with one embodiment of the present invention.

FIG. 21 is a view illustrating a configuration in which particles and solvent included in the display device are dispersed in a medium in accordance with one embodiment of the present invention.

Referring to FIG. 21, the particles and solvent included in a display device 2100 in accordance with one embodiment of the present invention may be dispersed in a medium 2130 made of a light transmissive material. More specifically, a predetermined amount of particles and solvent may be dispersed and distributed in the form of droplets in the light transmissive insulating material 2130 which does not change in response to external stimuli such as an electric field, thus partially isolating the particles contained in the display device 2100. That is, in accordance with one embodiment of the present invention, the solvent with the particles dispersed therein is dispersed and distributed in the light transmissive medium 2130 to prevent the occurrence of direct interference, such as incorporation, between the particles or solvent included in different regions to thereby control the inter-particle distances contained in the display device 2100 more independently.

Referring to FIG. 21, the display device 2100 in accordance with one embodiment of the present invention may include a plurality of regions 2112 and 2114 included in the medium 2130. More specifically, the distance, location and arrangement of the particles contained in a first region 2110 located in between the first electrodes 2142 to which a first voltage is applied and the distance, location and arrangement of the particles contained in the second region 2120 located in between second electrodes 2144 to which a second voltage is applied can be controlled independently from each other. Therefore, the first region 2110 and the second region 2120 can display different colors. Accordingly, with the display device 2100 in accordance with one embodiment of the present invention, an independent display can be implemented for each region. In FIG. 21, since the voltage applied through the upper and lower electrodes drops by a light transmissive insulation medium 2130 and may not be uniform, the solution dispersed in the light transmissive medium may contact the upper and lower electrodes or may be uniformly distributed in the light transmissive medium.

Figure 22:
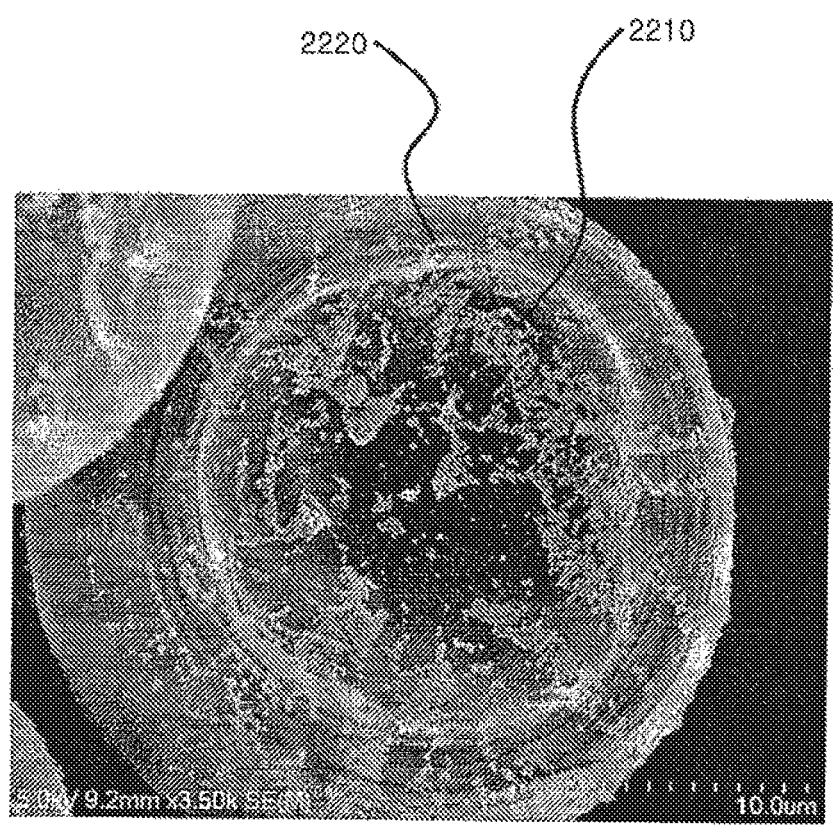
FIG. 22 is a view exemplarily illustrating the composition of a solution encapsulated with a light transmissive medium in accordance with one embodiment of the present invention.

FIG. 22 is a view exemplarily illustrating a composition of a solution encapsulated with a light transmissive medium in accordance with one embodiment of the present invention. For reference, FIG. 22 corresponds to a photograph taken by an electron microscope on a cross-section of the display device 2100 mentioned with reference to FIG. 21.

Referring to FIG. 22, it can be seen that the solvent with the particles 2210 dispersed therein is encapsulated in a light transmissive insulating material which does not flow by an electric field. In accordance with one embodiment of the present invention, the solution (i.e., mixture of the particles and solvent) with the particles 2210 dispersed in the solvent in a colloidal state is mixed with a different kind of immiscible solution to form an emulsion, and then, the emulsion interface is coated with the light transmissive material 2220, thereby being encapsulated in the light transmissive material 2220. Here, an oxidized steel (FeOx) cluster coated with a charge layer may be used as the particles, a solvent having electrical polarization characteristic may be used as the solvent, and a light transmissive polymer material containing gelatin may be used as the capsule material.

Figure 23:
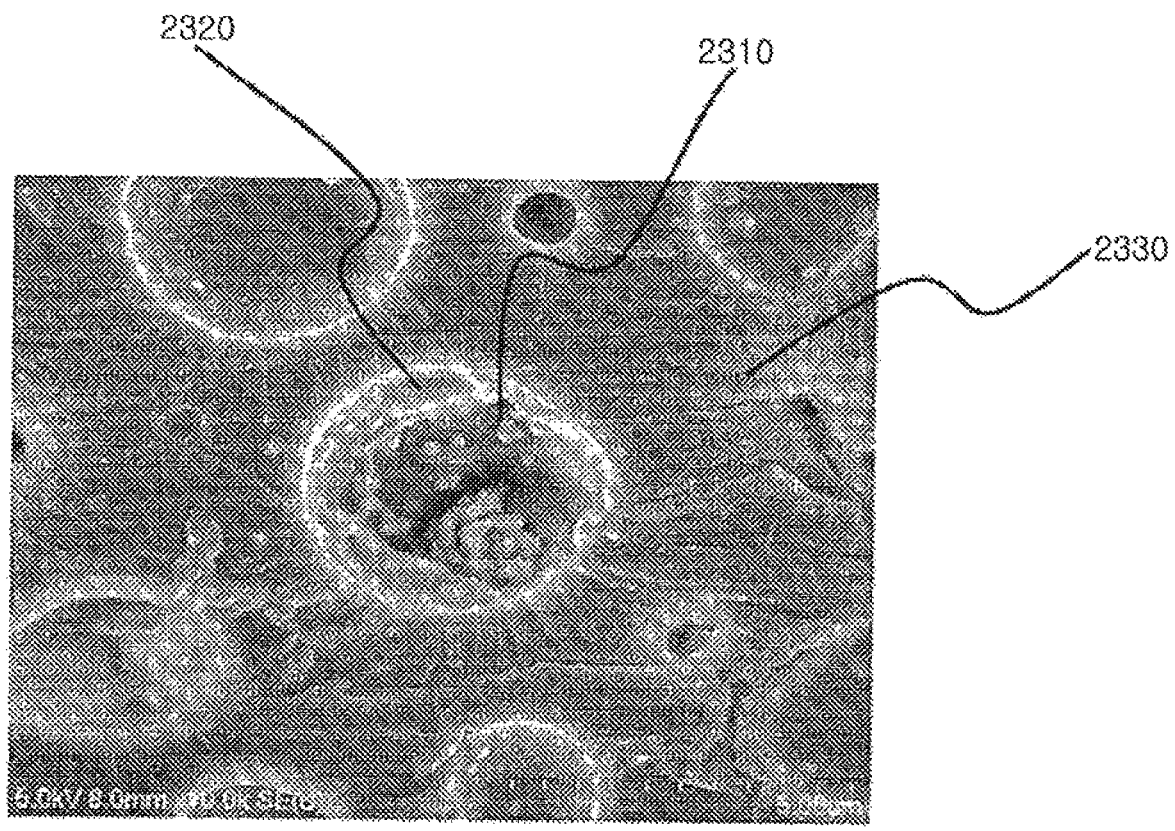
FIG. 23 is a view illustrating the composition of the particles and solvent dispersed in a medium in accordance with one embodiment of the present invention.

FIG. 23 is a view illustrating the composition of the particles and solvent dispersed in a medium in accordance with one embodiment of the present invention. For reference, FIG. 23 corresponds to a photograph taken by an electron microscope on a cross-section of the display device 1600 mentioned with reference to FIG. 21.

Referring to FIG. 23, it can be seen that the solvent 2320 with the particles 2310 dispersed therein is dispersed in a medium 2330 made of light transmissive material of a solid or gel state which does not change in response to external stimuli, such as an electric field, a magnetic field, etc. In accordance with one embodiment of the present invention, the particles 2310 having electric charges are dispersed in the solvent 2320 and the resultant dispersion are evenly mixed in the light transmissive medium 2330 in the form of droplets, thereby obtaining the composition shown in FIG. 23. Moreover, in accordance with one embodiment of the present invention, in FIG. 23, the particles 2310 may be an oxidized steel (FeOx) cluster coated with a charge layer, the solvent 2320 may be ethylene glycol (EG), and the medium 2330 may be polydimethylsiloxane (PDMS).

Figure 24:
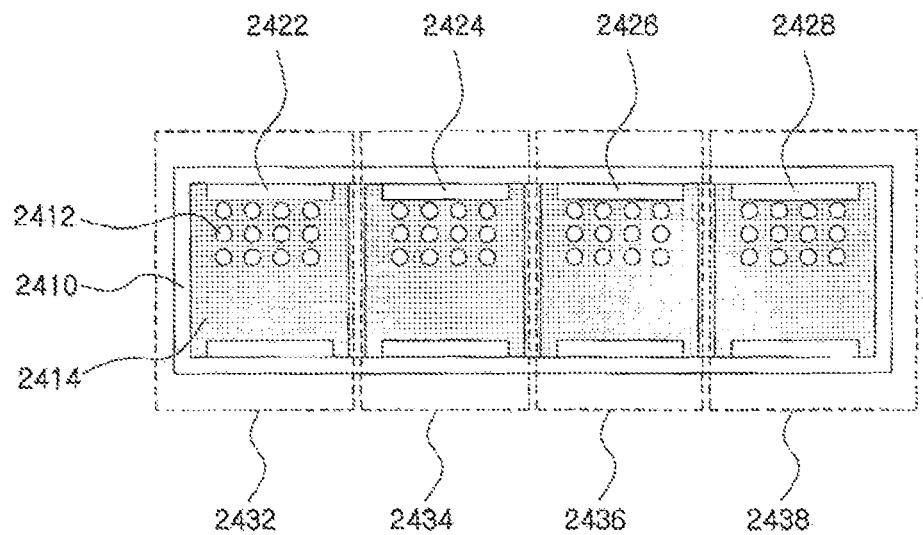
FIG. 24 is a view illustrating a configuration in which the particles and solvent included in the display device are partitioned into a plurality of cells in accordance with one embodiment of the present invention.

FIG. 24 is a view illustrating a configuration in which the particles and solvent included in the display device are partitioned into a plurality of cells in accordance with one embodiment of the present invention.

Referring to FIG. 24, the particles 2412 and solvent 2414 included in the display device 2400 in accordance with one embodiment of the present invention can be isolated by partition walls etc., made of an insulating material and partitioned into cells 2432, 2434, 2436 and 2438. In accordance the embodiment of the present invention, by partitioning the particles 2412 and the solvent 2414, direct interference, such as incorporation, between the particles 2412 and the solvent 2414 to be included in different cells can be prevented from occurring. Accordingly, the distance, location, arrangement of the particles contained in the display device 2400 can be independently controlled for each cell, and the arrangement state of particles due to the motion of the electrohydroddynamci (EHD) of the particles having the electric charges can be prevented from being irregularly arranged.

Meanwhile, unlike in FIG. 24, even if the electrodes and the cells are not disposed in a corresponding manner to each other but instead a region covered by electrodes is smaller than a cell or one cell is covered by two or more electrodes, an independent display can be implemented as desired for an any region of the display unit by using an electrode pattern. That is, according to one embodiment of the present invention, when an electric field is applied to a specific region in a cell through one of the plurality of electrodes that cover the cell, only the solvent and/or particles existing in the specific region among the particles existing in the cell reacts with the electric field, but the particles and/or solvent existing in other regions does not react with the electric field. Thus, a region (i.e., display region) on which light of a specific wavelength is reflected can be determined by an electrode pattern, rather than by the size or pattern of the cells.

Meanwhile, in order to manufacture a structure shown in FIG. 24, the partition walls are first manufactured on the lower substrate by methods such as screen printing, gravure printing, lithography, etc., and then, may be manufactured by filling the solution, in which the particles are dispersed, such as one drop filling (ODF), etc.

Further, as the partition walls for dividing the solution in FIG. 24, the empty space other than the insulating material in the solid form may be used. That is, the solution may be partitioned by not dispersing the particles in a region in which the affinity with the solution is low by dividing the region in which the affinity with the solution is locally high and low due to the patterning of the substrate. For example, when the solution is hydrophilic, the partition wall portion is manufactured to have liphophilic characteristic by patterning the substrate and the region into which the solution will be permeated is manufactured to have liphophilic characteristic, such that the solution may be filled only in the hydrophilic portion and may be partitioned by the liphophilic region. Further, when the lower substrate is liphophilic and the lower electrode is hydrophilic, the cell partition may be simultaneously performed by the patterning of the lower electrode.

As described above, when encapsulating the particles and the solvent in accordance with one embodiment of the present invention or dispersing or partitioning the particles and the solvent in the medium, the inter-particle distance, location and arrangement of particles can be independently controlled for each capsule, each region or each cell, thereby more precisely implementing the display and facilitating the maintenance and repair of the display device.

Figure 25:
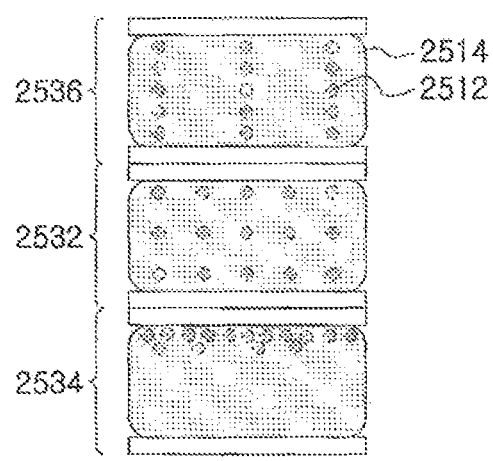
FIGS. 25 and 26 are views exemplarily illustrating a configuration in which the display device in accordance with one embodiment of the present invention is combined with each other in a vertical direction or a horizontal direction.
Figure 26:
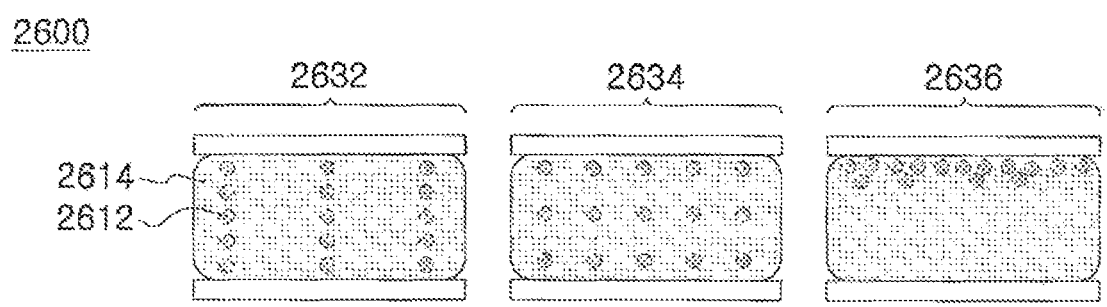

FIGS. 25 and 26 are views exemplarily illustrating a configuration in which the display device in accordance with one embodiment of the present invention is combined with each other in a vertical direction or a horizontal direction.

Referring first to FIG. 25, particles 2512 and a solvent 2514 included in a display device 2500 in accordance with one embodiment of the present invention may be included in each of the plurality of cells 2532, 2534 and 2536 that are coupled (that is, stacked) with each other in a vertical direction, thereby independently controlling the distance, location and arrangement of the particles included in the display device 2400 for each cell. Therefore, when the electrode 2520 located among the plurality of cells 2532, 2534 and 2536 that are stacked with one another is made of the light transmissive material, the color due to each mode independently implemented in the plurality of stacked cells 2532, 2534 and 2536 may be displayed by being mixed with each other. For example, the first mode may be implemented in the first cell 2532 to control the color of the reflected light, the second mode may be implemented in the second cell 2534 to display the unique color of the particles 2512, and the third mode may be implemented in the third cell 2536 to tune the transmittance of light. Therefore, the mixing of more various colors may be implemented and the transmittance and the hue may be combined to be appropriate to requirements.

Next, referring to FIG. 26, particles 2612 and a solvent 2614 included in a display device 2600 in accordance with one embodiment of the present invention may be included in each of the plurality of cells 2632, 2634 and 2636 that are coupled with each other in a horizontal direction, thereby independently controlling the distance, location and arrangement of the particles included in the display device 2400 for each cell. Therefore, the color or the transmittance of light of each mode implemented in each of the plurality of cells 2632, 2634 and 2636 coupled with each other may be shown while being mixed with one another. For example, the first mode may be implemented in the first cell 2632 to control the color of the reflected light, the second mode may be implemented in the second cell 2634 to display the unique color of the particles 2612, and the third mode may be implemented in the third cell 2636 to tune the transmittance of light.

Meanwhile, although the embodiments of FIGS. 19 to 26 have been described with respect to the case where both of the upper and lower electrodes are divided into a plurality of electrodes, either one of the upper and lower electrodes may be formed as a common electrode. For instance, in the actual application to display products, the upper electrode may be formed as a common electrode made of a transparent electrode material, while the lower electrode may be divided into unit cells and connected to a transistor for driving each cell and may not be made of a transparent electrode material. Further, the transparent upper electrode is used and the particles and the voltage of the same sign as the charged electric charges are applied to the lower electrode, such that the charged particles are arranged on the upper electrode, thereby minimizing the phenomenon that the intensity of light is attenuated by the solvent.

Figure 27:
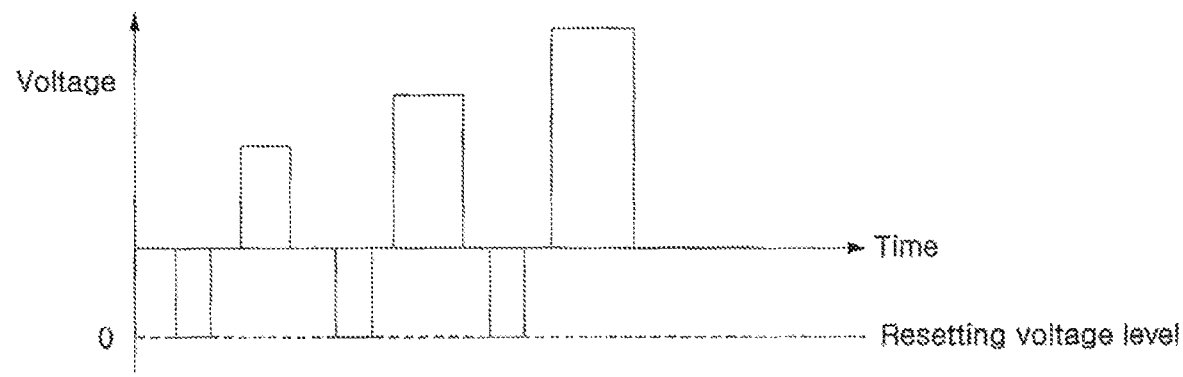
FIGS. 27 to 29 are views illustrating a pattern of voltages applied to the display device in accordance with one embodiment of the present invention.
Figure 28:
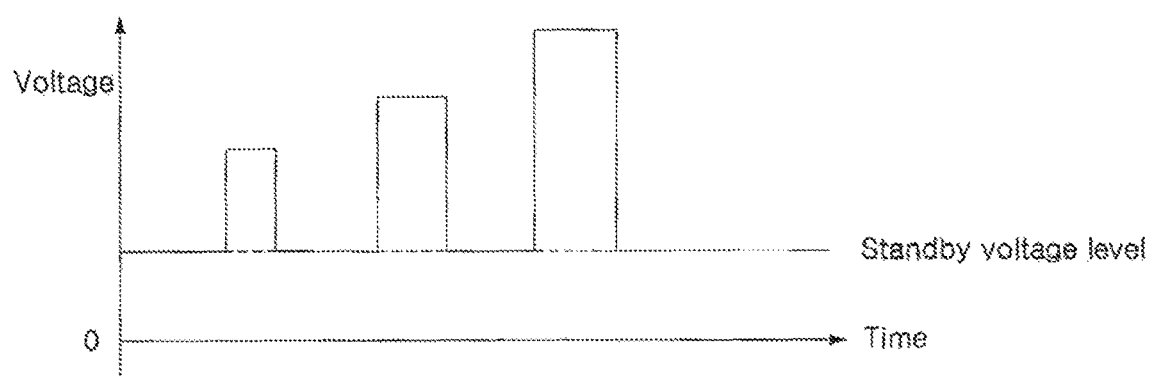
Figure 29:
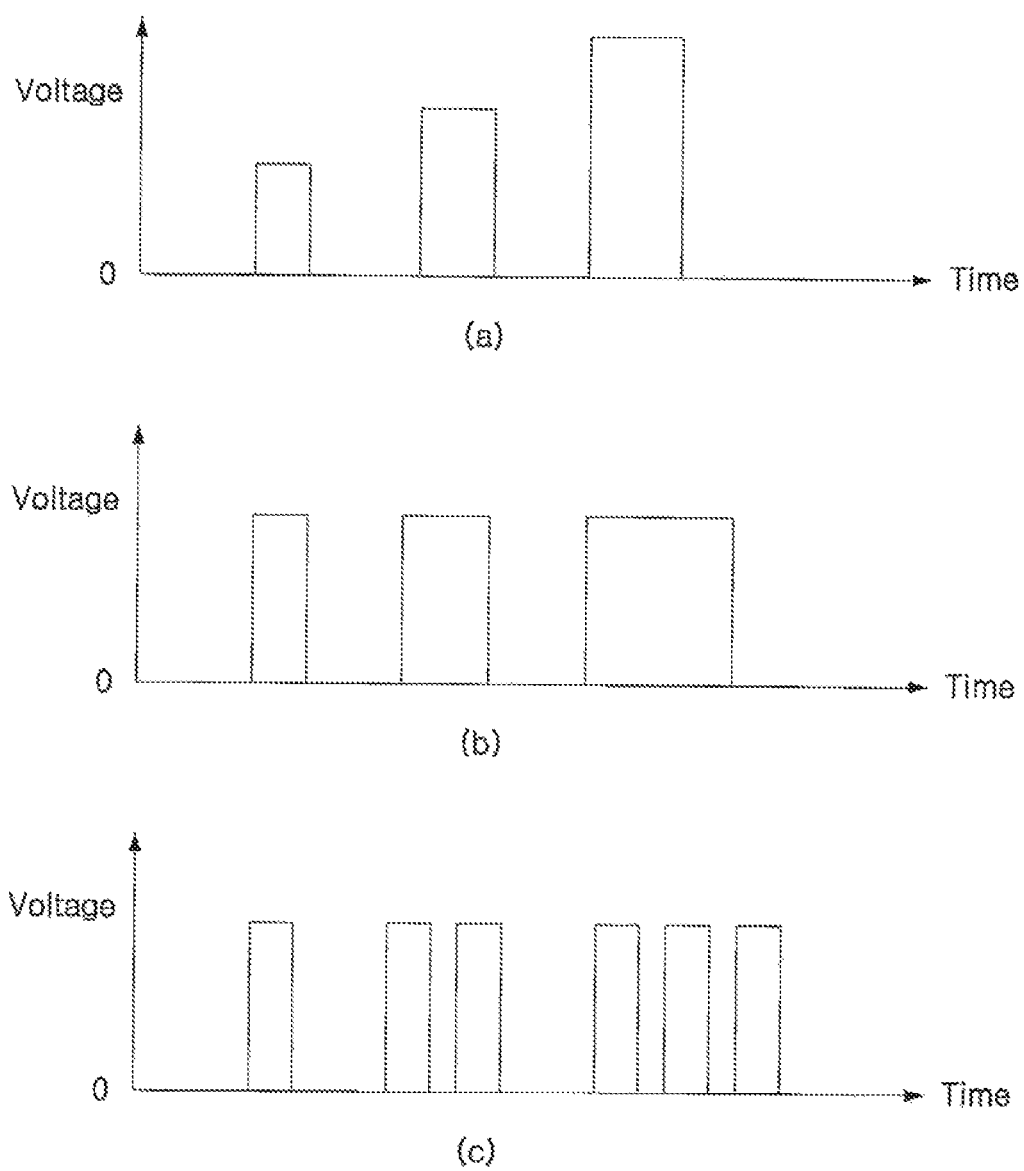

FIGS. 27 to 29 are views illustrating a pattern of voltages applied to the display device in accordance with one embodiment of the present invention.

First, referring to FIG. 27, the display device in accordance with one embodiment of the present invention may further include a control unit (not shown) that performs the function of resetting the inter-particle distances at times between the intervals of changing of the intensity and/or direction of an electric field when sequentially applying electric fields of different intensities and/or different directions to the dispersion including the particles, and thus, achieving a continuous display. More specifically, when sequentially applying a first voltage and a second voltage using the electrode applying the electric field to the particles and solvent, the control unit in accordance with one embodiment of the present invention performs the function of bringing the particles, which are arranged at predetermined distance, position and arrangement by the first voltage, back to the initial or reset state by applying a reset voltage having the opposite polarity to the first voltage to the particles and solvent before applying the second voltage after the application of the first voltage. With this, the display device in accordance with one embodiment of the present invention can improve display performance, including improving the operating speed and suppressing afterimages. Moreover, according to one embodiment of the present invention, the reset voltage is applied with the opposite polarity to the just previously applied voltage. Therefore, according to one embodiment of the present invention, even when the display device is turned off, the operating speed can be raised by forcibly moving the particles, which are moved and arranged in a predetermined direction by the just previously applied voltage, into the opposite direction.

Next, referring to FIG. 28, the display device in accordance with one embodiment of the present invention may further include a control unit (not shown) that performs the function of maintaining the inter-particle distances at predetermined distance, location or arrangement in advance to be a predetermined distance, location or arrangement when sequentially applying electric fields of different intensities and different directions to the particles and solvent and achieving a continuous display. More specifically, when sequentially applying a first voltage and a second voltage to the electrode applying the electric field to the particles and solvent, the control unit in accordance with one embodiment of the present invention performs the function of rapidly adjusting the distance, location or arrangement of the particles to the desired distance, location or arrangement by applying a predetermined standby voltage in advance and then applying the first voltage or the second voltage. With this, the display device in accordance with one embodiment of the present invention can improve display performance, including increased response speed and faster screen change. For instance, in the conventional electronic paper technology, particles of a specific color had to be moved to run through from one end to the opposite end in a cell in order to display a particular color. In contrast, in the present invention, photonic crystals can be realized in a manner that a standby voltage having a relatively low level enough not to make reflected light in a visible spectrum appear is applied so as to concentrate the particles on one side in the cell, and then, a voltage of a specific level or greater is applied to reflect light in the visible spectrum. Hence, the photonic crystals for reflecting light in the visible spectrum can be realized just by moving the particles slightly, thereby making the operating speed of such a display device faster.

Subsequently, referring to FIG. 29, the display device in accordance with one embodiment of the present invention may further include a control unit (not shown) that performs the function of applying an electric field of various patterns of the intensity, duration of application, etc., of the electric field when sequentially applying electric fields of different intensities and/or different directions to the particles and solvent and achieving a continuous display. More specifically, when applying a voltage to the electrode applying the electric field to the particles and solvent, the control unit in accordance with one embodiment of the present invention can increase or decrease the level of a voltage to a predetermined voltage (see 29(a), can extend or reduce the duration or period of application of a certain voltage (see 29(b)), and can obtain the same effect as continuous application of a voltage by repeatedly applying a discontinuous pulse voltage (see 29(c)). By doing so, the display device in accordance with one embodiment of the present invention can improve display performance, including enabling display of various patterns and reducing power consumption.

It should be noted, however, that the electric field application pattern in accordance with the present invention is not necessarily limited to those listed above, but may be appropriately changed within the scope of the objects of the present invention, i.e., within the scope in which the distance, location or arrangement of particles can be controlled by an electric field.

Figure 30:
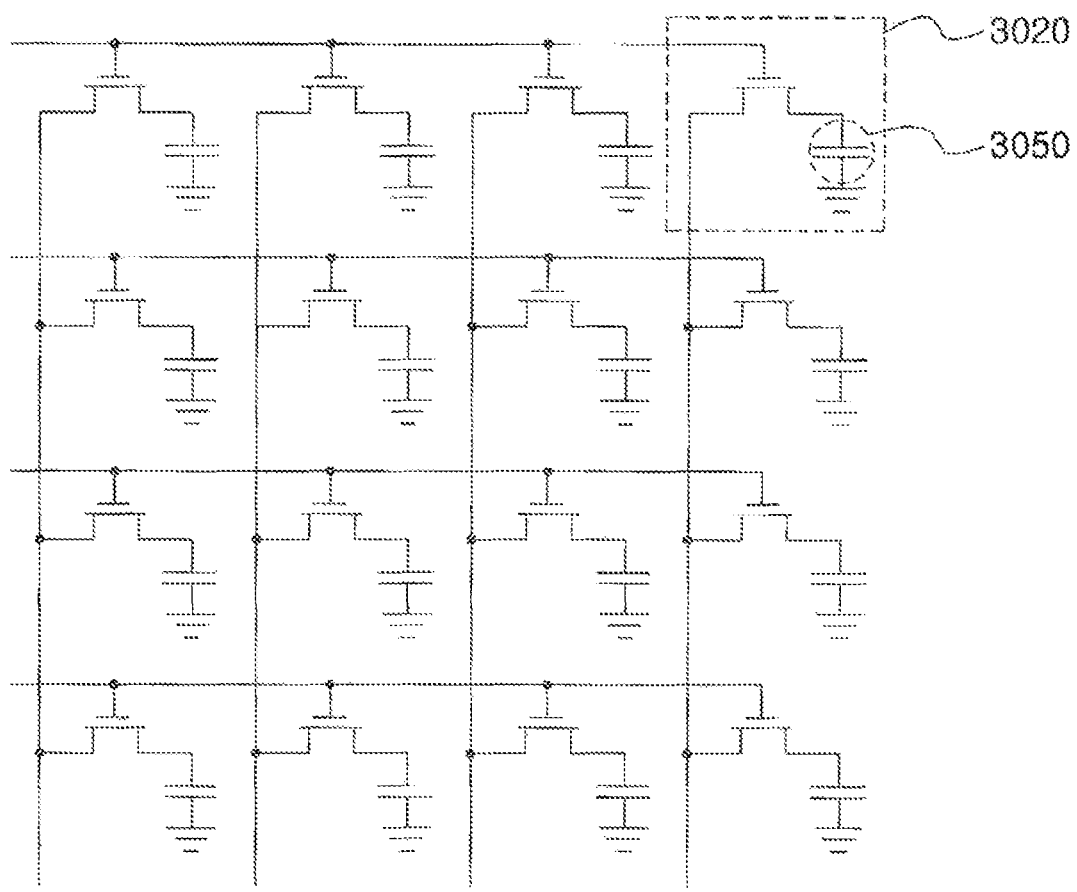
FIG. 30 is a view exemplarily illustrating a configuration of a circuit connected to a plurality of electrodes of the display device in accordance with one embodiment of the present invention.

FIG. 30 is a view exemplarily illustrating a configuration of a circuit connected to a plurality of electrodes of the display device in accordance with one embodiment of the present invention.

Referring to FIG. 30, each of the plurality of electrodes 3020 included in the display device in accordance with one embodiment of the present invention may be connected with the capacitors 3050 capable of storing predetermined electric charges. In more detail, when the voltage is applied to the electrode 3020 so as to apply the electric field to the display unit, the capacitor 3050 connected with the corresponding electrode 3020 may be charged with the electric charges, and thus, the voltage may be applied to the corresponding electrode 3020 for the predetermined time by using the electric charges charged in the capacitor 3050 even after the voltage applied to the corresponding electrode 3020 is interrupted. Therefore, although the discontinuous pulse voltage is applied to the display device, one embodiment of the present invention can implement the same display as the case in which the continuous voltage is to applied. Therefore, the power consumed to operate the display device can be reduced and more stable display can be implemented. In addition, although the applied voltage is interrupted, the display state may be maintained for the predetermined time. That is, the distance, arrangement and location of the particles may be maintained at the specific distance, the specific arrangement and the specific location for the predetermined time.

Meanwhile, one embodiment of the present invention can control the brightness of color displayed on the display device by using the light tuning layer that controls the pattern (application region, application time, etc.) of the electric field applied to the particles or tunes the transmittance of light or blocking rate of light reflected from the particle.

Figure 31:
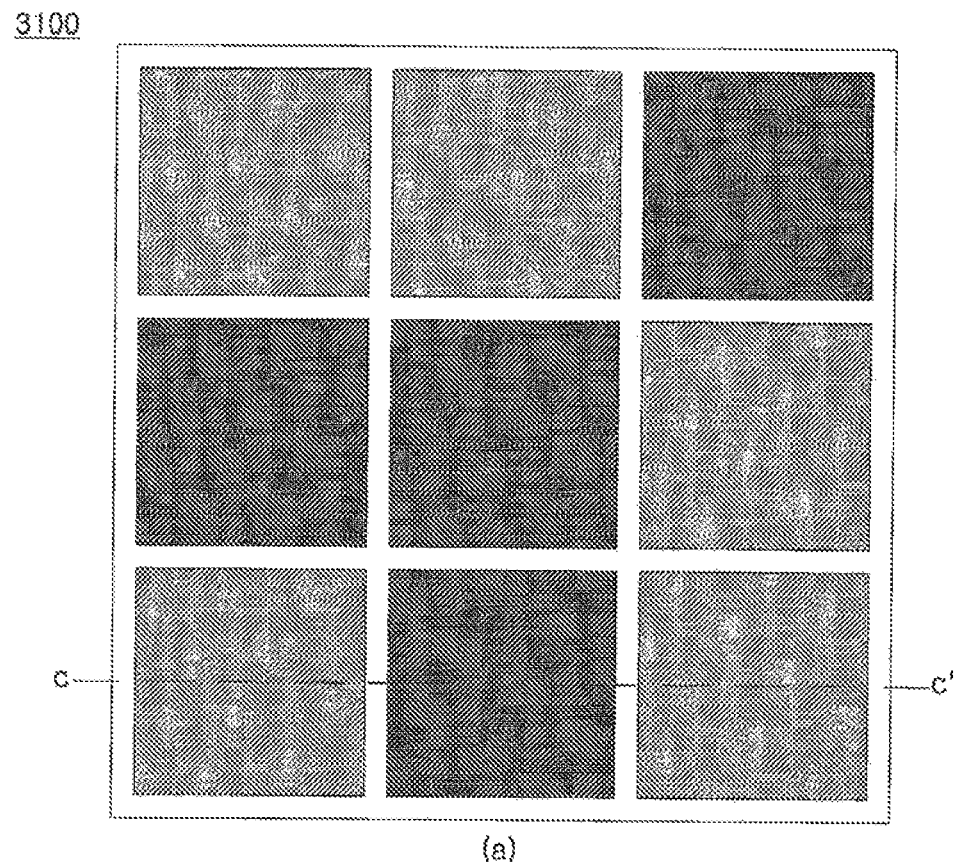
FIG. 31 is a view exemplarily illustrating a configuration of controlling a display area of light reflected from particles in accordance with one embodiment of the present invention.
Figure 31:
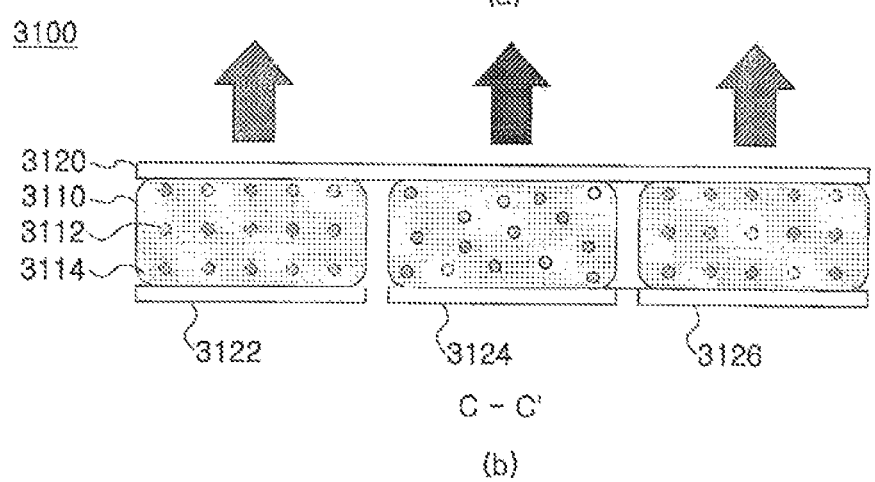

FIG. 31 is a view exemplarily illustrating a configuration of controlling a display area of light reflected from particles in accordance with one embodiment of the present invention.

Referring to FIG. 31, a display device 3100 in accordance with one embodiment of the present invention may include nine unit cells 3110, wherein each unit cell 3110 may be independently controlled from each other by the electric field independently applied to each unit cell 3110. Lower electrodes 3122, 3124 and 3126 covering each unit cell 3110 may include materials having dark colors or may be covered by a color layer (not shown) having dark colors. In accordance with one embodiment of the present invention, in order to display the color of the desired brightness on the display device 3100, the color by the photonic crystals is displayed in a part of the unit cells by applying the appropriate electric field only to some of the total of nine unit cells 3110. On the other hand, the color by the photonic crystals is not displayed in the remaining unit cell by not applying the electric field to the remaining unit cells but the dark color due to the scattering color by the particles or the color of the lower electrode may be displayed. Further, when the number of unit cells displaying the color by the photonic crystals by controlling the electric field applied to each unit cell is increased, since the area in which the color is displayed by the photonic crystals is wider than the area in which the dark color is displayed, the brightness of color by the photonic crystals is increased, and when the number of unit cells in which the color by the photonic crystals is displayed is reduced, since the dark color is displayed is narrower than the area in which the area in which the color by the photonic crystals is displayed, the brightness of color by the photonic crystals may be lowered. That is, as the number of unit cells to which the predetermined electric field capable of forming the photonic crystals is increased, the number of unit cells in which the color by the photonic crystals is displayed, that is, the area in which the color by the photonic crystals is displayed is increased, thereby increasing the brightness. In addition, the brightness may be controlled by using the lower electrode as the black electrode and appropriately combining the number of pixels implementing the photonic crystals reflection mode and the number of pixels implementing the transmittance tuning control mode.

Figure 32:
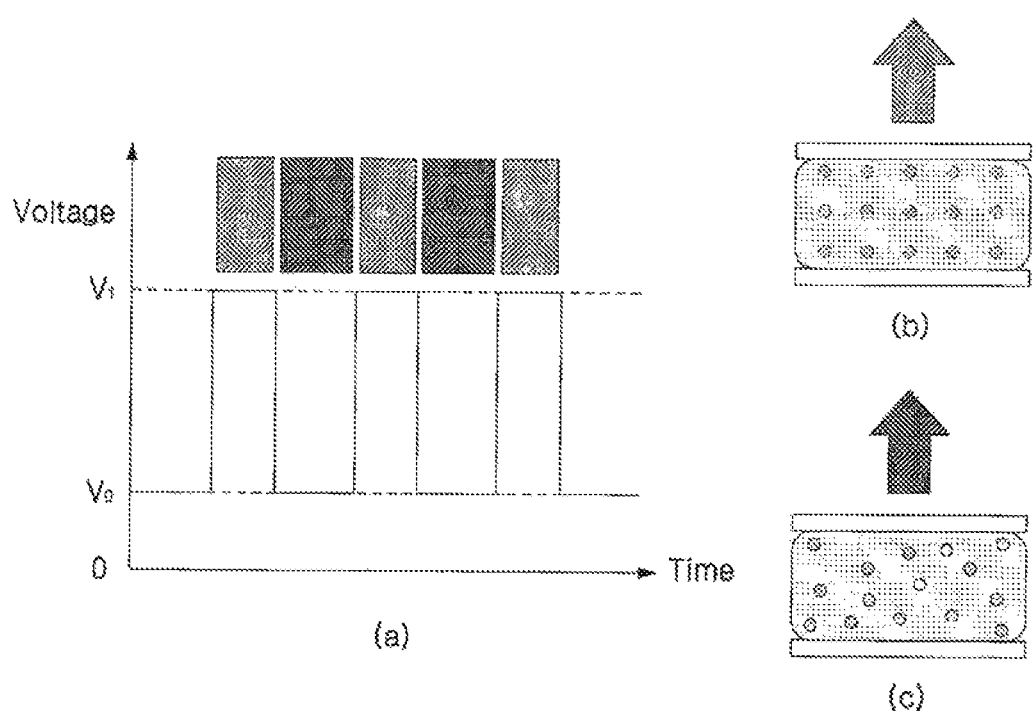
FIG. 32 is a view exemplarily illustrating a configuration of controlling a display time of light reflected from particles in accordance with one embodiment of the present invention.

FIG. 32 is a view exemplarily illustrating a configuration of controlling a display time of light reflected from particles in accordance with one embodiment of the present invention.

Referring to FIG. 32, the display device in accordance with one embodiment of the present invention can control the time when the electric field is applied to the particles and may include a lower electrode, which has a material of a dark color or is covered by a color layer (not shown) of the dark color. The display device in accordance with one embodiment of the present invention can periodically apply the electric field to the particles but can control the ratio of the application time of the electric field to the non-application time of the electric field so as to display the color of the desired brightness on the display device. More specifically, if the application time of the electric field is longer than the non-application time of the electric field, since the time when the color by the photonic crystals is displayed is longer than the time when the dark color is displayed, the brightness of color by the photonic color may become high. On the other hand, if the application time of the electric field is shorter than the non-application time of the electric field, since the time when the color by the photonic crystals is displayed is shorter than the time when the dark color is displayed, the brightness of color by the photonic color may become low. That is, as the time when the electric field capable of forming the predetermined photonic crystals is applied is long, the time when the color by the photonic crystals is displayed is increased. Therefore, the brightness of color by the photonic crystals is increased.

Figure 33:
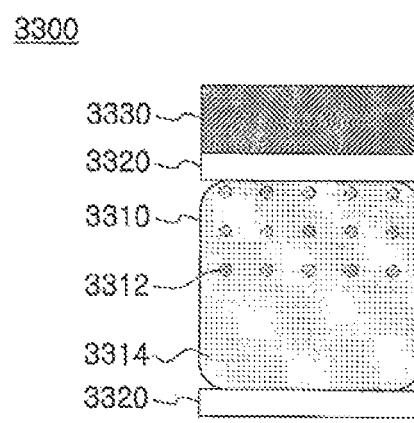
FIG. 33 is a view exemplarily illustrating a configuration of controlling brightness using a light tuning layer in accordance with one embodiment of the present invention.

FIG. 33 is a view exemplarily illustrating a configuration of controlling brightness using a light tuning layer in accordance with one embodiment of the present invention.

Referring to FIG. 33, a display device 3300 in accordance with one embodiment of the present invention may include a separate light tuning layer 3330 capable of tuning the transmittance of light or light blocking rate. Generally, since the transmittance of light or the light blocking rate may greatly affect the intensity or brightness of light, and further, may change the brightness of color of light, the light tuning layer 3330 capable of tuning the transmittance of light or the light blocking rate may be disposed on the top of the display device 3300. Herein, the brightness of color of light displayed on the display device 3300 may be controlled by controlling the intensity or brightness incident on the light tuning layer 3330. Hereinafter, various components capable of being controlled as the light tuning layer 3330 will be described in detail, FIGS. 34 and 35 are views exemplarily illustrating a configuration of the light tuning layer tuning the transmittance of light in accordance with one embodiment of the present invention.

Figure 34:
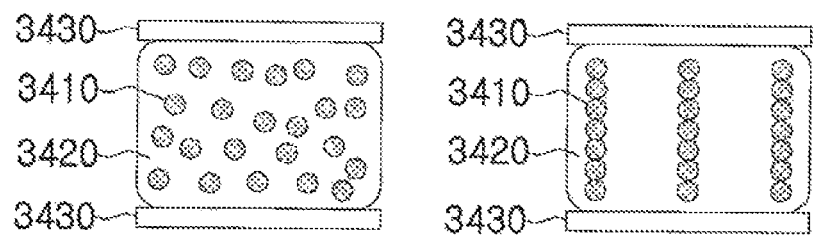
FIGS. 34 and 35 are views exemplarily illustrating a configuration of the light tuning layer tuning transmittance of light in accordance with one embodiment of the present invention.

First, referring to FIG. 34, a light tuning layer 3400 in accordance with one embodiment of the present invention may tune the transmittance of light by controlling the arrangement of particles 3410. More specifically, when the electrophoresis particles 3410 are irregularly dispersed within the light tuning layer 3400, the transmittance of light is reduced due to the reflection or scattering of light by the electrophoresis particles 3410, and thus, the brightness of color of light is reduced (see FIG. 34(a)). On the other hand, when the electrophoresis particles 3410 are regularly arranged in a direction parallel to a progressing direction of light, the progressing of light is little hindered, and thus, the transmittance of light is high, such that the brightness of color of light is increased (see FIG. 34(b)). In addition, although not shown, as described above, the layer of using the photonic crystal transmittance tuning mode may be used as the light tuning layer.

Figure 35:
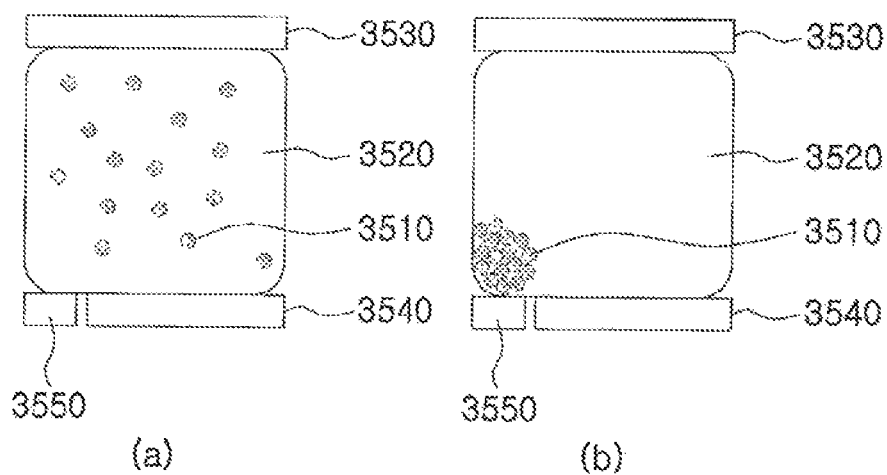

Next, referring to FIG. 35, a light tuning layer 3500 in accordance with one embodiment of the present invention may tune the transmittance of light by controlling the location of electrophoresis particles 3510. More specifically, when the electrophoresis particles 3510 are irregularly dispersed within the light tuning layer 3500, the transmittance of light is reduced due to the reflection or to scattering of light by the electrophoresis particles 3510, and thus, the brightness of color of light is reduced (see FIG. 35(a)). On the other hand, when the electrophoresis particles 3510 moves toward a lower electrode 3550 having a narrow area, the progressing of light is little hindered, and thus, the transmittance of light is high, such that the brightness of color of light is increased (see FIG. 35(b)).

Figure 36:
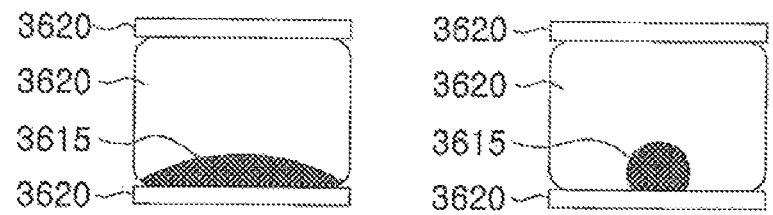
FIG. 36 is a view exemplarily illustrating a configuration of the light tuning layer controlling a light blocking rate in accordance with one embodiment of the present invention.

FIG. 36 is a view exemplarily illustrating a configuration of the light tuning layer controlling a light blocking rate in accordance with one embodiment of the present invention.

Referring to FIG. 36, a light tuning layer 3600 in accordance with the present invention may include a light blocking material 3615 whose distribution area may be changed as liphophilic or hydrophilic characteristics are changed by the electric field. The light blocking material 3615 controls an area covering the display region, that is, the display unit (not shown) of the display device by controlling at least one of the intensity and direction of the electric field applied to the light blocking material 3615, thereby controlling the light blocking rate (electro-wetting). More specifically, when the light blocking material 3615 covers most of the display region, the light blocking rate is increased, and thus, the brightness of color of light is reduced (see FIG. 36(a)), but when the light blocking material 3615 covers a portion of the display region, the light blocking rate is reduced, and thus, the brightness of color of light is increased (see FIG. 36(b)).

However, the light tuning layer that may be applied to the display device in accordance with the present invention is not necessarily limited to the above list and various units such as the device of controlling the concentration of the particles may be applied as the light tuning layer in accordance with the present invention. The device capable of changing the transmittance of light according to the voltage such as a liquid crystal, the device capable of tuning the transmittance of light by changing an area of the solution on the surface by changing the hydrophilic/liphophilic characteristics according to voltage, or the device of tuning the transmittance of light by controlling motion of the particles according to the voltage, etc., may be used. In addition, electrochromic devices (ED), suspended particle devices (SPD), polymer dispersed liquid crystal devices (PDLC), micro-blinds (MB), etc., may be applied as the light tuning layer.

Meanwhile, in accordance with one embodiment of the present invention, a color representing an achromatic color and a cell representing a chromatic color are spatially and temporally combined, thereby controlling the chroma of color displayed on the display device.

First, similar to the brightness control method shown in FIG. 31, the chroma of color displayed on the display device may be controlled by controlling an area in which the achromatic color is displayed and an area in which the chromatic color is displayed. More specifically, when the number of unit cells displaying the chromatic color is increased by controlling the electric field applied to each unit cell, since the area in which the chromatic color is displayed is wider than the area in which the achromatic color is displayed, the chroma of the color displayed on the display device is increased and when the number of unit cells displaying the achromatic color is reduced, since the area in which the chromatic color is displayed is narrower than the area in which the achromatic color is displayed, the chroma of the color displayed on the display device may be reduced.

Next, similar to the brightness control method shown in FIG. 32, the chroma of color displayed on the display device may be controlled by controlling to the time when the achromatic color is displayed and the time when the chromatic color is displayed. More specifically, if the time when the electric field is applied so as to display a chromatic color is longer than the time when the electric field is applied so as to display the achromatic color, the chroma of the color displayed on the display device is increased. On the other hand, if the time when the electric field displaying the chromatic color is applied is shorter than the time when the electric field displaying the achromatic color is not applied, the chroma of the color displayed on the display device is reduced.

Figure 37:
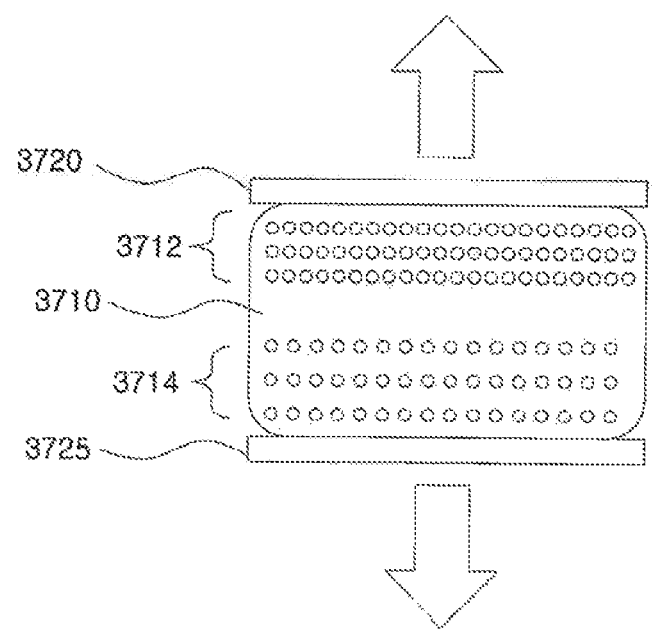
FIG. 37 is a view illustrating the configuration of a display device for realizing a photonic crystal display using particles having different electric charges from each other in accordance with one embodiment of the present invention.

FIG. 37 is a view illustrating the configuration of a display device for realizing a photonic crystal display using particles having different electric charges from each other in accordance with one embodiment of the present invention.

First, the case of the first mode will be described as follows. First, referring to FIG. 37, a display unit 3710 of a display device 3700 in accordance with one embodiment of the present invention may include particles having different electric charges, i.e., one type of particles 3712 having negative charges and the other type of particles 3714 having positive charges. As an electric field is applied to the display unit 3710, the particles 3712 having negative charges and the particles 3714 having positive charges may be respectively moved in the opposite direction and regularly arranged. For instance, if an upper electrode 3720 of the electric field generating and/or applying unit is a positive electrode and a lower electrode 3725 thereof is a negative electrode, the particles 3712 having negative charges and the particles 3714 having positive charges may be moved in the upper electrode 3720 direction and in the lower electrode 3725 direction, respectively, and arranged as photonic crystals while maintaining predetermined inter-particle distances. In this case, the display device 3700 can reflect light of a certain wavelength range against both sides (i.e., the side of the upper electrode 3720 and the side of the lower electrode 3725), and thus, can realize a double-sided display. Furthermore, if the charge amount of the particles 3712 having negative charges and the charge amount of the particles 3714 having positive charges are different from each other, as an electric field is applied, the inter-particle distances 3712 having negative charges and the inter-particle distances 3714 having positive charges may differ from each other. Thus, the display device 3700 can reflect light of different wavelength ranges against both sides, and thus, can realize a display, both sides of which are controlled independently from each other.

Next, the case of the second mode will be described as follows. The particles 3712 having negative charges and particles 3714 having positive charges that are included in the display device 3700 may have their unique colors. In this case, similar to the case of FIG. 37, different colors can be displayed on the upper and lower parts of the display device just by adjusting only the direction of an electric field applied to the upper electrode 3720 and the lower electrode 3725. For instance, assuming that the particles 3712 having negative charges are in black and the particles 3714 having positive charges are in white, when a positive voltage is applied to the upper electrode 3720, the black particles 3712 having negative charges may be moved toward the upper electrode 3720 to display black on the upper part of the display device. When a negative voltage is applied to the upper electrode 3720, the white particles 3714 having positive charges may be moved toward the upper electrode 3720 to display white on the upper part of the display device.

As shown in FIG. 37, the first mode and the second mode may also be switched to each other in the both-sided display device. In addition, when the lower electrode is divided into the large electrode and the local electrode, the first mode, the second mode and the third mode may be switched to one another in the both-sided display device.

Figure 38:
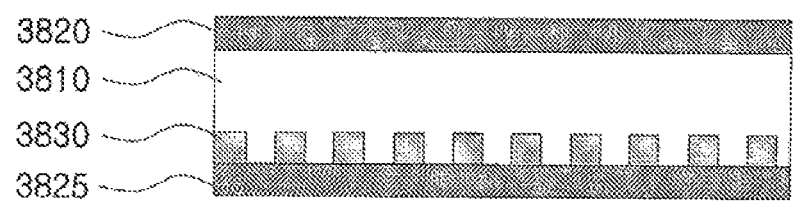
FIGS. 38 to 40 are views exemplarily illustrating a configuration of patterning an electrode in accordance with one embodiment of the present invention.
Figure 38:
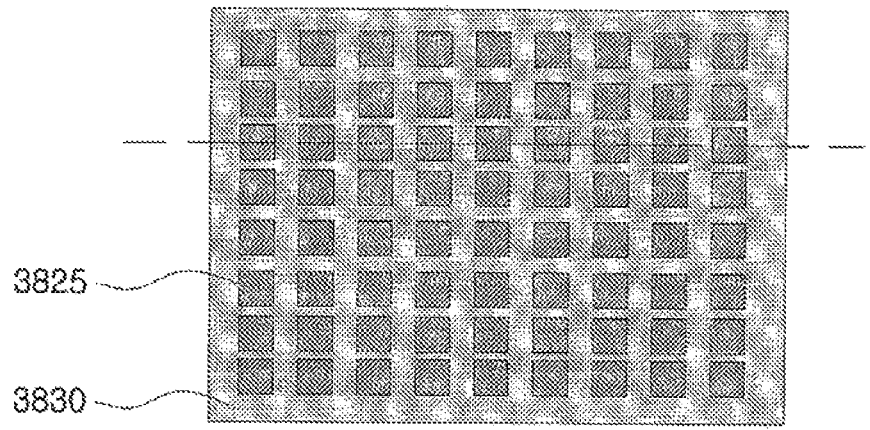
Figure 39:
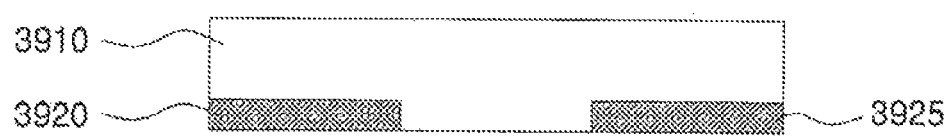
Figure 39:
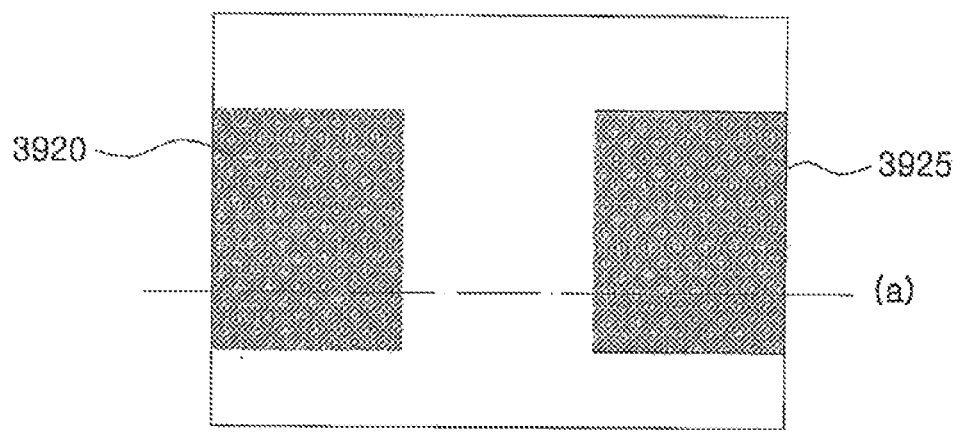
Figure 40:
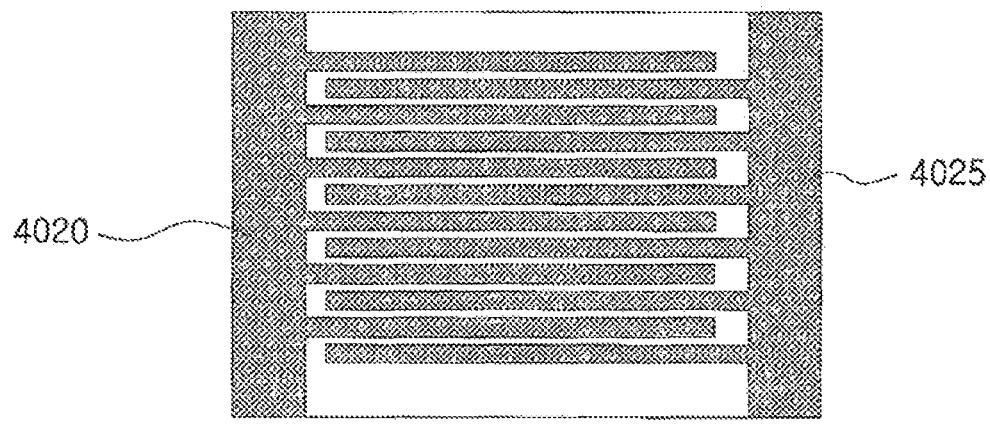

FIGS. 38 to 40 are views exemplarily illustrating a configuration of patterning an electrode in accordance with one embodiment of the present invention.

First, referring to FIG. 38, a lattice-shaped insulating layer 3830 can be formed on the lower electrode 3825 (or upper electrode 3820) of the electrode in accordance with one embodiment of the present invention, and thus, the lower electrode 3825 (or upper electrode 3820) can be patterned at predetermined intervals.

In accordance with the display device shown in FIG. 38, the patterning interval of the electrodes is set approximately from several μm to several hundreds of μm, thereby preventing the particles from being irregularly arranged due to electrohydrodynamic (EHD) motion of the particles having electric charges, and thus, achieving uniform display. In particular, in accordance with the display device shown in FIG. 38, the particles can be effectively prevented from being biased by electrohydrodynamic motion without passing through a complicated process, such as encapsulation or cell partitioning, which requires a lot of time and cost.

Next, referring to FIG. 39, the lower electrode (or upper electrode) in accordance with one embodiment of the present invention may be divided into two electrodes (a first electrode 3920 and a second electrode 3925). More specifically, referring to FIG. 40, according to one embodiment of the present invention, the first electrode 4020 and second electrode 4025 constituting the lower electrode (or upper electrode) of the electrode can be patterned in the form of alternating teeth.

In accordance with the display device shown in FIGS. 39 and 40, it can be advantageous in terms of cost saving because electrodes can be formed only on one substrate, and the operating speed of the display device can be raised because the moving distance of the particles induced by application of an electric field is reduced.

It should be noted, however, that an electrode pattern in accordance with the present invention is not necessarily limited to those listed above, but may be appropriately changed within the scope of the objects of the present invention, i.e., within the scope in which the inter-particle distances can be controlled by an electric field.

Figure 41:
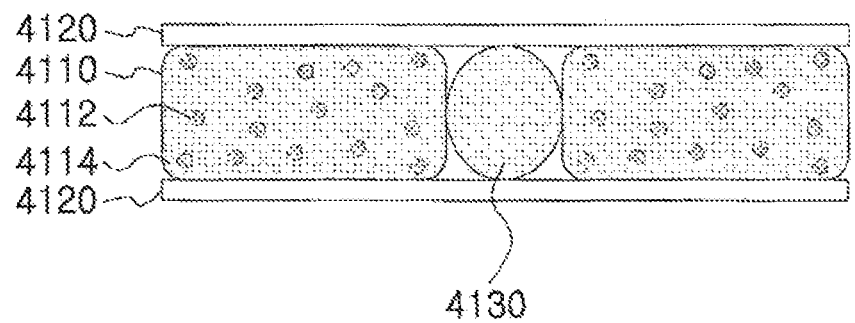
FIG. 41 is a view exemplarily illustrating the configuration in which the display device in accordance with one embodiment of the present invention includes a spacer.

FIG. 41 is a view exemplarily illustrating the configuration in which the display device in accordance with one embodiment of the present invention includes a spacer.

Referring to FIG. 41, a display device 4100 in accordance with one embodiment of the present invention may include a spacer particles 4130 that is disposed between two electrodes 4120 to perform a function of controlling an interval between two electrodes 4120. More specifically, the spacer particles 4130 contacting the upper and lower electrodes 4120 may adhere to the upper and lower electrodes 4120 by energy such as heat energy, photo energy, etc., and thus, may be manufactured in a film type in which the upper and lower electrodes 4130 are disposed at a predetermined distance. In accordance with one embodiment of the present invention, the spacer particles 4130 may be made of organic matters such as polystyrene or inorganic matters such as oxide silicon. When the ITO glass is used as the electrode, the cost is high. Therefore, when the spacer is applied to the substrate in the flexible film type on which the transparent electrode is coated as in the present invention, the manufacturing costs may be remarkably reduced.

In accordance with one embodiment of the present invention, a liquid in which the particles are dispersed is applied to the front surface using a device such as one drop filling (ODF) or may be filled between the upper and lower electrodes by using an air pressure difference or may be printed by a method such as gravure offset, etc.

Figure 42:
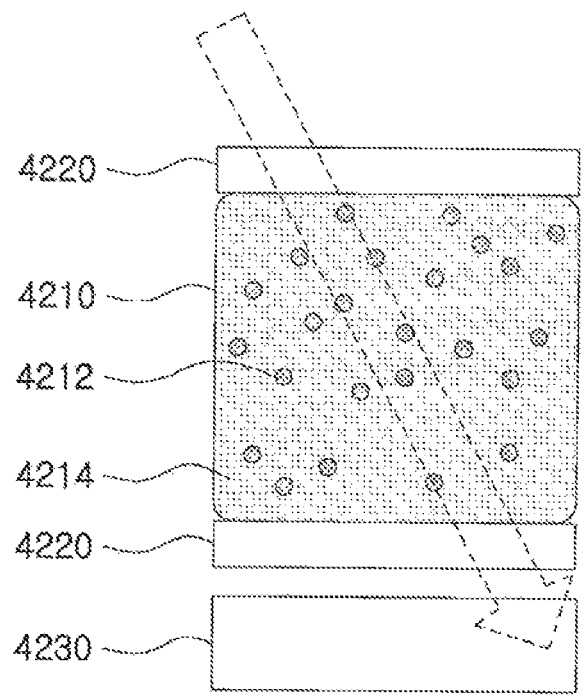
FIG. 42 is a view illustrating the configuration of a display device including a solar cell unit in accordance with one embodiment of the present invention.

FIG. 42 is a view illustrating the configuration of a display device including a solar cell unit in accordance with one embodiment of the present invention.

Referring to FIG. 42, a display device 4200 in accordance with one embodiment of the present invention may further include a solar cell unit 4230 that performs the function of generating an electromotive force by using light transmitted through the display device 4200 and storing it. The electromotive force generated by the solar cell unit 4230 can be used to generate and apply a voltage using the electrode 4220, whereby the display device 4200 can realize the above-described photonic crystal display without depending on an external power supply. However, a combination of the display device and the solar cell unit in accordance with the present invention is not necessarily limited to those listed above, but the electromotive force generated by the solar cell unit may be used for other purposes than driving the display device.

Figure 43:
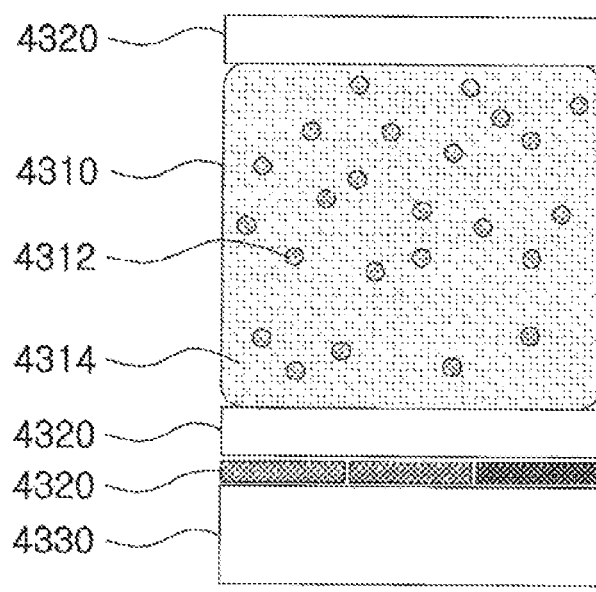
FIG. 43 is a view exemplarily illustrating a configuration in which the display device in accordance with the present invention is combined with an emissive display device.

FIG. 43 is a view exemplarily illustrating a configuration in which the display device in accordance with the present invention is combined with an emissive display device.

Referring to FIG. 43, separate emissive display devices 4330 and 4340 may be combined with the display devices 4310 and 4320 in accordance with the present invention. More specifically, the emissive display devices 4330 and 4340 are combined on the bottom portions of the display devices 4310 and 4320 in accordance with the present invention to independently drive the reflection-type display devices 4310 and 4320 and the emissive devices 4330 and 4340 from each other, thereby displaying the color according to the first, second or third modes in accordance with one embodiment of the present invention when the display devices 4310 and 4320 are operated in accordance with the present invention. On the other hand, when the light-emitting display devices 4330 and 4340 are operated, light generated from a predetermined back light and transmitting a color filter may be displayed. That is, the emissive mode and the reflection type mode may be mixed with each other. Reference numeral 4320 represents an R, G and B color filter. In the emissive mode, the particles in the reflection type device move to the local electrode to make the transmittance large. When the display device in accordance with the present invention is combined with the emissive display device, the range of the displayable color can be wide as compared with the case of using only the display device in accordance with the present invention. Meanwhile, when the emissive display device includes fluorescent substance, the hues that cannot be implemented by the existing fluorescent substance may also be implemented. In addition, although not shown in the drawings, the external light source exists on the upper electrode, such that the reflection type display mode may be implemented even in the dark situation in which no surrounding light is.

Mode Maintain

In accordance with one embodiment of the present invention, even after the electric field acting to control the inter-particle distances is blocked, the inter-particle distances may be maintained in the controlled state. To this end, the predetermined additives may be included in the solvent in which the particles are dispersed.

More specifically, in accordance with one embodiment of the present invention, a polymer type material with a complicated molecular structure such as a dispersant (for example, polyoxyethylene lauryl ether, etc.) with a portion (anchoring group, hereinafter, referred to as "anchor") having strong affinity, a polysorbate-based dispersant (for example, polyoxyethylene sorbitan monolaurate, polyoxyethylenesorbitan monooleate, polyoxyethylene sorbitan monostearate, etc.) with at least one anchor may be added as additives. Accordingly, the motion of the particles dispersed in the solvent is limited by the additives.

In addition, in accordance with one embodiment of the present invention, when the particles having electric charges are dispersed in the solvent to which the polymer having the molecular chain is added, resistance is increased upon moving the particles in the solvent, such that the location may be fixed even after the electric field applied from the outside is blocked.

In addition, in accordance with one embodiment of the present invention, additives having a functional group (—OH) existing on the surface of the particles and a functional group (hydrophilic group) that can be chemically bonded such as hydrogen binding are added within the solvent so as to make the additives to be continuously adsorbed on the surface of the particles, such that the film is formed around the particles, thereby stabilizing the particles.

In addition, in accordance with one embodiment of the present invention, as the steric effect is generated by alkyl component existing in the alkyl chain of the liphophilic group included in the additives added within the solvent, the viscosity of the solvent may be increased, thereby limiting the motion of the particles included in the solvent. Further, a large amount of polymer having the complicated structure is added within the solvent, thereby further increasing the viscosity of the solution.

That is, the additives having the affinity with the particles and the additives having the affinity with the solvent are added, thereby limiting the motion of the particles within the solvent. In addition, the polymer having the complicated steric structure or chain structure is added within the solvent as the additives, thereby limiting the movement of the particles due to the complicated structure of the additives.

Meanwhile, the phase change material is used as the solvent, and thus, the inter-particle distances are controlled to have a predetermined distance by applying voltage in the state of facilitating the movement of the particles (for example, a liquid having low viscosity). Further, before the external voltage is blocked, a state of a solution is converted into a state of making the movement of the particles hard through stimuli such as light, pressure, temperature, chemical reaction, magnetic field, electricity, etc., such that the inter-particle distances of the particles may be maintained constantly although the external voltage is blocked.

Alternatively, in order to prevent the inter-particle distances from being gradually disordered after voltage is blocked, the inter-particle distances may be maintained at the predetermined distance by a periodical refreshing with the predetermined voltage.

In order to constantly maintain the distance even after the voltage is blocked by the above-mentioned method, it is preferable to minimize the specific gravity of the particles and the solvent, such that materials having different specific gravity are coated on the particles or materials having different specific gravity may be added to the solvent.

Therefore, in accordance with one embodiment of the present invention, the particles regularly arranged while maintaining the predetermined distance according to the electric field may maintain the regular arrangement although the electric field is blocked. The effect may be apparently shown as the amount of additives is large or the molecular weight of additives is large. In particular, the above effects may be increased by reducing the difference in the specific gravity between the particles and the solvent. In addition, in accordance with one embodiment of the present invention, the display device having the excellent display characteristics may be manufactured by simply including the additives in the solvent without adopting the complicated configuration such as capsule, cell, droplet type capsule, etc.

In addition, in accordance with one embodiment of the present invention, the configuration in which the polymer stabilizer is covalently bonded with the particles can be considered. The polymer stabilizer and the particles have the complementary chemical functionality with each other so as to forming the covalent binding. The polymer stabilizer may be added within the solvent.

In addition, in accordance with one embodiment of the present invention, the particles are coated with polymer and the polymer coating includes the first functional group. In addition, the polymer having the second functional group is added within the solvent and the second functional group acts to apply attraction to the first functional group, such that the polymer within the solvent may form a complex with the particles.

Even after the electric field is blocked, the hues continue to be maintained on the display unit, such that the power consumption is small and the hues of a frame or an exterior may continue to be stably and reliably maintained.

Meanwhile, in accordance with one embodiment of the present invention, the particles that include a net structure, in which a gel-type solution is included in the functional group, and are dispersed in the gel-type solution and include the functional group are considered. However, the configuration in which the functional group of the particles and the functional group having the net structure are bonded with each other may be considered.

In one embodiment, the functional group of the gel-state solution or the functional group configuring the particles may include at least one of hydroxyl group (—OH), carboxy group (—COOH), amine group (—NH2), amid group (CONH), formyl group (—CHO), tirol group (—SH) and acrylic group (—CH2CCOR).

In one embodiment, the gel-state solution may include aqueous polymer of at least one of polyvinylalcohols, agaroses, poly (N-isopropylacrylamide)s, polysaccharides, polyamides and polyacrylates.

In one embodiment, the gel-state solution may include monomer or polymer including a liphophile and a reactive functional group that have a long chain within a molecule such as 12-hydroxystearic acid, sorbitan esters (Sorbitan monostearate, sorbitan monooleate, etc.), polysorbates (polyoxyethylene sorbitan monooleate, etc.).

In one embodiment, the gel functional group of the solution and the functional group of the particles may be bonded with each other by a cross-linking agent having a bifunctional group including at least one of boric acid, dialdehydes, dicarboxylic acids, dianhydrides, acid chloride, epichlorohydrin and hydrazide.

In one embodiment, the binding between the functional group of the surface of the particles and the functional group included in the solution may be performed by applying the heat energy or the photo energy or adding the additives or the cross-linking agent.

In one embodiment, the gel-state solution may be phase-changed into the sol state by applying the heat energy or the photo energy or adding the additive or the cross-linking agent.

Experimental Results

First, the experimental results implementing the first mode in accordance with one embodiment of the present invention will be described with reference to FIGS. 44 to 51.

Figure 44:
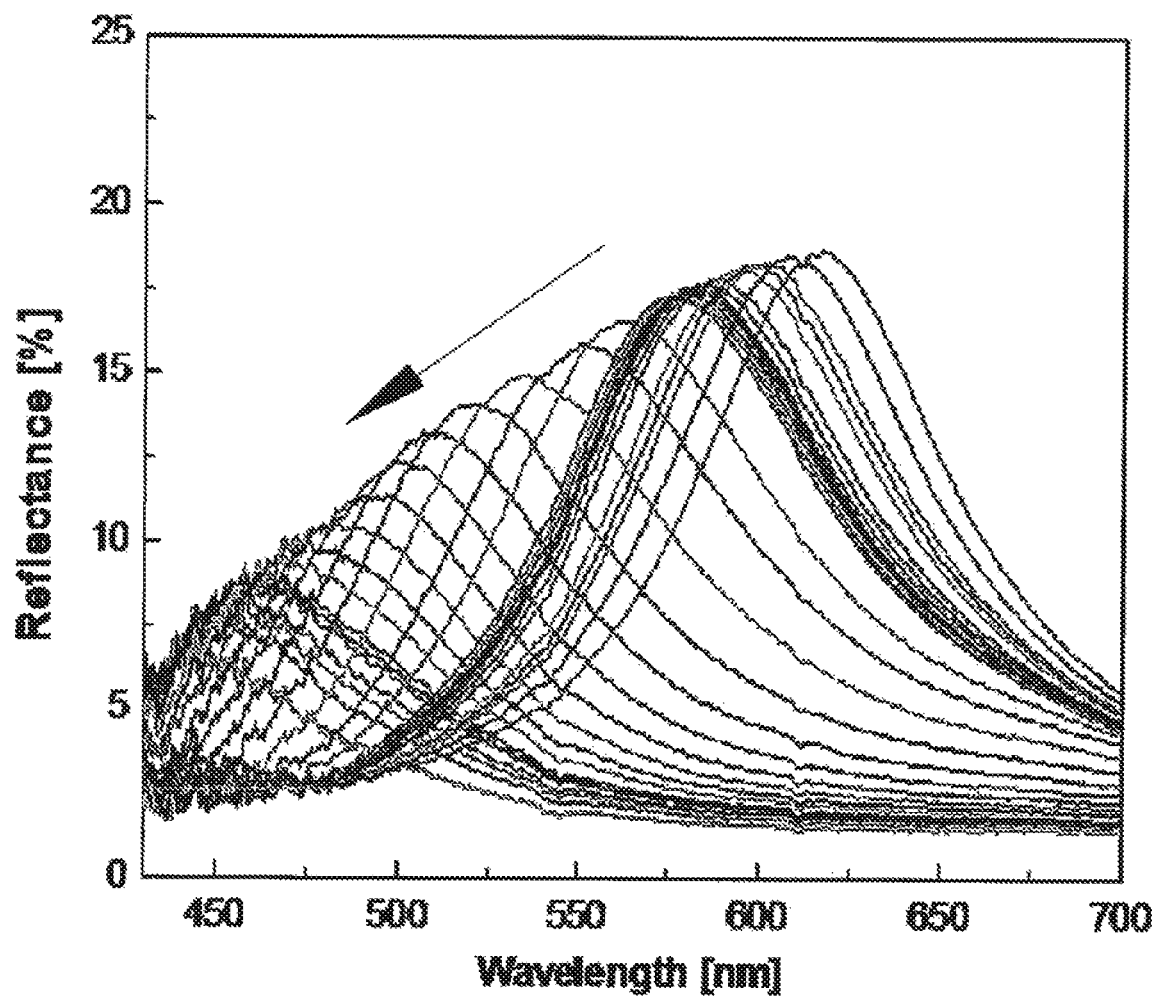
FIGS. 44 to 46 are graphs and photographs illustrating experimental results implementing the first mode for controlling the wavelength of light reflected photonic crystals composed of the particles by controlling the inter-particle distances by applying the electric field when the particles having electric charges are dispersed in a solvent having electrical polarization characteristic in accordance with one embodiment of the present invention.
Figure 45:
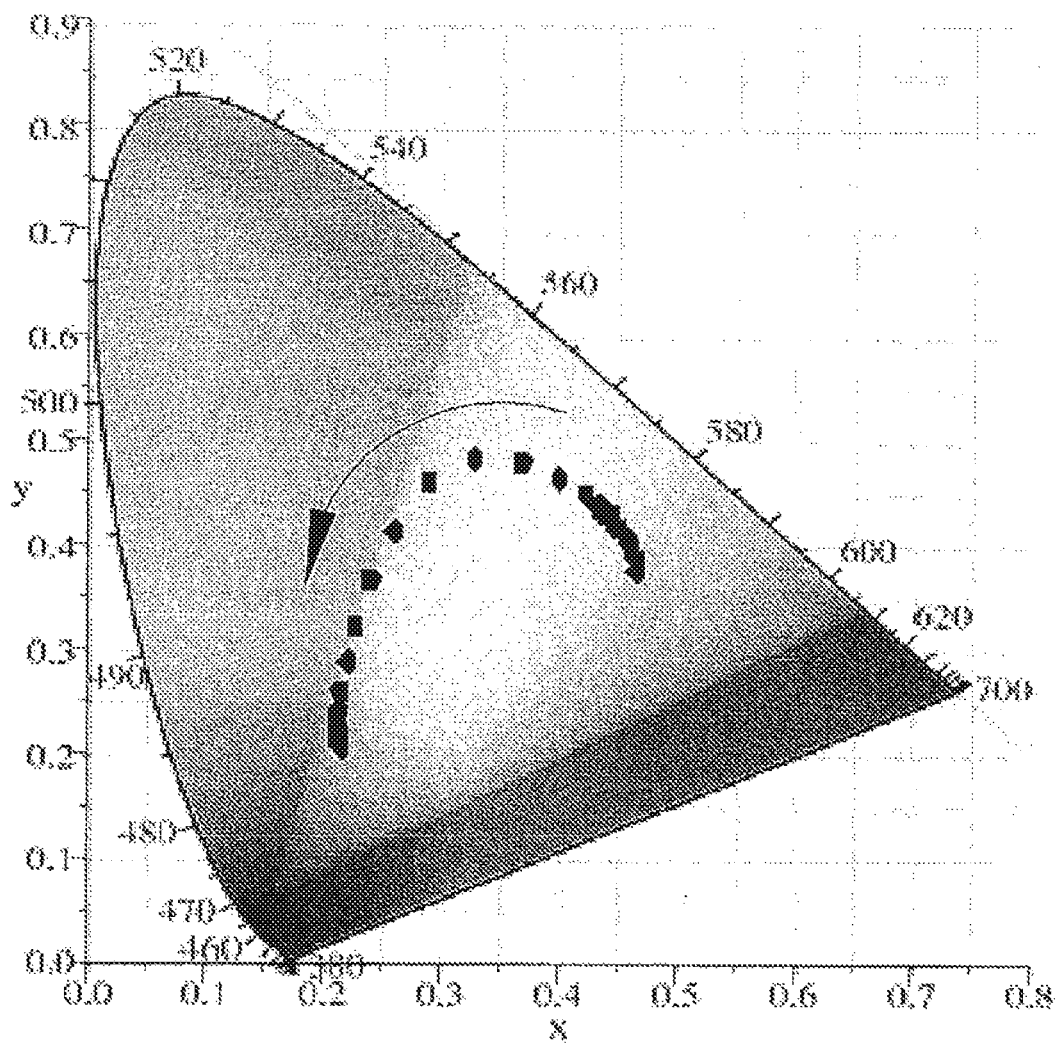
Figure 46:
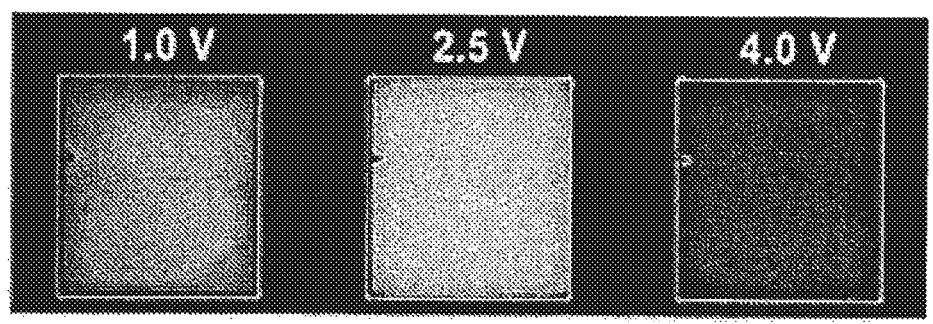

FIGS. 44 to 46 are graphs and photographs illustrating experimental results implementing the first mode controlling the wavelength of light reflected photonic crystals composed of the particles by controlling the inter-particle distances when the particles having electric charges are dispersed in a solvent having electrical polarization characteristic in accordance with one embodiment of the present invention. For reference, in the experiment of FIGS. 44 to 46, particles having a size of 100 to 200 nm, charged with negative charges and coated with a silicon oxide film were used as the particles having electric charges, a solvent having a polarity index greater than 1 was used as the solvent having electrical polarization characteristic. The intensity of a voltage applied to apply an electric field to the particles and solvent was set variously in the range of 0 to 10 V. Meanwhile, the graphs shown in FIG. 44 illustrate the reflectance of light reflected from the particles according to the wavelength of the corresponding light when electric fields of various intensities are applied. From FIG. 44, it can be seen that the greater the degree of change in the wavelength pattern of reflected light with change in the intensity of an electric field, the larger the change in the inter-particle distances. This means that light of more various wavelengths can be reflected from the particles by controlling the intensity of the electric field.

Referring to FIG. 44, it can be seen that a wavelength pattern of light reflected from particles varies variously depends on the intensity of an applied electric field (i.e., intensity of a voltage). More specifically, it can be seen that, the higher the intensity of an applied electric field (i.e., intensity of a voltage), the shorter the wavelength (in particular, a wavelength in which the reflectance is maximum) of the light reflected from the particles. According to the experiment result of FIG. 44, it can be seen that as the intensity (i.e., intensity of a voltage) of an applied electric field is increased, the color of light reflected from the particles is changed from a red series to a blue series and the changeable wavelength range may also be wide so as to cover all the visible spectra. Referring to FIGS. 45 and 46, the change in the color of the reflected light as described above may be more visually confirmed in a CIE diagram (FIG. 45) and a camera photograph (FIG. 46).

Figure 47:
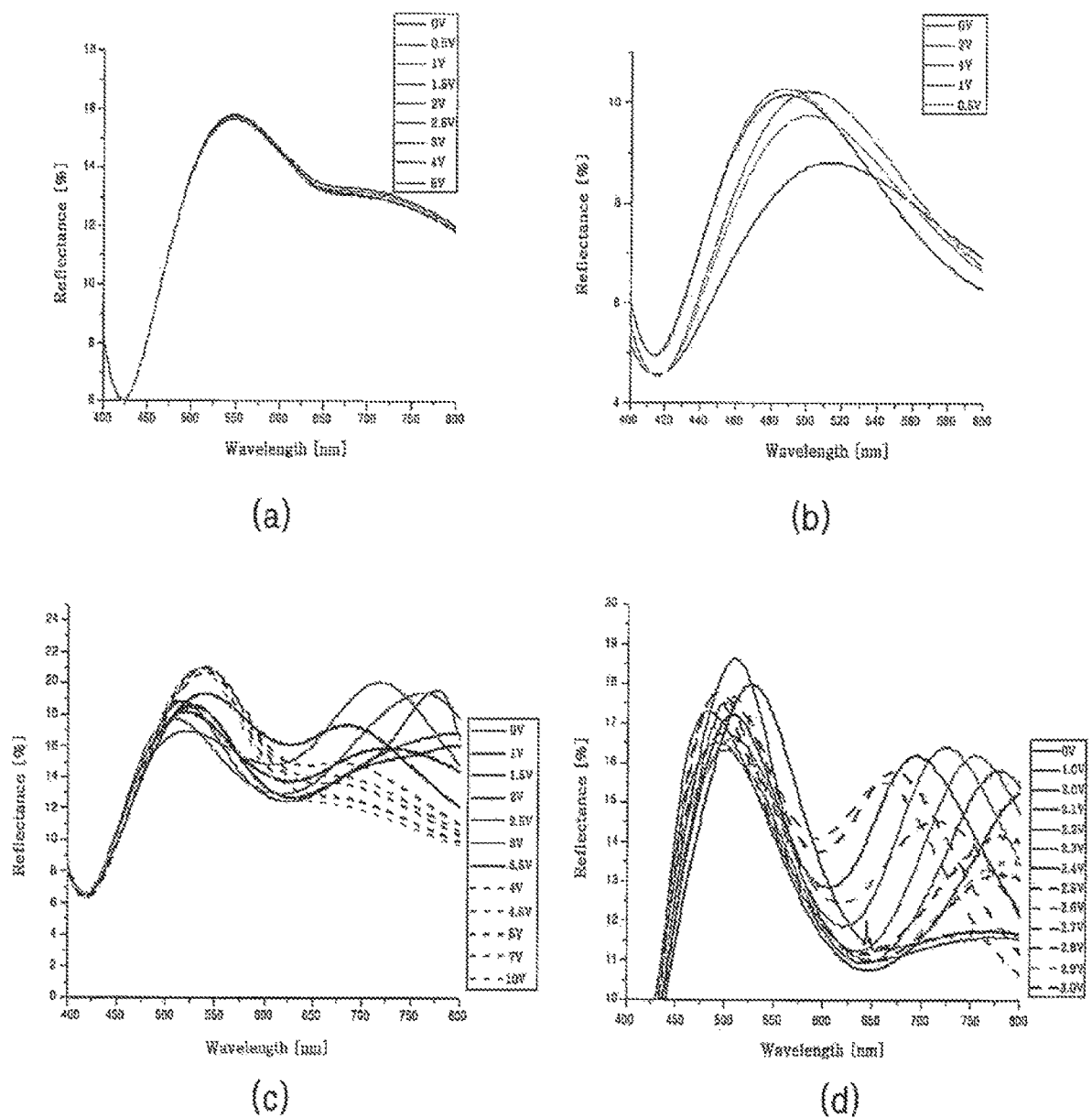
FIGS. 47 and 48 are graphs illustrating the wavelength of light reflected from the particles as a result of performing an experiment implementing the first mode by applying an electric field when the particles having electric charges are dispersed in various solvents having different polarity indices in accordance with one embodiment of the present invention.
Figure 48:
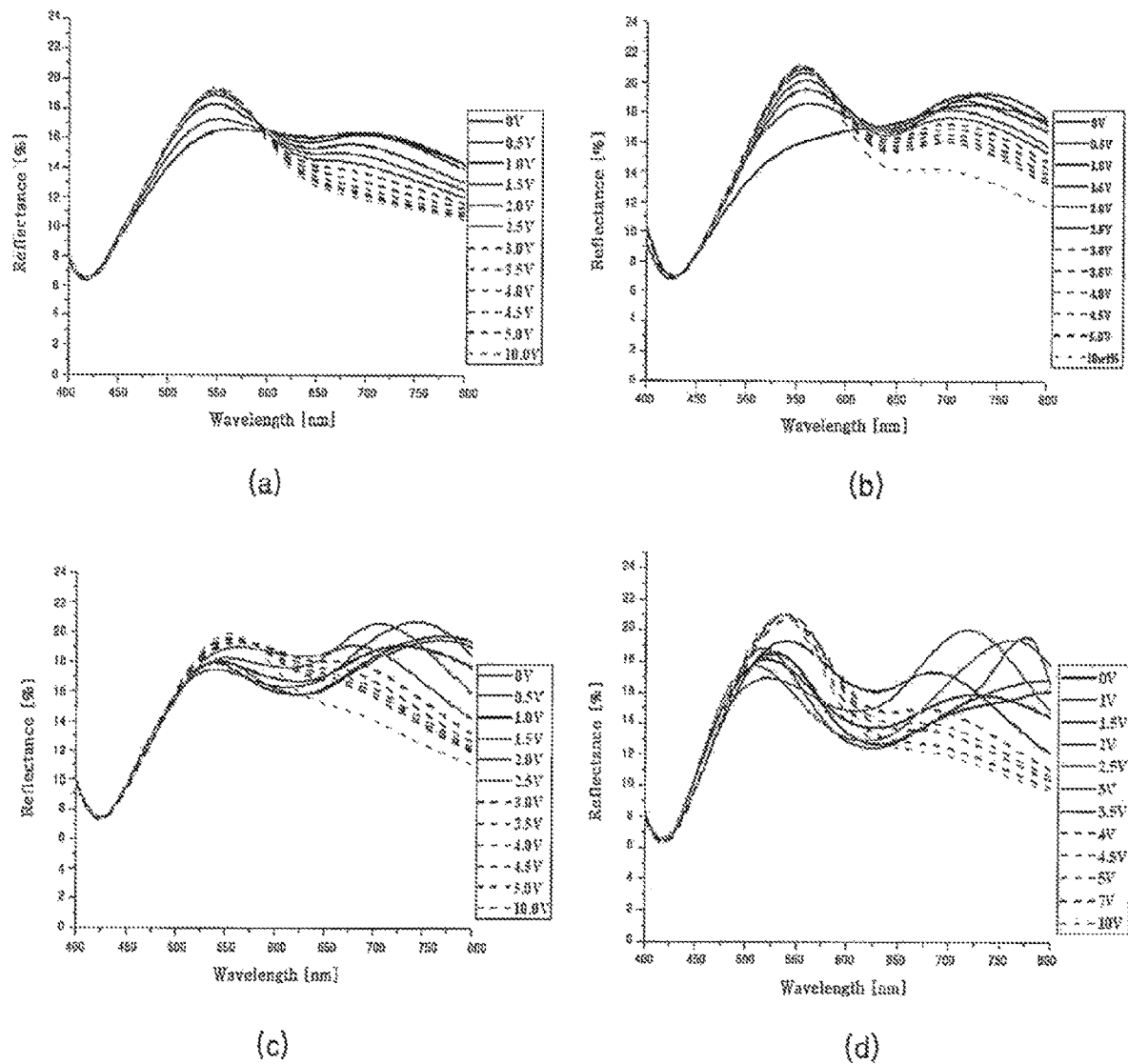

FIGS. 47 and 48 are graphs illustrating the wavelength of light reflected from the particles as a result of performing an experiment implementing the first mode by applying an electric field when the particles having electric charges are dispersed in various solvents having different polarity indices in accordance with one embodiment of the present invention. For reference, in the experiment of FIGS. 47 and 48, particles having a size of 100 to 200 nm, charged with negative charges and coated with a silicon oxide film were used as the particles having electric charges, and solvents having polarity indices in the vicinity of 0, 2, 4 and 5 were used as the solvent having electrical polarization characteristic. More specifically, the graphs (a), (b), (c) and (d) of FIG. 47 illustrate experimental results for the solvents having polarity indices of 0, 2, 4 and 5, respectively, and the graphs (a), (b), (c) and (d) of FIG. 48 illustrate experimental results for a solvent obtained by mixing a solvent having a polarity index of 0 and a solvent having a polarity index of 4 at ratios of 90:10, 75:25, 50:50 and 0:100, respectively. Meanwhile, the graphs shown in FIGS. 47 and 48 illustrate the reflectance of the light reflected from the particles in the wavelength range of a visible light spectrum when electric fields of various intensities are applied. The greater the degree of change in the wavelength pattern of reflected light with change in the intensity of an electric field, the larger the change in the inter-particle distances. This means that light of more various wavelengths can be reflected from the particles by controlling the intensity of the electric field.

Referring to FIG. 47, from graph (a) showing the experimental result for the solvent having a polarity index of 0, it can be seen that a change in the intensity of an electric field (i.e., intensity of a voltage) causes almost no change in the wavelength pattern of reflected light between the different voltages. It can be seen that the higher the polarity index (i.e., as the experimental results proceed toward graph (d) from graph (a)), the greater the change in the wavelength pattern of reflected light with changes in the intensity of an electric field (i.e., intensity of a voltage). Further, referring to FIG. 48, it can be seen that, the higher the ratio of the solvent having a high polarity index (i.e., as the experimental results proceed toward graph (d) from graph (a)), the greater the changes in the wavelength pattern of reflected light with changes in the intensity of the electric field (i.e., intensity of a voltage).

From the experimental results discussed above, it can be seen that, with the display device in accordance with one embodiment of the present invention, photonic crystals capable of reflecting light of a certain wavelength can be realized in the first mode by properly adjusting the charge amount and/or polarization amount of the particles, the polarization amount of the solvent and/or the intensity of an applied electric field, and accordingly a display of a certain wavelength range (full spectrum) can be realized.

Figure 49:
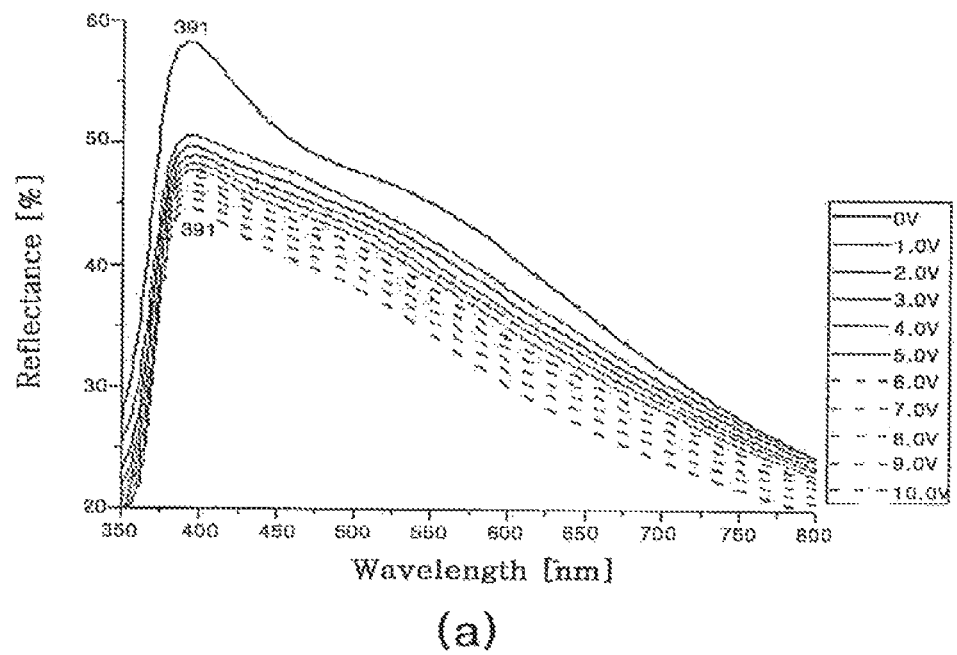
FIGS. 49 and 50 are graphs and photographs illustrating light reflected from the particles as a result of performing an experiment implementing the first mode by applying an electric field when the particles having electric charges and the electrical polarization characteristic are dispersed in a solvent.
Figure 49:
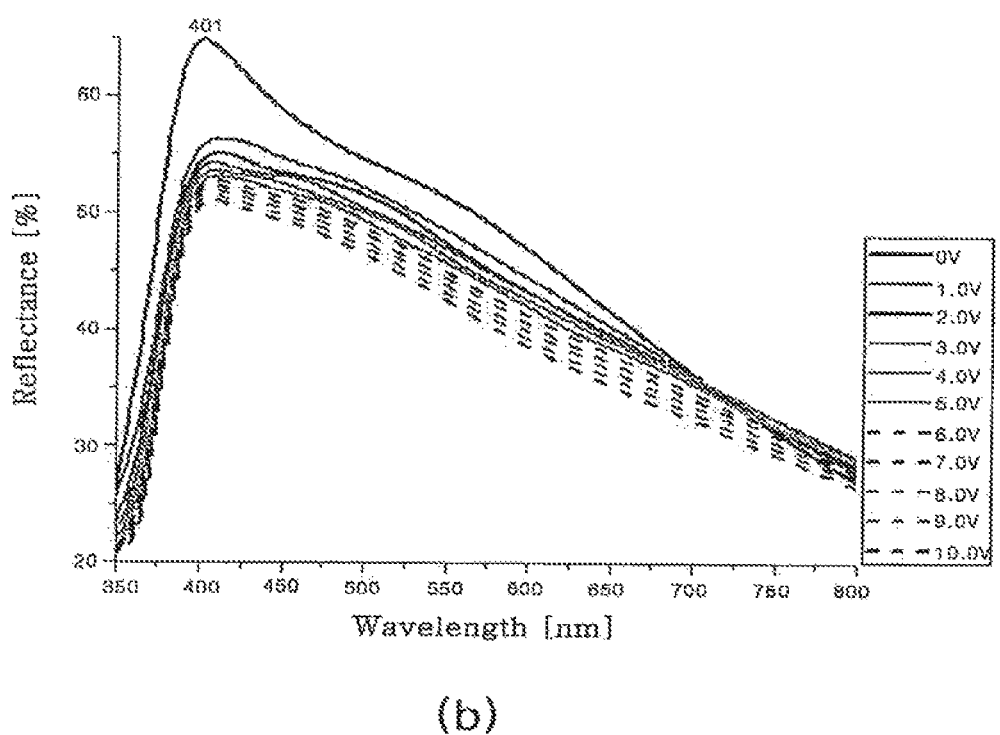
Figure 50:
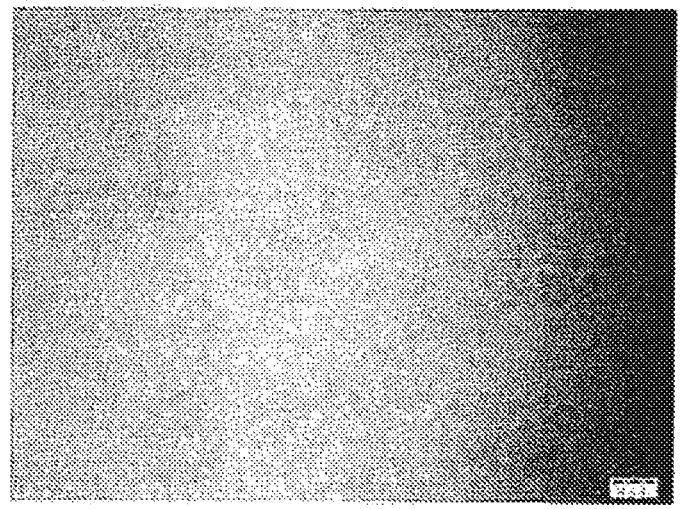
Figure 50:
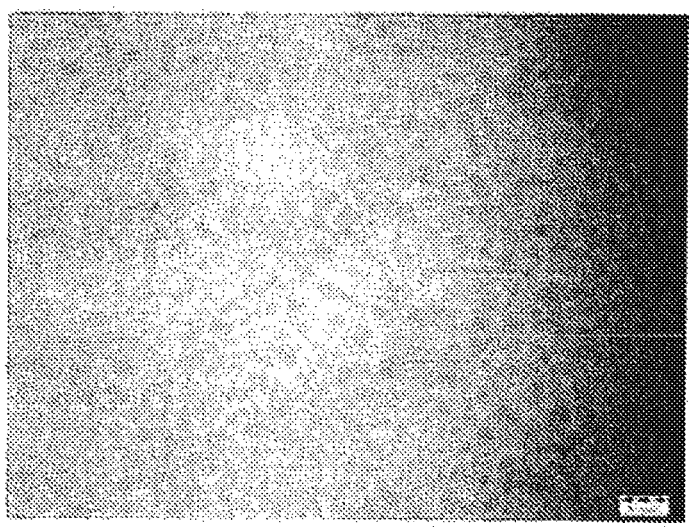

Next, FIGS. 49 and 50 are graphs and photographs illustrating light reflected from the particles as a result of performing an experiment implementing the first mode by applying an electric field when the particles having electric charges and the electrical polarization characteristic are dispersed in solvents having different polarity indices in accordance with one embodiment of the present invention. For reference, in the experiment of FIGS. 49 and 50, $SrTiO_3$ particles (see 49(a)) and $BaTiO_3$ particles (see 34(b)), both of which are charged with electric charges, were used as the particles having electric charges and electrical polarization characteristic, and the particles were dispersed in a solvent having a polarity index of 0.

Referring to FIG. 49, it can be seen that the higher the intensity of an electric field applied to the particles and solvent, the lower the reflectance of light on the whole. From this experimental result, it can be concluded that upon application of an electric field, the particles dispersed in the solvent can be electrically polarized and arranged in the direction of the electric field (see FIG. 50(b)), and this arrangement leads to a decrease in the number of particles capable of reflecting incident light and reduces the reflectance of light. Although this experiment does not involve a sharp change in the wavelength of reflected light with using a configuration in which an electric field is applied when particles having electrical polarization characteristic are dispersed in a nonpolar solvent, it was found that the particles are arranged in a constant direction as the electric field is applied. From this, it can be seen that the wavelength of the reflected light may also be changed by optimizing conditions such as the electric charges on the surface of the particles.

Figure 51:
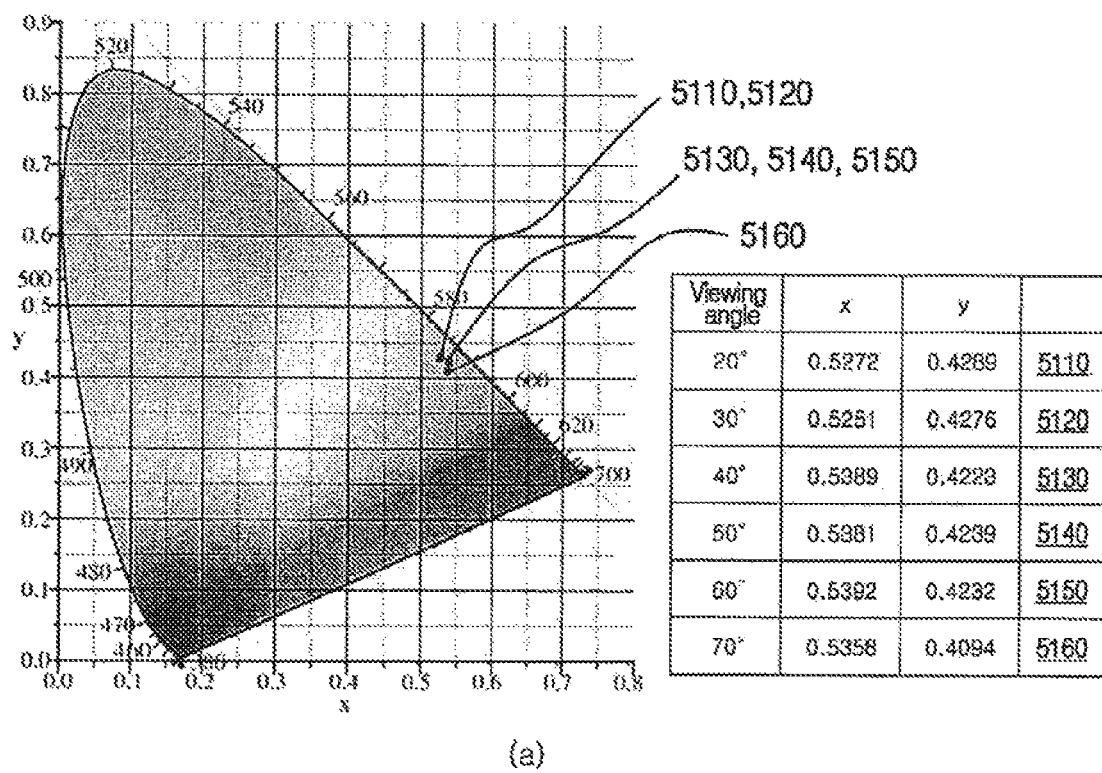
FIG. 51 is a view illustrating results performing experiments for dependency (that is, the viewing angle of the display device) of an observation angle of the display device in accordance with one embodiment of the present invention.
Figure 51:
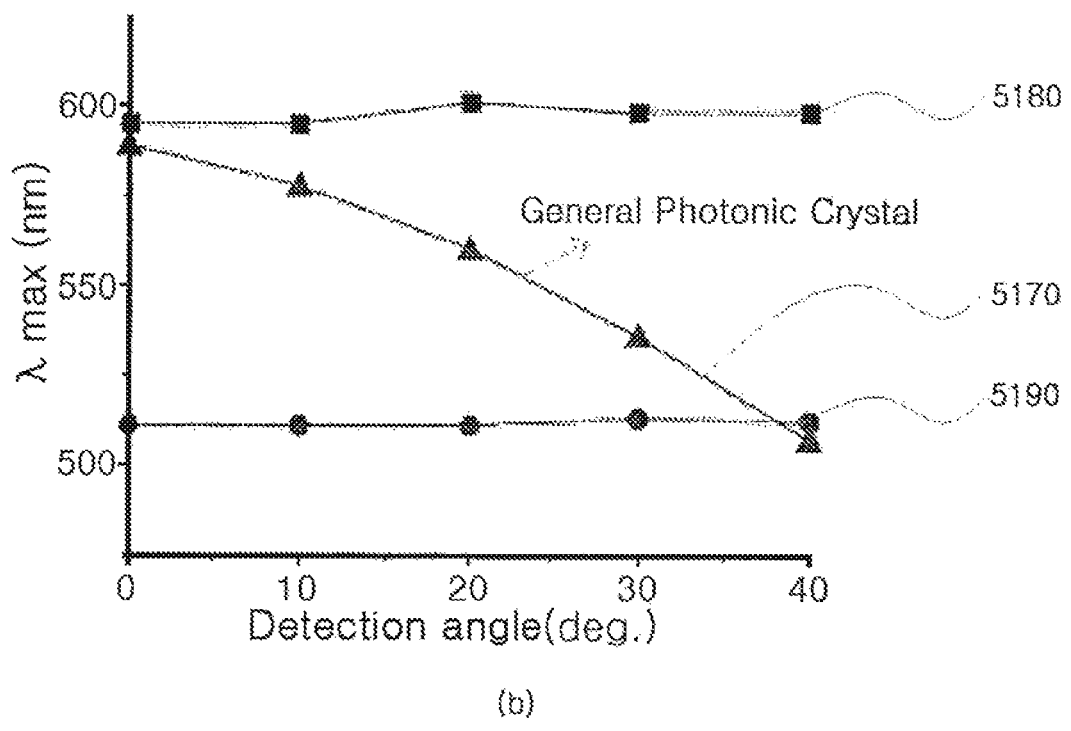

FIG. 51 is a view illustrating results performing experiments for dependency (that is, the viewing angle of the display device) of an observation angle of the display device according to the embodiment of the present invention.

Referring to FIG. 51(a), although the viewing angle of the display device according to the embodiment of the present invention is changed from 20° to 70°, it can be seen that color patterns 5110 to 5160 of the reflected light is little changed. The photonic crystal display device according to the related art has a disadvantage in that the change in the color patterns is greatly shown according to the viewing angle. However, it can be seen that the display device in accordance with the present invention has an advantage in that the color patterns is constantly shown without almost any change. It is understood that this advantage derives from the fact that the photonic crystals formed by the display device in accordance with the present invention are quasi crystals having a short range order. Accordingly, the display device in accordance with the present invention can greatly improve display performance in comparison with the conventional display device which merely forms photonic crystals having a long range order. As shown in the drawings, in accordance with one embodiment of the present invention, when the viewing angle is change between 20° and 70°, the reflected light is changed within 5% of an x value and a y value in CIE xy chromaticity coordinates. Further, in accordance with one embodiment of the present invention, the reason why the short range order is generated is that the electric field is generated by applying the DC voltage. By doing so, the particles are regularly arranged by three-dimensionally arranging the short range order. Thereby, more excellent viewing angle characteristics than the display device having the long range order can be generally obtained. In addition, in order to make the viewing angle characteristics excellent, it is preferable to form the electric field by applying the DC voltage or applying the AC voltage including the DC voltage component. Further, referring to FIG. 51(b), in the case of the general photonic crystals according to the related art, the wavelength of the reflected light is greatly changed according to the change in the viewing angle (5170), but in the case of the embodiment of the present invention, it can be seen that the wavelength of the reflected light is little changed although the viewing angle is changed (5180 and 5190).

Next, the experimental results implementing the display device selectively switching any one of the first, second and third modes in accordance with one embodiment of the present invention will be described with reference to FIGS. 52 to 57.

Figure 52:
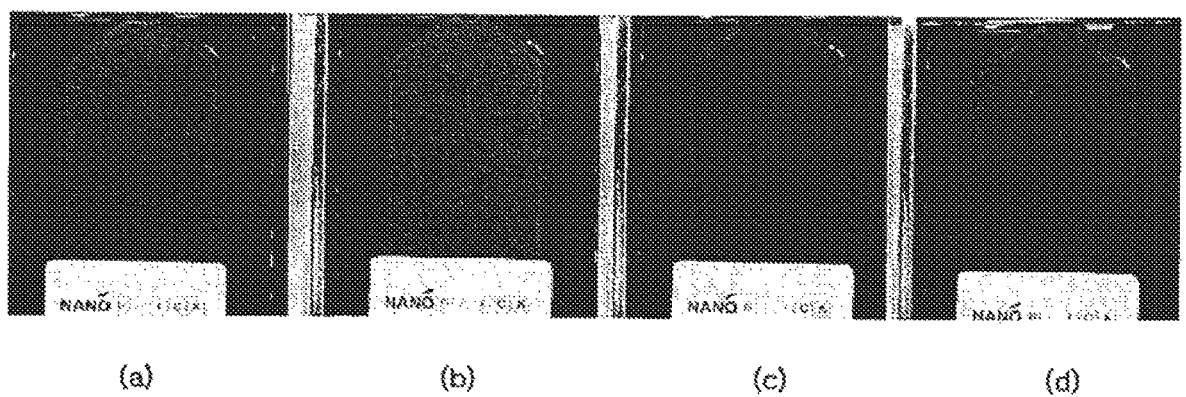
FIG. 52 is a view illustrating experimental results of the display device capable of selectively switching any one of the first and second modes in accordance with one embodiment of the present invention.

FIG. 52 is a view illustrating experimental results of the display device capable of selectively switching any one of the first and second modes in accordance with one embodiment of the present invention. For reference, in the experiment of FIG. 52, the solution having red as the unique color due to the mixing of the particles and the solvent is used and the intensity of the applied electric field is increased stepwise.

Referring to FIG. 52, when the electric field is not applied, the particles are irregularly dispersed in the solvent to display the red that is the unique color of the solution (second mode, see FIG. 52(a)) and if the inter-particle distances are controlled due to the application of the electric field to form the photonic crystal, the red that is the unique color of the solution and the color of light reflected from the photonic crystals are displayed (first mode, see FIG. 52(b)), such that it can be seen that the mixed color of the unique color of the solution and the photonic crystal color is displayed (first mode, see FIGS. 52(c) and 52(d)).

Figure 53:
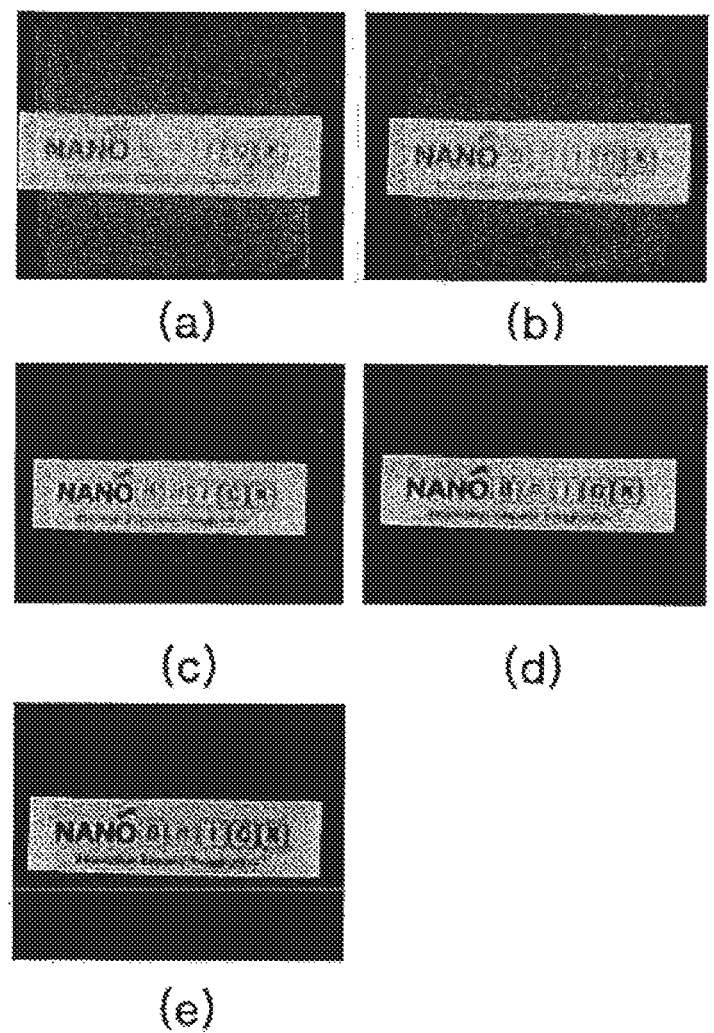
FIGS. 53 and 54 are views illustrating experimental results of the display device capable of selectively switching any one of the first and third modes in accordance with one embodiment of the present invention.
Figure 54:
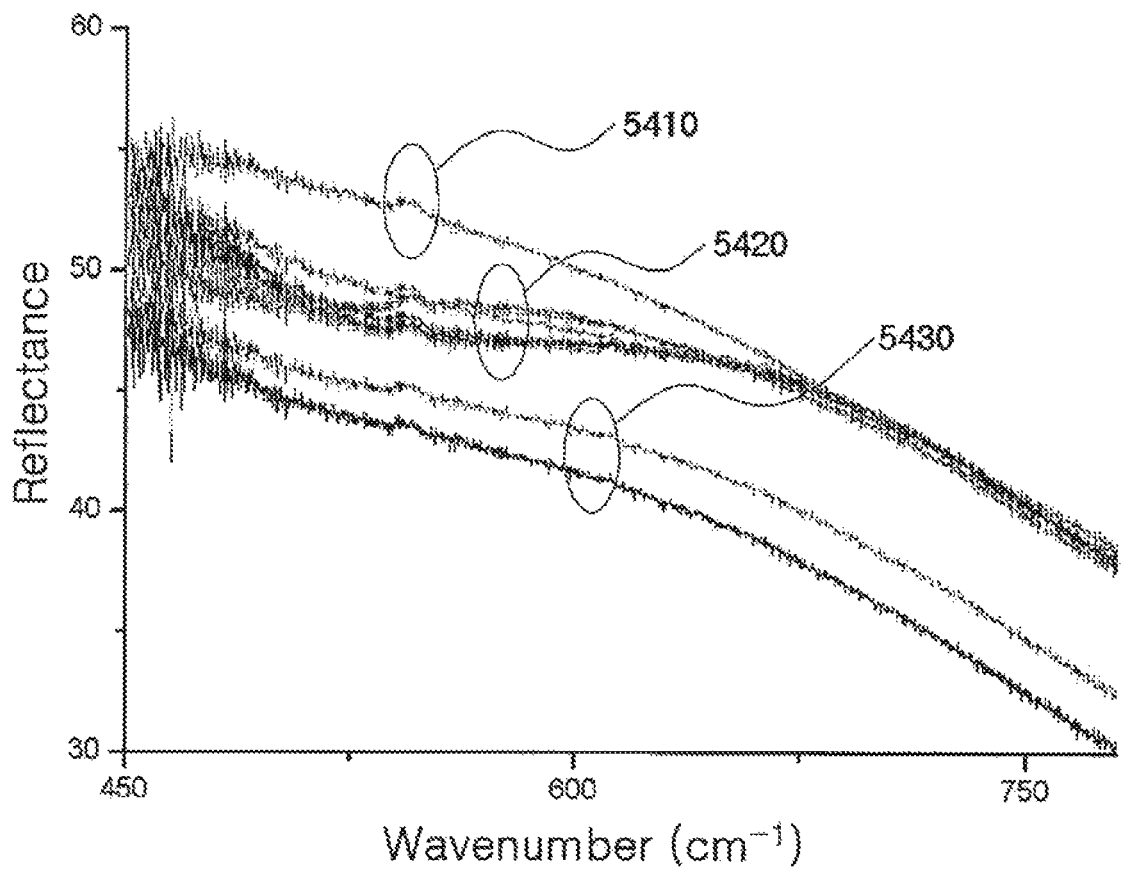

FIGS. 53 and 54 are views illustrating experimental results of the display device capable of selectively switching any one of the first and third modes in accordance with one embodiment of the present invention. For reference, in the experiment of FIGS. 53 and 54, the transparent solvent showing the electrical polarization characteristic and transmitting the light in the visible spectrum, the particles charged with the same electric charges and the transparent electrode were used, and the intensity of the applied electric filed was increased stepwise. In addition, in order to confirm the change in transmittance, the specific patterns are formed under the lower electrode to observe whether the specific patterns are displayed through the display unit. Referring to FIG. 53, when the intensity of the electric field is relatively small, it can be seen that the light in the visible spectrum is reflected from the photonic crystals made of the particles whose distances are controlled, and thus, the blue color is displayed on the display device (first mode, see FIGS. 53(a) and 53(b)). However, if the intensity of an electric field is relatively high, it can be seen that the blue color displayed on the display device became noticeably lighter as the wavelength range of light reflected by photonic crystals is gradually shifted from the visible spectrum to the ultraviolet spectrum (first mode, see FIG. 53(C)). If the intensity of an electric field becomes much higher, it can be seen that the display device turns into a transparent state while displaying no color as the wavelength range of light reflected by photonic crystals is completely out of the visible spectrum, such that the light transmittance becomes high (third mode, see FIGS. 53(d) and 53(e)).

FIG. 54 shows that the reflectance is measured by dispersing the ferroelectric particles, which are charged with the same electric charges and indicate the electrical polarization, in the transparent solvent indicating the electrical polarization and then applying the electric field from the outside. When the electric field is not applied from the outside, the solution color 5410 is shown but when the electric range in the predetermined range is applied from the outside, the photonic crystal color 5420 is shown by the arrangement of the particles, and when the larger electric field is applied, the reflected light of the photonic crystals is switched into the ultraviolet region and the inter-particle arrangement effect is shown more larger in the direction of the electric field, such that the reflected light (increase in the transmitted light) is gradually reduced (5430). That is, the attraction effect due to the electrical polarization is shown larger than the repulsion due to the same electric charges between the particles in the case of the predetermined range or more, such that the particle arrangement effect may be more predominantly shown.

Figure 55A:
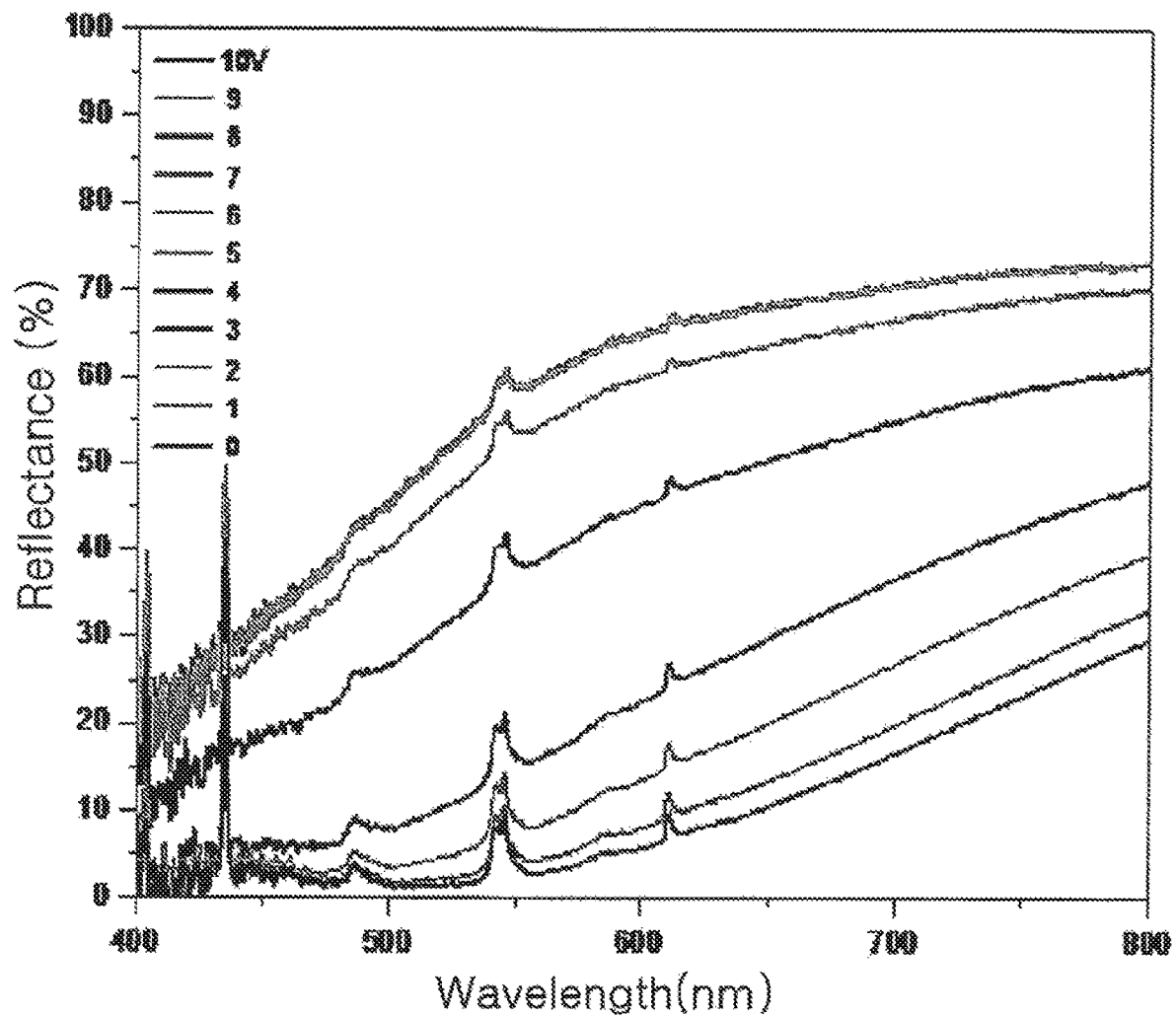
FIGS. 55A, 55B, 55C and 56 are views illustrating experimental results of the display device capable of selectively switching any one of the second and third modes in accordance with one embodiment of the present invention.
Figure 55B:
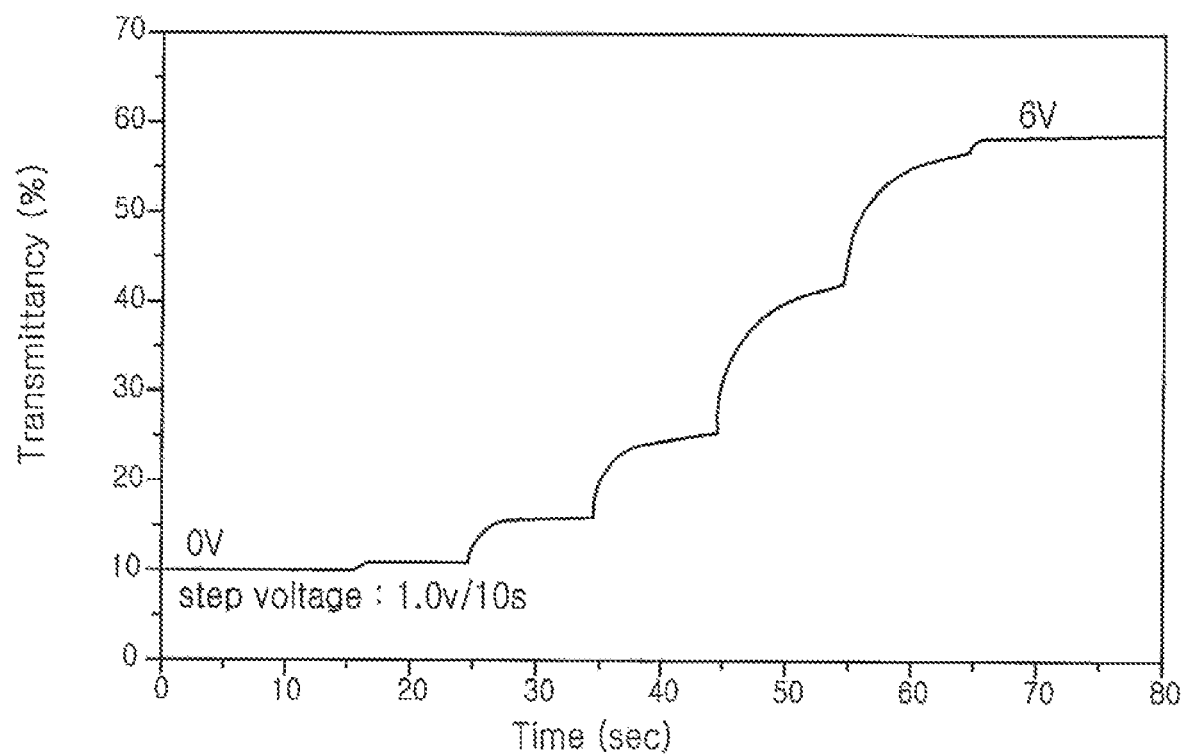
Figure 55C:
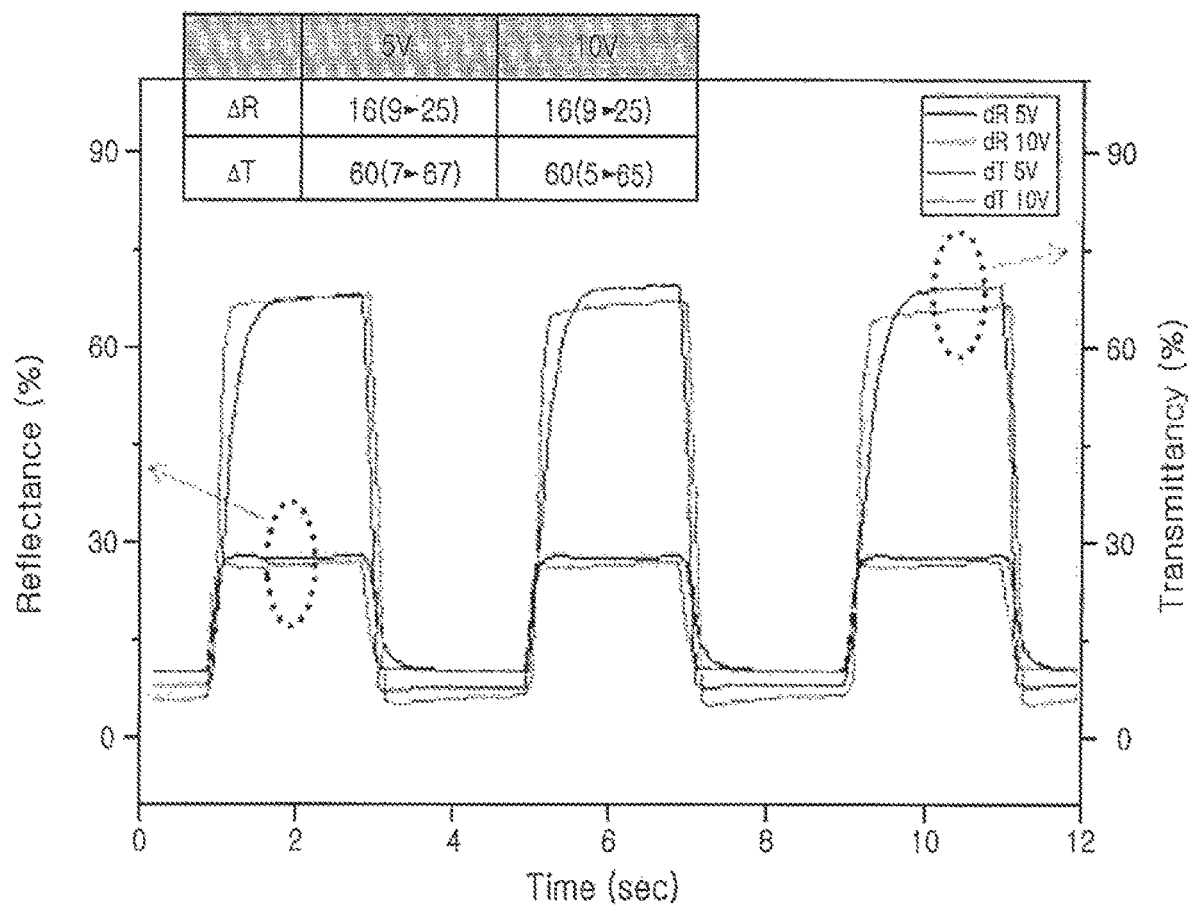
Figure 56:
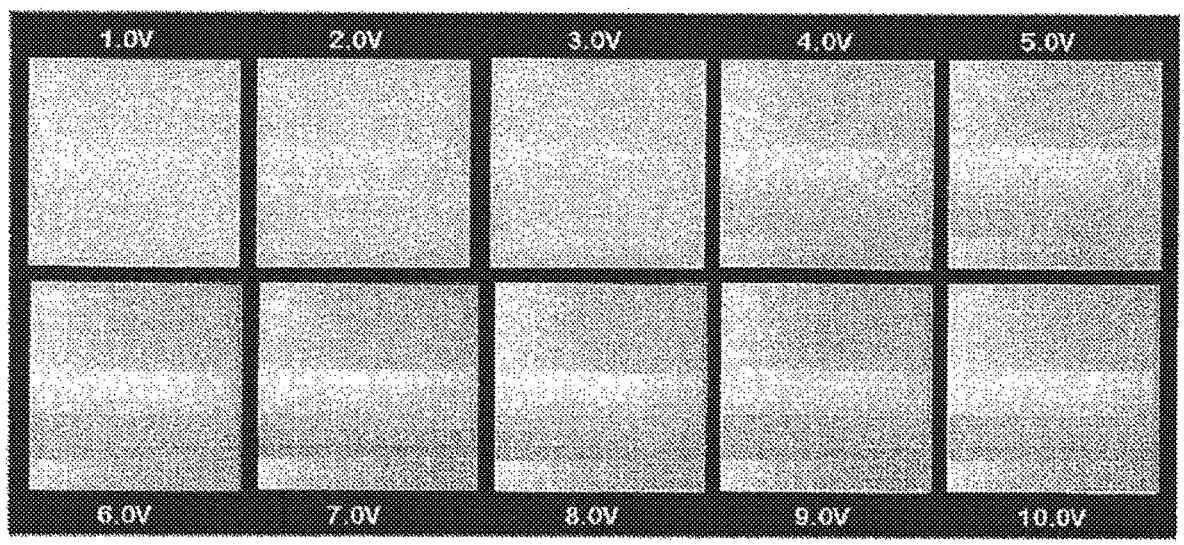

FIGS. 55A, 55B, 55C and 56 are views illustrating experimental results of the display device capable of selectively switching any one of the second and third modes in accordance with one embodiment of the present invention. In FIGS. 55A, 55B, 55C and 56, after the ferroelectric particles, which are charged with the same sign and have the large electrical polarization effect, are dispersed in the light transmissive solvent and are then filled between the transparent upper and lower electrodes having a height of 50 μm, and then, the change degree of the light transmitting the solution according to the application of the external voltage and the reflected light (FIGS. 55A, 55B and 55C) and the region displayed on the upper electrode were measured by a camera (FIG. 56). For reference, in FIGS. 55A, 55B and 55C, the upper and lower transparent electrodes were used at the time of measuring the transmitted light and the reflected light was measured by disposing the black color plate on the lower electrode at the time of measurement. In the experiment of FIG. 56, the unique color patterns including various colors from red to blue in a lattice form were disposed on the bottom of the transparent lower electrode, the intensity of the applied electric field is increased stepwise, and the patterns displayed on the upper electrode was measured by the camera.

Referring to FIG. 55A, it can be seen that the transmittance of light is gradually increased as the intensity of the electric field is increased from 0V to 10V, which shows a process of continuously and variously switching from the second mode, in which the color of the solution is displayed, to the third mode, in which the transmittance of light is controlled. As can be appreciated from FIG. 55B, the transmittance may be gradually changed as the intensity of the electric field is increased. FIG. 55C shows the change in the transmittance and the reflectance according to the applied voltage. From this, when the voltage of 5V is applied, it can be seen that the change width of reflectance is 16% (25%–9%) and the change width in transmittance is changed to 60% (67%–7%) and the operating speed is 1 sec or less. When the transmittance or the reflectance is used, it can be seen that it may be used as the device displaying the information, such as e-Book. When being used as the information display device, the white solution color is displayed if the electric field is not applied and when the electric field is applied, the black lower electrode is displayed, or conversely, when the black solution and the white lower electrode are used, the information may be effectively displayed.

Figure 59:
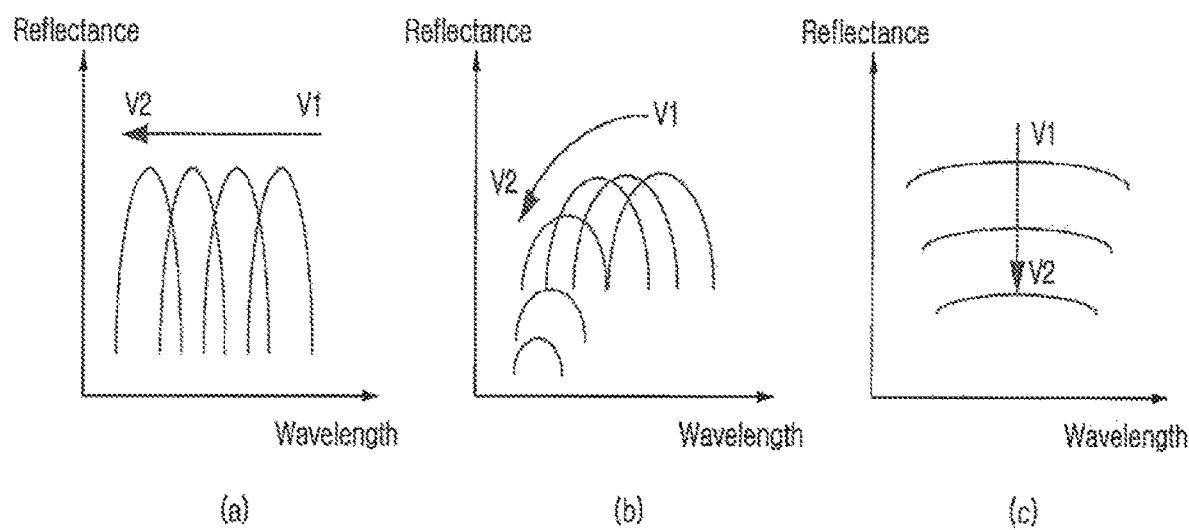
FIG. 59 is a graph illustrating mode implementation and a relation among a wavelength, application voltage and reflectance for implementing the mode switching.

FIG. 59 is a graph illustrating a relation among a wavelength, application voltage and reflectance for implementing the mode and the mode switching. In the whole specification of the present invention, implementing the particles dispersed in the solvent at the predetermined interval or the specific arrangement is affected by the equilibrium of force applied between the particles. In particular, when the electrical polarization of the particles or the solvent is changed according to the external electric field, the electrical polarization attraction affecting between the particles is changed by the induced electrical polarization and the behavior of the particles is affected according to the size of the inter-particle repulsion.

First, in the embodiment of the present invention, when the inter-particle repulsion (coulomb repulsion due to the charge coating of the same sign or the repulsion due to the steric effect) is applied at the equivalent intensity to the maximum attraction due to the electrical polarization induced according to the application of the electric field within the operating range, the inter-particle distances are constantly maintained by the equilibrium between the attraction due to the inter-particle electrical polarization according to the application of the electric field within the operating range and the above-mentioned inter-particle repulsion, and thus, the specific reflected light is shown and the wavelength of the reflected light is continuously changed toward the short wavelength as the applied voltage is increased (FIG. 59(a)).

In another embodiment of the present invention, when the inter-particle repulsion of the particles is smaller than the induced electrical polarization at the threshold voltage or more, the inter-particle repulsion of particles and the induced electrical polarization attraction according to the application of the electric field are in an equilibrium state up to the threshold voltage, and the reflected light is changed. However, in case of the threshold voltage or more, the electrical polarization attraction is applied stronger than the repulsion, such that the particles may be arranged in the direction of the electric field but the inter-particle distances is not controlled at the specific distance. Therefore, the phenomenon that the reflected light is not changed but the transmittance is increased (the reduction in reflection) as shown in FIG. 59(b) may be shown.

Further, when the inter-particle repulsion of the particles is relatively smaller than the electrical polarization attraction according to the application of the electric field, the phenomenon that the particles are arranged in a chain form in the direction of the electric field according to the electrical polarization attraction induced according to the application of the electric field as shown in FIG. 59(c) is predominantly shown, such that the phenomenon that only the intensity of reflectance rather than the wavelength of the reflectance is reduced (increase in transmittance) may be shown.

As set forth above, the exemplary embodiments of the present invention can implement various hues or continuous hues and the transmittance within the same single pixel by the simple structure. In addition, the exemplary embodiments of the present invention can tune various hues, the transmittance, the chroma and/or brightness by the simple structure. Further, the exemplary embodiments of the present invention can implement the hues of the continuous wavelength by reflecting the light of the continuous wavelength rather than implementing the hues by the mixing of R, G and B. Also, the display method according to the exemplary embodiment of the present invention can simultaneously satisfy the large area display, the simple display method, the continuous hue implementation, the use in the flexible display region and the display of the low power consumption. Moreover, with the display device in accordance with the present invention, various and precise displays can be realized by independently controlling the particles having electric charges and the effect of making the maintenance and repair of the display device easier can be achieved. In particular, as compared with the existing displays, such as an electronic ink, which can only display a specific color and requires the use of a separate color filter to display a color different from the specific color, the display device in accordance with the present invention is efficient in that it can realize a display for effectively displaying a structural color over the full wavelength range without the use of a separate color filter.

Although the above-embodiments have been described focusing on the display device using photonic crystal characteristics, the configuration of the present invention is applicable in various fields, including color changing glass, color changing wallpapers, color changing solar cells, color changing sensors, color changing papers, color changing ink, anti-counterfeit tags, and so on. For example, using this concept, it is possible to manufacture a portable biosensor capable of detecting a chemical reaction without expensive measurement equipment by converting a chemical signal obtained from the chemical reaction into an electric signal and displaying the electric signal in a certain hue. Also, if a material whose phase can be changed by light, heat, pressure, etc., is used as the solvent used for the display device of the present invention, electronic paper, electronic ink, etc., that reflect a certain color in a stable and fixed manner can be realized. Moreover, by incorporating a material, such as a fluorescent material or quantum dot (QD) material, into the particles or solvent contained in the display device in accordance with the present invention, a display using photonic crystals may be realized in a bright environment, and a display using fluorescent material or quantum dots may be realized in a dark environment or ultraviolet environment.

Hereinabove, although the present invention is described by specific matters such as concrete components, etc., exemplary embodiments and drawings, they are provided only for assisting in the entire understanding of the present invention. Therefore, the present invention is not limited to the exemplary embodiments. Various modifications and changes may be made by those skilled in the art to which the present invention pertains from this description.

While the invention has been shown and described with respect to the particular embodiments, it will be understood by those skilled in the art that various changes and modification may be made without departing from the spirit and scope of the invention as defined in the following claims.

What is claimed is:
1. A display method comprising:
applying an electric field using an electrode, wherein the electric field is applied to a solution in a display unit, wherein particles are dispersed in a solvent in the solution; and
controlling at least one an intensity of the electric field, a direction of the electric field, an application frequency of the electric field, an application time of the electric field, and an application location of the electric field, in order to control at least one of an interval of the particles, a location of the particles, and an arrangement of the particles,
wherein the display method is implemented to selectively switch, within a first unit pixel of the display unit, between
a first mode for controlling a wavelength of a first light reflected from the particles, wherein distances between the particles are controlled to form photonic crystals where the distances are, according to the electric field, constantly maintained by an equilibrium of an attraction acting between the particles and a repulsion acting between the particles; and
a second mode for tuning a transmittance of a second light, wherein the second light passes through the solution, and wherein the second mode is performed by controlling the particles,
wherein the first mode controls the wavelength of the first light reflected from the particles within a visible spectrum, and
wherein the second mode controls a wavelength of the second light reflected from the particles out of the visible spectrum to tune the transmittance of the second light by making the second light reflected from photonic crystals transparent.

2. The method of claim 1, wherein at least one of the particles, the solvent, and the solution has a characteristic that, according to a change of the applied electric field, an amount of an electrical polarization induced by the applied electric field is changed.

3. The method of claim 1, wherein the particles and the solvent are encapsulated by a light transmissive material or are partitioned by an insulating material.

4. The method of claim 1, wherein the first unit pixel, in which the switching between the modes is performed, is vertically stacked on a second unit pixel, and the modes are independently implemented within the first unit pixel and the second unit pixel.

5. The method of claim 1, wherein the first light reflected from the particles or the second light that transmits the solution is displayed through a color filter connected to the electrode.

* * * * *

UNITED STATES PATENT AND TRADEMARK OFFICE
CERTIFICATE OF CORRECTION

| | | |
|---|---|---|
| PATENT NO. | : 10,803,780 B2 | Page 1 of 1 |
| APPLICATION NO. | : 15/942325 | |
| DATED | : October 13, 2020 | |
| INVENTOR(S) | : Jae Hyun Joo | |

It is certified that error appears in the above-identified patent and that said Letters Patent is hereby corrected as shown below:

In the Specification

Column 1, Line 10, after "Application" insert -- No. --.

In the Claims

Claim 1, Column 67, Line 39, after "one" insert -- of --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*